(12) United States Patent
Wagner et al.

(10) Patent No.: US 11,080,496 B2
(45) Date of Patent: Aug. 3, 2021

(54) SYSTEMS AND METHODS FOR SEPARATING OBJECTS USING VACUUM DIVERTS WITH ONE OR MORE OBJECT PROCESSING SYSTEMS

(71) Applicant: Berkshire Grey, Inc., Bedford, MA (US)

(72) Inventors: Thomas Wagner, Concord, MA (US); Matthew T. Mason, Pittsburgh, PA (US); Christopher Geyer, Arlington, MA (US); John Richard Amend, Jr., Belmont, MA (US); Kyle Maroney, North Attleboro, MA (US); Joseph Romano, Arlington, MA (US); Victoria Hinchey, Winchester, MA (US); Jeffrey Kittredge, Lexington, MA (US); Andrew Gauthier, Somerville, MA (US); Lakshman Kumar, Burlington, MA (US); Prasanna Velagapudi, Pittsburgh, PA (US)

(73) Assignee: Berkshire Grey, Inc., Bedford, MA (US)

( * ) Notice: Subject to any disclaimer, the term of this patent is extended or adjusted under 35 U.S.C. 154(b) by 0 days.

(21) Appl. No.: 16/737,211

(22) Filed: Jan. 8, 2020

(65) Prior Publication Data

US 2020/0160011 A1    May 21, 2020

Related U.S. Application Data

(63) Continuation-in-part of application No. 16/661,820, filed on Oct. 23, 2019, and a continuation-in-part of
(Continued)

(51) Int. Cl.
*G06K 7/10*    (2006.01)
*B65G 1/137*    (2006.01)
(Continued)

(52) U.S. Cl.
CPC ........ *G06K 7/10693* (2013.01); *B07C 5/3412* (2013.01); *B65G 1/1378* (2013.01);
(Continued)

(58) Field of Classification Search
None
See application file for complete search history.

(56) References Cited

U.S. PATENT DOCUMENTS 3,592,326 A    7/1971    Zimmerle et al.
3,595,407 A    7/1971    Muller-Kuhn et al.
(Continued)

FOREIGN PATENT DOCUMENTS

AU    2006204622 A1    3/2007
CN    1033604 A    7/1989
(Continued)

OTHER PUBLICATIONS

Non-Final Office Action issued by the U.S. Patent and Trademark Office in related U.S. Appl. No. 16/737,213 dated Jun. 4, 2020, 6 pages.
(Continued)

*Primary Examiner* — Kristy A Haupt
(74) *Attorney, Agent, or Firm* — Gesmer Updegrove LLP

(57) ABSTRACT

A distribution system for use in an induction system with an object processing system. The distribution system provides dissimilar objects into one of a plurality of receiving units. The distribution system includes an air intake system with an opening that is a fixed distance from a conveyor section, said air intake system aiding in moving an object on the conveyor section from the conveyor section to one of a plurality of adjacent transport units.

23 Claims, 69 Drawing Sheets

Related U.S. Application Data application No. 16/543,105, filed on Aug. 16, 2019, now Pat. No. 10,796,116, which is a continuation of application No. 15/956,442, filed on Apr. 18, 2018, now Pat. No. 10,438,034.

(60) Provisional application No. 62/884,351, filed on Aug. 8, 2019, provisional application No. 62/789,775, filed on Jan. 8, 2019, provisional application No. 62/749,509, filed on Oct. 23, 2018, provisional application No. 62/486,783, filed on Apr. 18, 2017.

(51) Int. Cl.
*B65G 47/46* (2006.01)
*B65G 47/18* (2006.01)
*B65G 25/04* (2006.01)
*B07C 5/34* (2006.01)
*B65G 47/12* (2006.01)
*B65G 47/96* (2006.01)

(52) U.S. Cl.
CPC ............ *B65G 25/04* (2013.01); *B65G 47/12* (2013.01); *B65G 47/18* (2013.01); *B65G 47/46* (2013.01); *B65G 47/962* (2013.01); *B65G 2203/041* (2013.01)

(56) References Cited

U.S. PATENT DOCUMENTS

| | | |
|---|---|---|
| 3,734,286 A | 5/1973 | Simjian |
| 4,136,780 A | 1/1979 | Hunter et al. |
| 4,186,836 A | 2/1980 | Wassmer et al. |
| 4,360,098 A | 11/1982 | Nordstrom |
| 4,622,875 A | 11/1986 | Emery et al. |
| 4,722,653 A | 2/1988 | Williams et al. |
| 4,759,439 A | 7/1988 | Hartlepp |
| 4,819,784 A | 4/1989 | Sticht |
| 4,846,335 A | 7/1989 | Hartlepp |
| 4,895,242 A | 1/1990 | Michel |
| 5,190,162 A | 3/1993 | Hartlepp |
| 5,419,457 A | 5/1995 | Ross et al. |
| 5,460,271 A | 10/1995 | Kenny et al. |
| 5,672,039 A | 9/1997 | Perry et al. |
| 5,713,473 A | 2/1998 | Satake et al. |
| 5,794,788 A | 8/1998 | Massen |
| 5,794,789 A | 8/1998 | Payson et al. |
| 5,839,566 A | 11/1998 | Bonnet |
| 5,875,434 A | 2/1999 | Matsuoka et al. |
| 5,990,437 A | 11/1999 | Coutant et al. |
| 6,060,677 A | 5/2000 | Ulrichsen et al. |
| 6,124,560 A | 9/2000 | Roos et al. |
| 6,246,023 B1 | 6/2001 | Kugle |
| 6,323,452 B1 | 11/2001 | Bonnet |
| 6,401,936 B1 | 6/2002 | Isaacs et al. |
| 6,688,459 B1 | 2/2004 | Bonham et al. |
| 6,762,382 B1 * | 7/2004 | Danelski ................ B07C 5/36 198/370.04 |
| 6,897,395 B2 | 5/2005 | Hayek et al. |
| 8,776,694 B2 | 7/2014 | Rosenwinkel et al. |
| 8,997,438 B1 | 4/2015 | Fallas |
| 9,020,632 B2 | 4/2015 | Naylor |
| 9,102,336 B2 | 8/2015 | Rosenwinkel |
| 9,926,138 B1 | 12/2015 | Singh et al. |
| 9,364,865 B2 | 6/2016 | Kim |
| 9,650,214 B2 | 5/2017 | Hoganson |
| 9,751,693 B1 | 9/2017 | Battles et al. |
| 9,878,349 B2 | 1/2018 | Crest et al. |
| 9,931,673 B2 | 4/2018 | Nice et al. |
| 9,962,743 B2 | 5/2018 | Bombaugh et al. |
| 9,975,148 B2 | 5/2018 | Zhu et al. |
| 10,029,865 B1 | 7/2018 | Mccalib, Jr. et al. |
| 10,438,034 B2 | 10/2019 | Wagner et al. |
| 10,538,394 B2 | 1/2020 | Wagner et al. |
| 10,576,621 B2 | 3/2020 | Wagner et al. |
| 10,611,021 B2 | 4/2020 | Wagner et al. |
| 2002/0092801 A1 | 7/2002 | Dominguez |
| 2002/0134056 A1 | 9/2002 | Dimario et al. |
| 2002/0157919 A1 | 10/2002 | Sherwin |
| 2002/0170850 A1 | 11/2002 | Bonham et al. |
| 2002/0179502 A1 | 12/2002 | Cerutti et al. |
| 2003/0034281 A1 | 2/2003 | Kumar |
| 2003/0038065 A1 | 2/2003 | Pippin et al. |
| 2003/0075051 A1 | 4/2003 | Watanabe et al. |
| 2004/0065597 A1 | 4/2004 | Hanson |
| 2004/0194428 A1 | 10/2004 | Close et al. |
| 2004/0195320 A1 | 10/2004 | Ramsager |
| 2004/0215480 A1 | 10/2004 | Kadaba |
| 2004/0261366 A1 | 12/2004 | Gillet et al. |
| 2005/0002772 A1 | 1/2005 | Stone |
| 2005/0149226 A1 | 7/2005 | Stevens et al. |
| 2005/0220600 A1 | 10/2005 | Baker et al. |
| 2006/0021858 A1 | 2/2006 | Sherwood |
| 2006/0070929 A1 | 4/2006 | Fry et al. |
| 2007/0209976 A1 | 9/2007 | Worth et al. |
| 2008/0046116 A1 | 2/2008 | Khan et al. |
| 2008/0181753 A1 | 7/2008 | Bastian et al. |
| 2009/0026017 A1 | 1/2009 | Freudelsperger |
| 2010/0122942 A1 | 5/2010 | Harres et al. |
| 2010/0318216 A1 | 12/2010 | Faivre et al. |
| 2011/0130868 A1 * | 6/2011 | Baumann ............ B65G 1/1378 700/217 |
| 2011/0144798 A1 | 6/2011 | Freudelsperger |
| 2011/0238207 A1 | 9/2011 | Bastian, II et al. |
| 2011/0243707 A1 | 10/2011 | Dumas et al. |
| 2011/0320036 A1 | 12/2011 | Freudelsperger |
| 2012/0118699 A1 | 5/2012 | Buchman et al. |
| 2013/0051696 A1 | 2/2013 | Garrett et al. |
| 2013/0110280 A1 | 5/2013 | Folk |
| 2013/0202195 A1 | 8/2013 | Perez Cortes et al. |
| 2014/0244026 A1 | 8/2014 | Neiser |
| 2014/0249666 A1 | 9/2014 | Radwallner et al. |
| 2014/0277693 A1 | 9/2014 | Naylor |
| 2014/0291112 A1 | 10/2014 | Lyon et al. |
| 2015/0098775 A1 | 4/2015 | Razumov |
| 2015/0114799 A1 | 4/2015 | Hansl et al. |
| 2016/0083196 A1 | 3/2016 | Dugat |
| 2016/0221762 A1 | 8/2016 | Schroader |
| 2016/0221766 A1 | 8/2016 | Schroader et al. |
| 2016/0228921 A1 | 8/2016 | Doublet et al. |
| 2017/0057756 A1 | 3/2017 | Dugat et al. |
| 2017/0197233 A1 | 7/2017 | Bombaugh et al. |
| 2017/0225330 A1 | 8/2017 | Wagner et al. |
| 2017/0312789 A1 | 11/2017 | Schroader |
| 2017/0330135 A1 | 11/2017 | Taylor et al. |
| 2017/0349385 A1 | 12/2017 | Moroni et al. |
| 2017/0369244 A1 | 12/2017 | Battles et al. |
| 2018/0044120 A1 | 2/2018 | Mäder |
| 2018/0085788 A1 | 3/2018 | Engel et al. |
| 2018/0105363 A1 | 4/2018 | Lisso et al. |
| 2018/0127219 A1 * | 5/2018 | Wagner ................ B65G 47/49 |
| 2018/0186572 A1 | 7/2018 | Issing |
| 2018/0265291 A1 | 9/2018 | Wagner et al. |
| 2018/0265298 A1 | 9/2018 | Wagner et al. |
| 2018/0265311 A1 | 9/2018 | Wagner et al. |
| 2018/0273295 A1 | 9/2018 | Wagner et al. |
| 2018/0273296 A1 | 9/2018 | Wagner et al. |
| 2018/0273297 A1 | 9/2018 | Wagner et al. |
| 2018/0273298 A1 | 9/2018 | Wagner et al. |
| 2018/0282065 A1 | 10/2018 | Wagner et al. |
| 2018/0282066 A1 | 10/2018 | Wagner et al. |
| 2018/0312336 A1 | 11/2018 | Wagner et al. |
| 2018/0327198 A1 | 11/2018 | Wagner et al. |
| 2018/0330134 A1 | 11/2018 | Wagner et al. |
| 2019/0022702 A1 | 1/2019 | Vegh et al. |
| 2019/0091730 A1 | 3/2019 | Torang |
| 2019/0337723 A1 | 11/2019 | Wagner et al. |
| 2020/0023410 A1 | 1/2020 | Tamura et al. |
| 2020/0143127 A1 | 5/2020 | Wagner et al. |

FOREIGN PATENT DOCUMENTS

| | | |
|---|---|---|
| CN | 1671489 A | 9/2005 |
| CN | 1809428 A | 7/2006 |

(56) References Cited

FOREIGN PATENT DOCUMENTS

| | | |
|---|---|---|
| CN | 103129783 A | 6/2013 |
| CN | 103842270 A | 6/2014 |
| CN | 104507814 A | 4/2015 |
| CN | 104858150 A | 8/2015 |
| CN | 105383906 A | 3/2016 |
| CN | 105668255 A | 6/2016 |
| CN | 105873838 A | 8/2016 |
| CN | 205500186 U | 8/2016 |
| CN | 108602630 A | 9/2018 |
| DE | 19510392 A1 | 9/1996 |
| DE | 102004001181 A1 | 8/2005 |
| DE | 102007023909 A1 | 11/2008 |
| DE | 102007038834 A1 | 2/2009 |
| DE | 102008039764 A1 | 5/2010 |
| EP | 0235488 A1 | 9/1987 |
| EP | 0613841 A1 | 9/1994 |
| EP | 0648695 A2 | 4/1995 |
| EP | 1695927 A2 | 8/2006 |
| EP | 1995192 A2 | 11/2008 |
| EP | 2233400 A1 | 9/2010 |
| EP | 2477914 B1 | 4/2013 |
| EP | 3112295 A1 | 1/2017 |
| FR | 2832654 A1 | 5/2003 |
| GB | 2084531 A | 4/1982 |
| JP | 200228577 A | 1/2002 |
| JP | 2007182286 A | 7/2007 |
| JP | 2008037567 A | 2/2008 |
| JP | 2010202291 A | 9/2010 |
| WO | 9731843 A1 | 9/1997 |
| WO | 03095339 A1 | 11/2003 |
| WO | 2005118436 A1 | 12/2005 |
| WO | 2007009136 A1 | 1/2007 |
| WO | 2008091733 A2 | 7/2008 |
| WO | 2010017872 A1 | 2/2010 |
| WO | 2011038442 A2 | 4/2011 |
| WO | 2014130937 A1 | 8/2014 |
| WO | 2015118171 A1 | 8/2015 |
| WO | 2017036780 A1 | 3/2017 |
| WO | 2017044747 A1 | 3/2017 |
| WO | 2018175466 A1 | 9/2018 |
| WO | 2018176033 A1 | 9/2018 |

OTHER PUBLICATIONS

Notice on the First Office Action and First Office Action, along with its English Translation, issued by the China National Intellectual Property Administration in related Chinese Patent Application No. 201880038892.0 dated Sep. 2, 2020, 23 pages.

International Preliminary Report on Patentability issued by the International Bureau of WIPO dated Oct. 22, 2019, in related International Application No. PCT/US2018/028164, 11 pages.

International Search Report and Written Opinion issued by the International Searching Authority dated Aug. 9, 2018, in related International Application No. PCT/US2018/028164, 15 pages.

Non-Final Office Action issued by the U.S. Patent and Trademark Office in related U.S. Appl. No. 15/956,442 dated Mar. 15, 2019, 8 pages.

Communication pursuant to Rules 161(1) and 162 EPC issued by the European Patent Office in related European Patent Application No. 18723144.4 dated Nov. 26, 2019, 3 pages.

International Search Report and Written Opinion issued by the International Searching Authority dated Mar. 25, 2020, in related International Application No. PCT/US2020/012695, 14 pages.

International Search Report and Written Opinion issued by the International Searching Authority dated Mar. 25, 2020, in related International Application No. PCT/US2020/012704, 15 pages.

International Search Report and Written Opinion issued by the International Searching Authority dated Mar. 25, 2020, in related International Application No. PCT/US2020/012713, 14 pages.

International Search Report and Written Opinion issued by the International Searching Authority dated Mar. 25, 2020, in related International Application No. PCT/US2020/012720, 14 pages.

International Search Report and Written Opinion issued by the International Searching Authority dated Mar. 25, 2020, in related International Application No. PCT/US2020/012744, 14 pages.

International Search Report and Written Opinion issued by the International Searching Authority dated Mar. 25, 2020, in related International Application No. PCT/US2020/012754, 14 pages.

International Search Report and Written Opinion issued by the International Searching Authority dated Feb. 6, 2020 in related International Application No. PCT/US2019/057710, 12 pages.

Examiner's Report issued by the Innovation, Science and Economic Development Canada in related Canadian Patent Application No. 3,060,257 dated Dec. 9, 2020, 3 pages.

Non-Final Office Action issued by the U.S. Patent and Trademark Office in related U.S. Appl. No. 16/737,213 dated Feb. 24, 2021, 8 pages.

Non-Final Office Action issued by the U.S. Patent and Trademark Office in related U.S. Appl. No. 16/737,218 dated Mar. 26, 2021, 13 pages.

Non-Final Office Action issued by the U.S. Patent and Trademark Office in related U.S. Appl. No. 16/737,215 dated Mar. 26, 2021, 13 pages.

Non-Final Office Action issued by the U.S. Patent and Trademark Office in related U.S. Appl. No. 16/737,202 dated Apr. 13, 2021, 9 pages.

Notice on the Second Office Action and Second Office Action, along with its English Translation, issued by the China National Intellectual Property Administration in related Chinese Patent Application No. 201880038892.0 dated Apr. 14, 2021, 8 pages.

International Preliminary Report on Patentability issued by the International Bureau of WIPO in related International Application No. PCT/US2019/057710 dated Apr. 27, 2021, 8 pages.

* cited by examiner

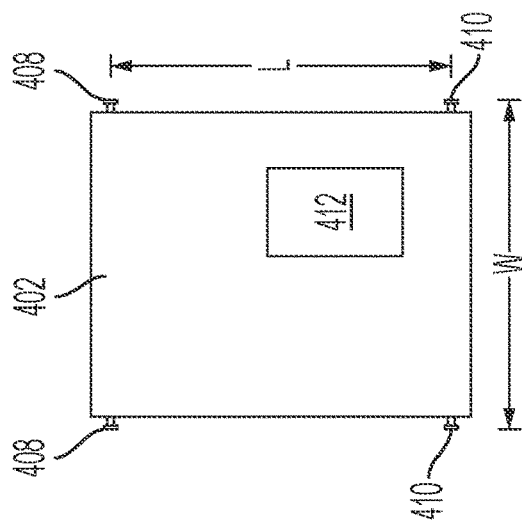
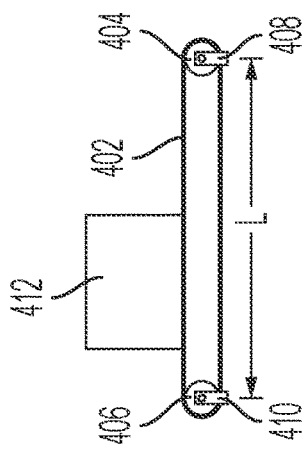
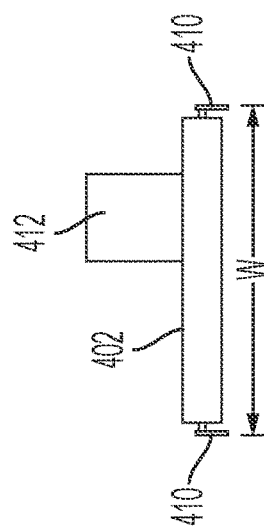
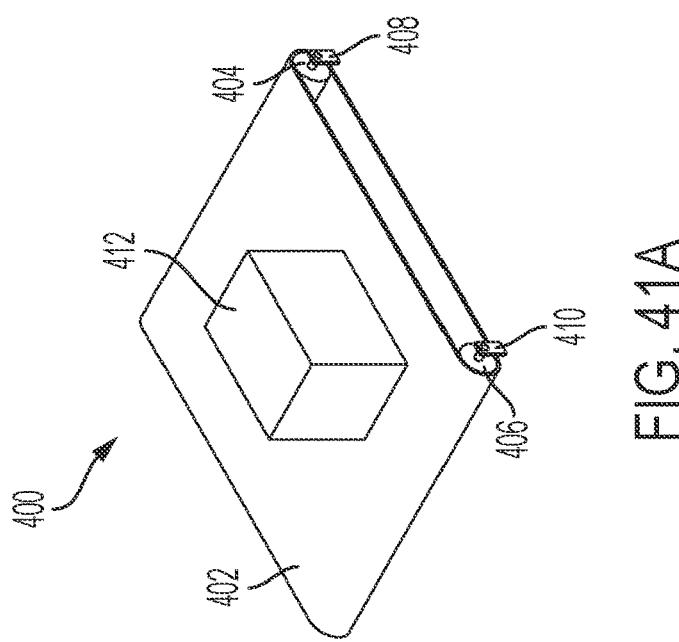
FIG. 41D
FIG. 41B
FIG. 41C
FIG. 41A

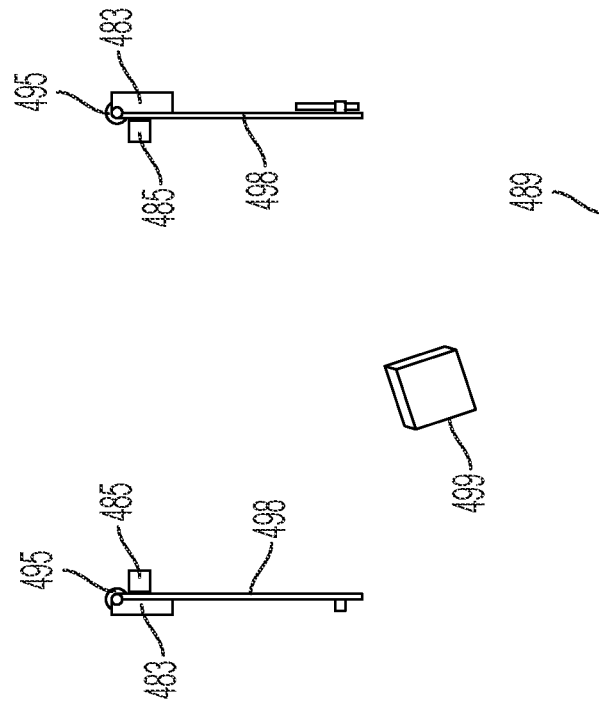
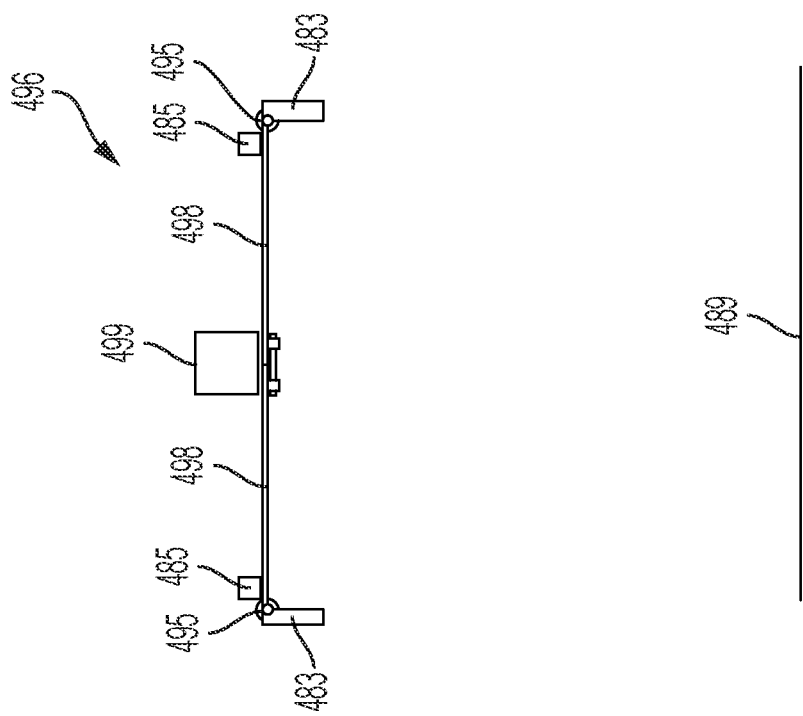

SYSTEMS AND METHODS FOR SEPARATING OBJECTS USING VACUUM DIVERTS WITH ONE OR MORE OBJECT PROCESSING SYSTEMS

PRIORITY

The present application claims priority to U.S. Provisional Patent Application Ser. No. 62/789,775 filed Jan. 8, 2019; and the present application is a continuation-in-part application of and claims priority to U.S. patent application Ser. No. 16/661,820 filed Oct. 23, 2019, which claims priority to U.S. Provisional Patent Application Ser. No. 62/884,351 filed Aug. 8, 2019 and U.S. Provisional Patent Application Ser. No. 62/749,509 filed Oct. 23, 2018; and the present application further is a continuation-in-part application of claims priority to U.S. patent application Ser. No. 16/543,105 filed Aug. 16, 2019, which is a continuation application of U.S. patent application Ser. No. 15/956,442 filed Apr. 18, 2018, now patented as U.S. Pat. No. 10,438,034, issued Oct. 8, 2019, which claims priority to U.S. Provisional Patent Application Ser. No. 62/486,783 filed Apr. 18, 2017, the disclosures of all of which are hereby incorporated by reference in their entireties.

BACKGROUND

The invention generally relates to automated (e.g., programmable motion) and other processing systems, and relates in particular to programmable motion (e.g., robotic) systems intended for use in environments requiring, for example, that a variety of objects (e.g., articles, parcels or packages) be processed (e.g., sorted and/or otherwise distributed) to several output destinations.

Many object distribution systems receive objects in an organized or disorganized stream that may be provided as individual objects or objects aggregated in groups such as in bags, arriving on any of several different conveyances, commonly a conveyor, a truck, a pallet, a Gaylord, or a bin. Each object must then be distributed to the correct destination container, as determined by identification information associated with the object, which is commonly determined by a label printed on the object. The destination container may take many forms, such as a bag or a bin or a tote.

The processing of such objects has traditionally been done by human workers that scan the objects, e.g., with a handheld barcode scanner, and then place the objects at assigned locations. For example many order fulfillment operations achieve high efficiency by employing a process called wave picking. In wave picking, orders are picked from warehouse shelves and placed at locations (e.g., into bins) containing multiple orders that are sorted downstream. At the processing stage individual objects are identified, and multi-object orders are consolidated, for example into a single bin or shelf location, so that they may be packed and then shipped to customers. The processing (e.g., sorting) of these objects has traditionally been done by hand. A human sorter picks an object from an incoming bin, finds a barcode on the object, scans the barcode with a handheld barcode scanner, determines from the scanned barcode the appropriate bin or shelf location for the article, and then places the article in the so-determined bin or shelf location where all objects for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

In conventional parcel sortation systems, human workers or automated systems typically retrieve objects in an arrival order, and sort each object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

Certain partially automated sortation systems involve the use of recirculating conveyors and tilt trays, where the tilt trays receive objects by human sortation (human induction), and each tilt tray moves past a scanner. Each object is then scanned and moved to a pre-defined location assigned to the object. The tray then tilts to drop the object into the location. Further, partially automated systems, such as the bomb-bay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; they then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus each parallel sortation cell must have all the same collection bins designations; otherwise an object might be delivered to a cell that does not have a bin to which that object is mapped. There remains a need for a more efficient and more cost effective object sortation system that sorts objects of a variety of sizes and weights into appropriate collection bins or trays of fixed sizes, yet is efficient in handling objects of such varying sizes and weights.

Further, such systems require human personnel to oversee the induction of objects where the processing system may receive objects that it may not be able to efficiently handle or be able to handle at all.

SUMMARY

In accordance with an aspect, the invention provides a distribution system for use in an induction system with an object processing system. The distribution system provides dissimilar objects into one of a plurality of receiving units. The distribution system includes an air intake system with an opening that is a fixed distance from a conveyor section, said air intake system aiding in moving an object on the conveyor section from the conveyor section to one of a plurality of adjacent transport units.

In accordance with another aspect, the invention provides a distribution system for use in an induction system with an object processing system. The distribution system provides dissimilar objects into one of a plurality of receiving units. The distribution system includes an air transfer system including a forced air system and an air intake system that together aid in moving an object on the conveyor section from the conveyor section to one of a plurality of adjacent conveyors.

In accordance with a further aspect, the invention provides a method of distributing dissimilar objects to one of a plurality of receiving units in a pre-processing system for use with an object processing system. The method includes providing an air transfer system opposite an air intake system, and engaging the air transfer system and the air intake system to aid in moving an object on the conveyor section from the conveyor section to one of a plurality of adjacent conveyors.

BRIEF DESCRIPTION OF THE DRAWINGS

The following description may be further understood with reference to the accompanying drawings in which:

FIGS. 41A-41D show illustrative diagrammatic views of a weight sensing conveyor section in accordance with an aspect of the invention that further determines a center of mass of an object;

FIGS. 51A and 51B show illustrative diagrammatic end views of the conveyor section of FIGS. 50A and 50B;

Figure 1:
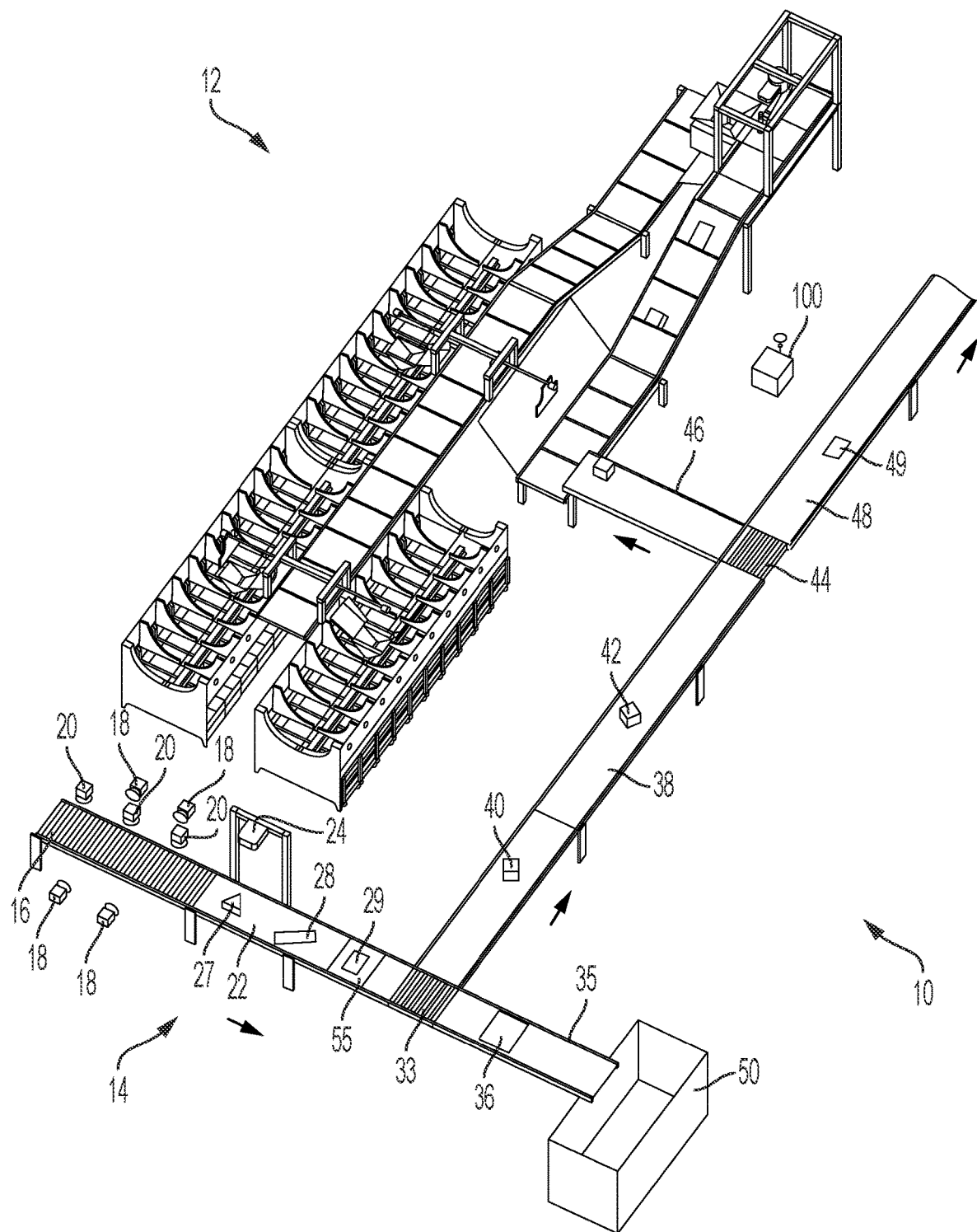
FIG. 1 shows an illustrative diagrammatic view of a processing system and an induction system in accordance with an embodiment of the present invention.

The drawings are shown for illustrative purposes only.

DETAILED DESCRIPTION

In accordance with an embodiment, the invention provides an induction filtering system in which objects (e.g., packages) are screened and limited from entering an object processing system. Only objects that meet defined criteria may be processed by the object processing system in accordance with certain aspects of the invention. The induction filtering system includes at least one evaluation system as well as multiple processing paths, at least one of which leads to the object processing system in accordance with certain aspects of the invention.

An automated package sortation system needs to be able to singulate and sort individual packages, in order to route them to specific destinations. Some package sortation systems handle packages using a robotic picking system. The robot acquires a grip on the package, separating it from a pile of other packages, where it can then be scanned and sent to a sorting location. Such automated package handling systems inevitably encounter packages that cannot be processed, because, for example, the packages are outside of the system's package specifications. The robot or the gripper, for example, can only pick items that are within a weight specification. Thus items that it cannot handle might include items that are too light or too heavy, that are too big or too small, or that in some other way cannot be handled by the system.

These incompatible packages can jam up the system. If they are too big, they may get stuck on the conveying systems through the robot package sortation system, and therefore prevent other packages from flowing through. The incompatible packages may also reduce the effective throughput of the sortation system. If they do get through and are presented in a pile to the robot picking system, then the robot may try to pick the incompatible packages. If the package is outside of the system's specification, then the resulting grip on the object might be inadequate to safely transfer the item, and the robot might drop the package and potentially damage the package. Alternatively, if it is able to successfully pick and transfer the package, in doing so it could potentially damage the robotic picking system in some way while straining to move the out-of-specification package.

Compatible package specifications might include: a range of valid package weights, a range of compatible package dimensions, a set of valid labeling types (e.g., whether they employ a printed-on label vs. an adhesive-applied label), exclusion of items marked as fragile, exclusion of items marked as having been insured at high value, and therefore would prefer to be sorted with greater care by hand, exclusion of items marked as containing hazardous materials, such as lithium-ion batteries, and exclusion for any other reason for which the package might be flagged in a database as requiring exception or manual handling. It is desired to provide a system that filters out incompatible packages before they arrive at the package handling system, and/or improves the ability of the package handling system to specifically recognize incompatible packages so that robotic picks are not attempted on objects needing to be handled manually.

In accordance with an embodiment, the invention provides an induction system that limits or manages the induction of objects to an object processing system. In certain aspects, the system provides a variety of approaches to automatically re-route incompatible packages before they arrive at a package sortation system consisting of one or more robotic pickers, or to minimize their impact should they arrive at a robotic picking area.

Figure 2:
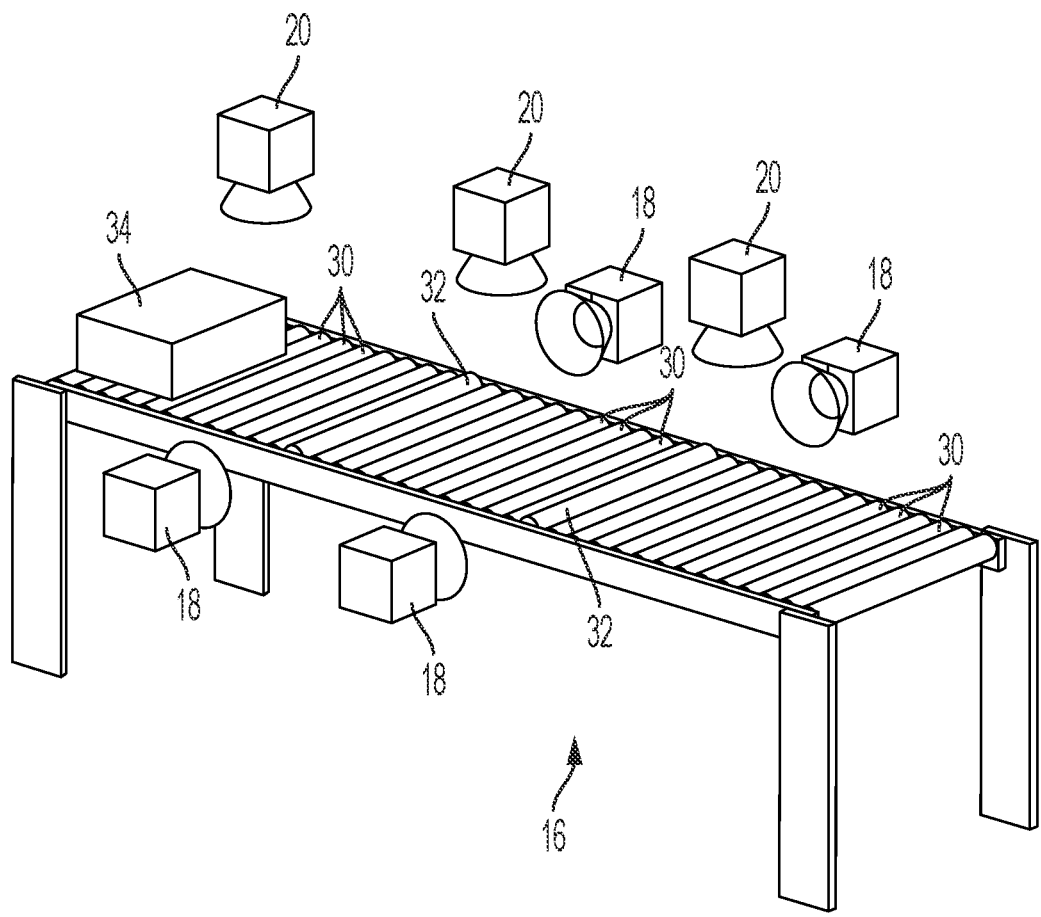
FIG. 2 shows an illustrative diagrammatic view of the input station of the induction system of FIG. 1.
Figure 3A:
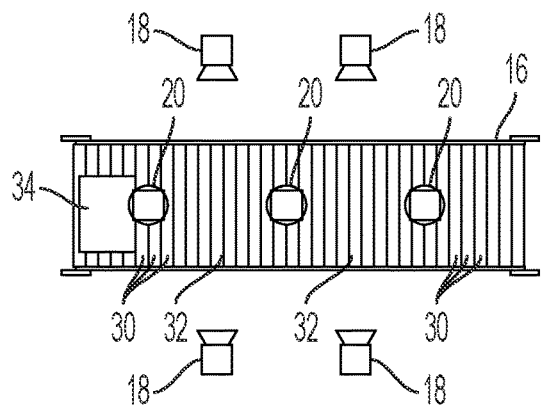
FIGS. 3A-3D show illustrative diagrammatic views of stages of an object moving by perception units at the input station of FIG. 2.
Figure 3B:
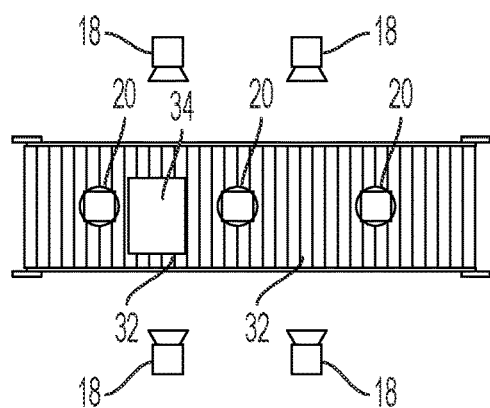
Figure 3C:
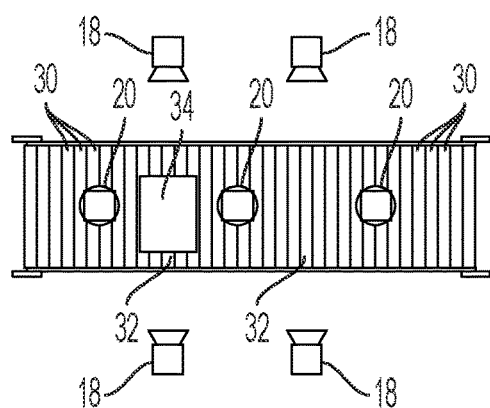
Figure 3D:
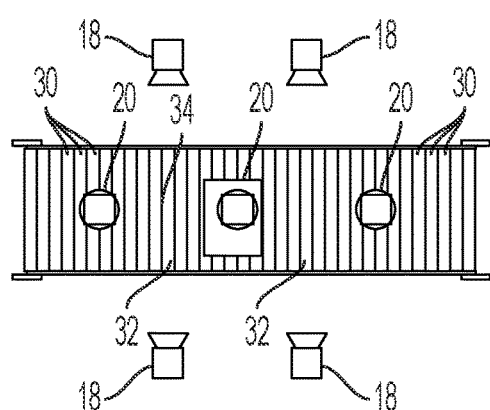

FIG. 1, for example, shows an induction system 10 that filters (e.g., limits, or manages) objects that are being fed to an object processing system 12. The induction system 10 includes an input station 14 to which objects are presented, for example, in a singulated stream on a conveyor 22. Any of the conveyors of the systems of FIGS. 1, 9, 11, 23, 34-38, 49, 56 and 70 may be cleated or non-cleated conveyors, and the systems may monitor movement of the conveyors (and thereby the objects thereon) via a plurality of sensors and/or conveyor speed control systems. A response evaluation section 16 of the conveyor 22 includes one or more transport sets of rollers 30, as well as one or more perturbation rollers 32 as shown in FIG. 2. With further reference to FIGS. 3A-3D, perception units (e.g., cameras or scanners) 18 are directed horizontally toward the conveyor section 16, and perception units (e.g., cameras or scanners) 20 are directed downward onto the conveyor section 16.

Figure 4A:
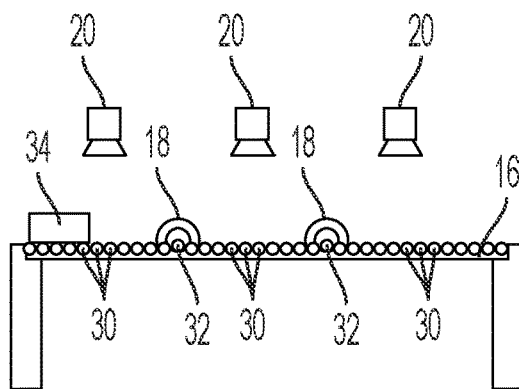
FIGS. 4A-4D show illustrative diagrammatic side views of stages of the object moving in the input station of FIGS. 3A-3D.
Figure 4B:
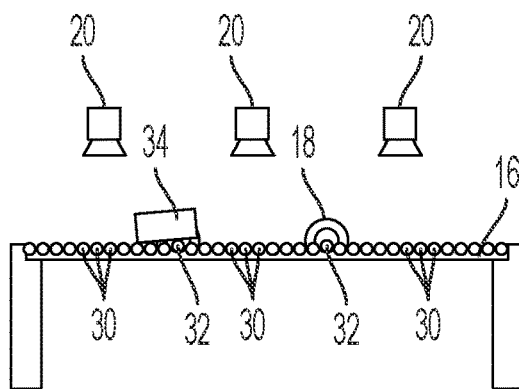
Figure 4C:
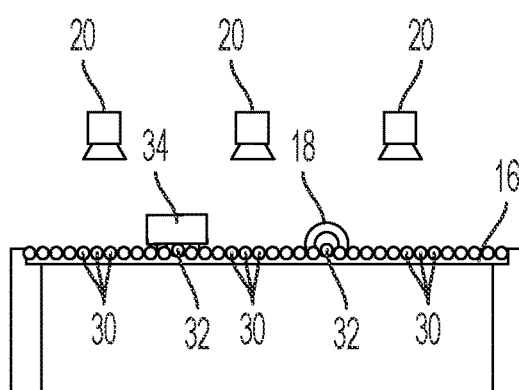
Figure 4D:
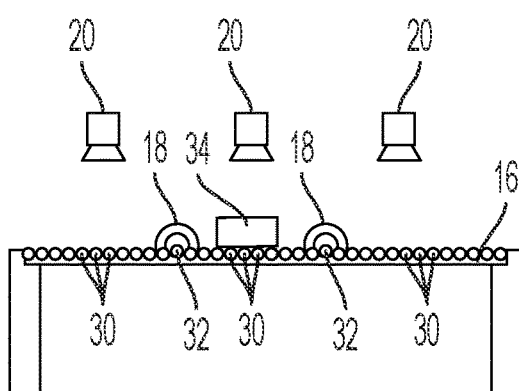
Figure 5:
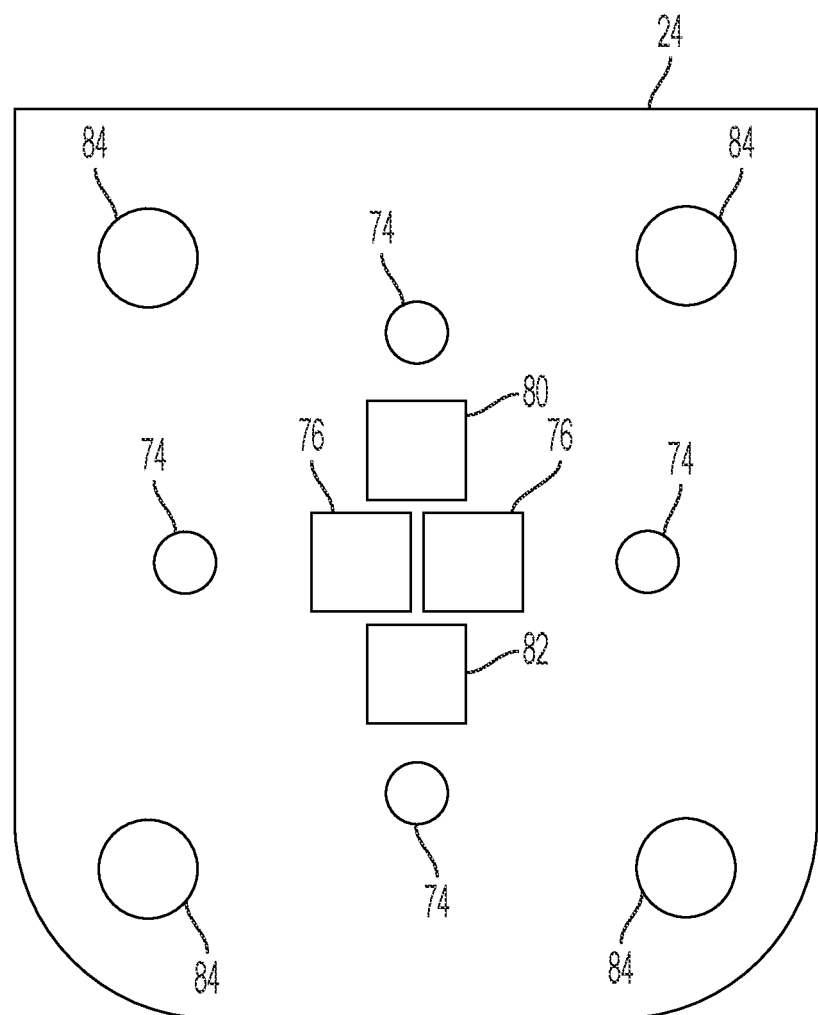
FIG. 5 shows an illustrative diagrammatic underside view of a perception unit of FIG. 1.

With reference to FIGS. 4A-4D, when an object 34 travels along the transport rollers 30, it will contact a perturbation roller 32 (as shown in FIG. 4B). The perturbation roller(s) 32 may be any of a larger diameter roller, or may be raised with respect to the transport rollers 30, and may be rotating at a faster rotational velocity than the transport rollers 30. In this way, and using the perception units 18, 20, the system may determine (together with computer processing system 100) a wide variety of characteristics of the object 34. For example, the rollers 32 may be mounted on force torque sensors (as discussed further below with reference to FIGS. 40A-42C), and the system may determine an estimated weight when the object 34 is determined (using the perception units 18) to be balanced on the roller 32. The roller(s) 32 on force torque sensors may therefore be used to determine an object's weight as it passes over the roller(s).

Further, if the roller(s) 32 are rotating at a faster rotational velocity, the system may determine an inertial value for the object 34 as the roller(s) engage and discharge the object from the roller(s). A wide variety of further characteristics may also be determined or estimated, such as for example, center of mass (COM) using the roller(s) in combination with the perception unit(s) as discussed herein and further below. The system may further use the perception units and roller(s) 32 (together with computer processing system 100)

to determine whether the object is a collapsible bag, and/or whether the presumed object 34 is actually a multi-pick (includes multiple objects), again, using the perception unit(s) in combination with the roller(s) by observing whether the objects move apart and/or whether the shape of the object changes as it rides over the roller(s) 32. In accordance with further aspects of the invention, the transport rollers 30 may be replaced by conveyor sections that stand below the height of the perturbation rollers 32.

The induction system 10 may further include a multi-purpose perception unit 24 positioned above the conveyor 22 (e.g., higher above than units 20) for viewing an object 27 as shown in FIG. 1. The perception unit 24 includes lights 74 as well as one or more perception units 76 (e.g., scanners or cameras) for detecting any identifying indicia (e.g., barcode, QR code, RFID, labels etc.) on objects on the conveyor 22.

Figure 6A:
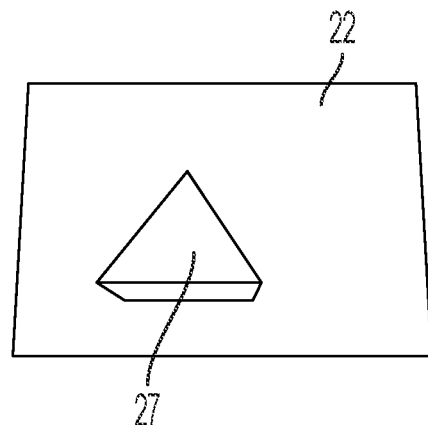
FIGS. 6A-6C show illustrative diagrammatic views of an object from the perception unit of FIG. 5 employing imaging (FIG. 6A), edge detection (FIG. 6B) and volumetric scanning (FIG. 6C)

The perception unit 24 also includes scanning and receiving units 80, 82, as well as edge detection units 84 for capturing a variety of characteristics of a selected object on the conveyor 22. FIG. 6A shows a view from the capture system, and knowing the recorded volume of the view of an empty conveyor 22, the volume of the object 27, $V_{27}$ may be estimated. In particular, the object 27 is volumetrically scanned as shown in FIG. 6C. This volume is compared with recorded data regarding the item that is identified by the identifying indicia as provided by the perception units 18, 20 or the recorded object data.

Figure 6B:
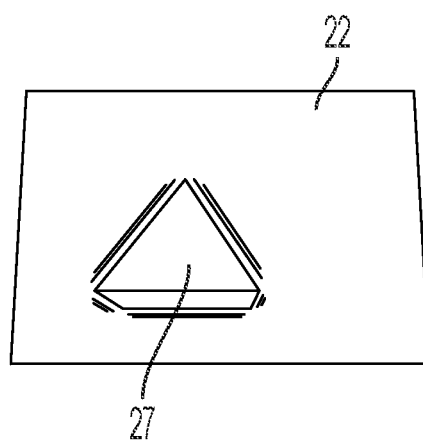
Figure 6C:
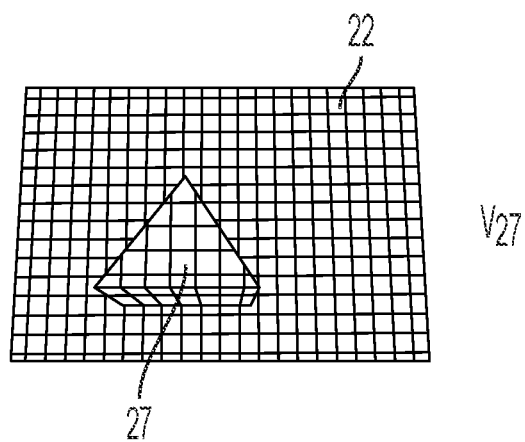

In accordance with further aspects of the invention, the system may additionally employ edge detection sensors 84 that are employed (again together with the processing system 100), to detect edges of any objects in a bin, for example using data regarding any of intensity, shadow detection, or echo detection etc., and may be employed for example, to determine any of size, shape and/or contours as shown in FIG. 6B.

The volumetric scanning may be done using the scanning unit 80 and receiving unit 82 (together with the processing system 100 shown in FIG. 1), that send and receive signals, e.g., infrared signals. With reference to FIG. 6C, the volumetric data may be obtained for example, using any of light detection and ranging (LIDAR) scanners, pulsed time of flight cameras, continuous wave time of flight cameras, structured light cameras, or passive stereo cameras.

As discussed in more detail below with reference to FIGS. 39A-43C, an object's weight may also be determined using weight sensing conveyor sections. For example, weight sensing conveyor section 55 of FIG. 1 may be used to determine a weight (again, as discussed below) of an object 8. As an object is fed through the input station, the object will pass through the response evaluation section 16 and multi-purpose perception unit 24 (e.g., object 28), and may then be evaluated by the weight sensing conveyor section.

With reference again to FIG. 1, the induction system 10 may provide that unidentified objects (as well as objects identified as not being appropriate for processing) 36 are passed through to a conveyor 35 to an exception bin 50. If an object (e.g., 40, 42) is identified as being appropriate for processing, the object is diverted by multi-directional conveyor 33 toward conveyor 38. Conveyor 38 may direct the object(s) toward an infeed conveyor 46 via multi-directional conveyor 44, or the system may determine that that the object (e.g., object 49) should be directed along conveyor 48 toward any of additional processing stations (e.g., similar to processing station 12 but able to handle different types of objects). For example, and as discussed in more detail below, the system may employ multiple processing stations, each able to handle different objects (such as different size or weight ranges of objects).

Figure 7:
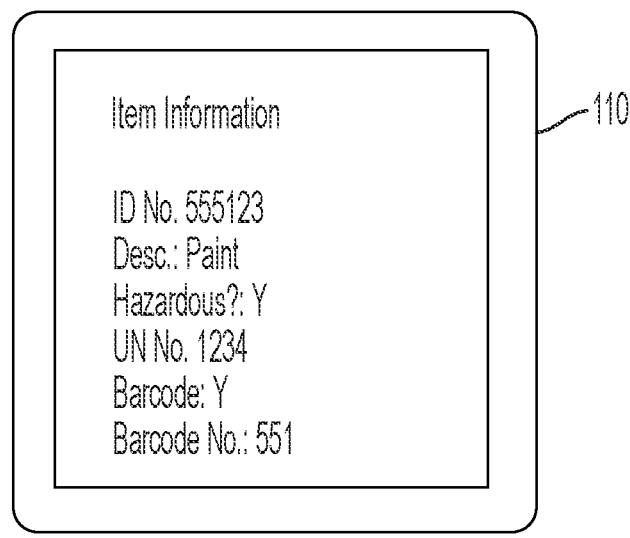
FIG. 7 shows an illustrative diagrammatic view of a label that includes special processing words in accordance with aspect of the system.
Figure 8:
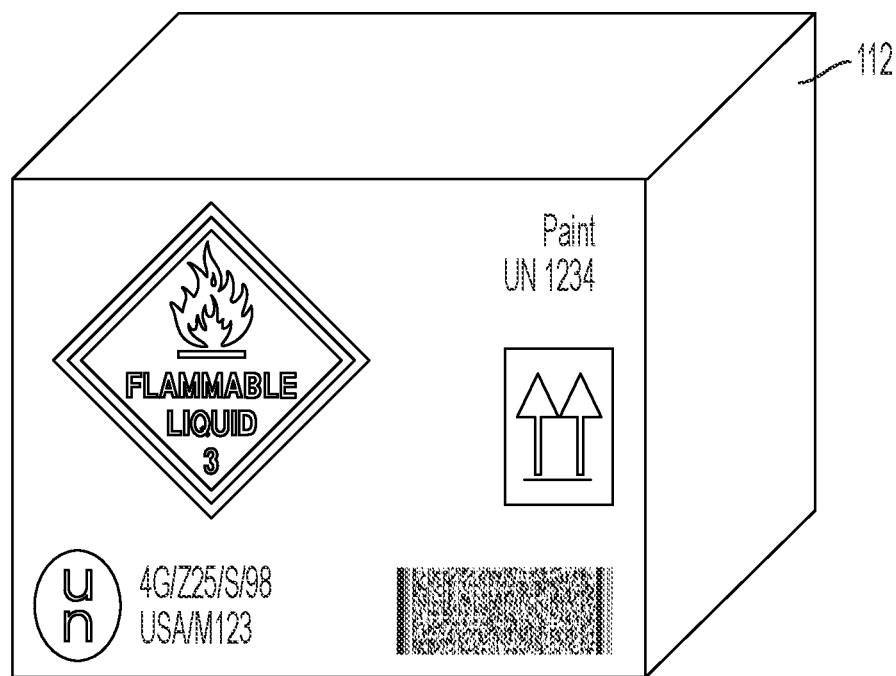
FIG. 8 shows an illustrative diagrammatic view of a labelled object where the label includes special processing image(s) in accordance with an aspect of the system.

In accordance with yet further aspects of the invention, the system may employ optical character recognition (OCR) to read labels and detect, for example, trigger words such as "paint" or "hazardous" or "hazardous?: Y" or "Fragile" as shown at 110 in FIG. 7. In further aspects, the system may identify images, such as trigger images as shown at 112 in FIG. 8, indicating that the contents are flammable, are required to remain upright, or are otherwise hazardous or require specialized handling, making them not suitable for processing by the object processing system 12. The use of such processes permits the detection of objects that are incompatible with the processing system because of their contents as indicated by trigger indicia on an external label. This may involve reading labels as noted above and either not picking the object or moving the object to an exception processing area, or may involve simply identifying the object. For example, if the system includes an object database, the system may recognize indicia (such as a bar code), and then look up information regarding the scanned code (such as that the object contains hazardous material or otherwise needs special processing. In this case, the system will route the object toward an exception area.

Figure 9:
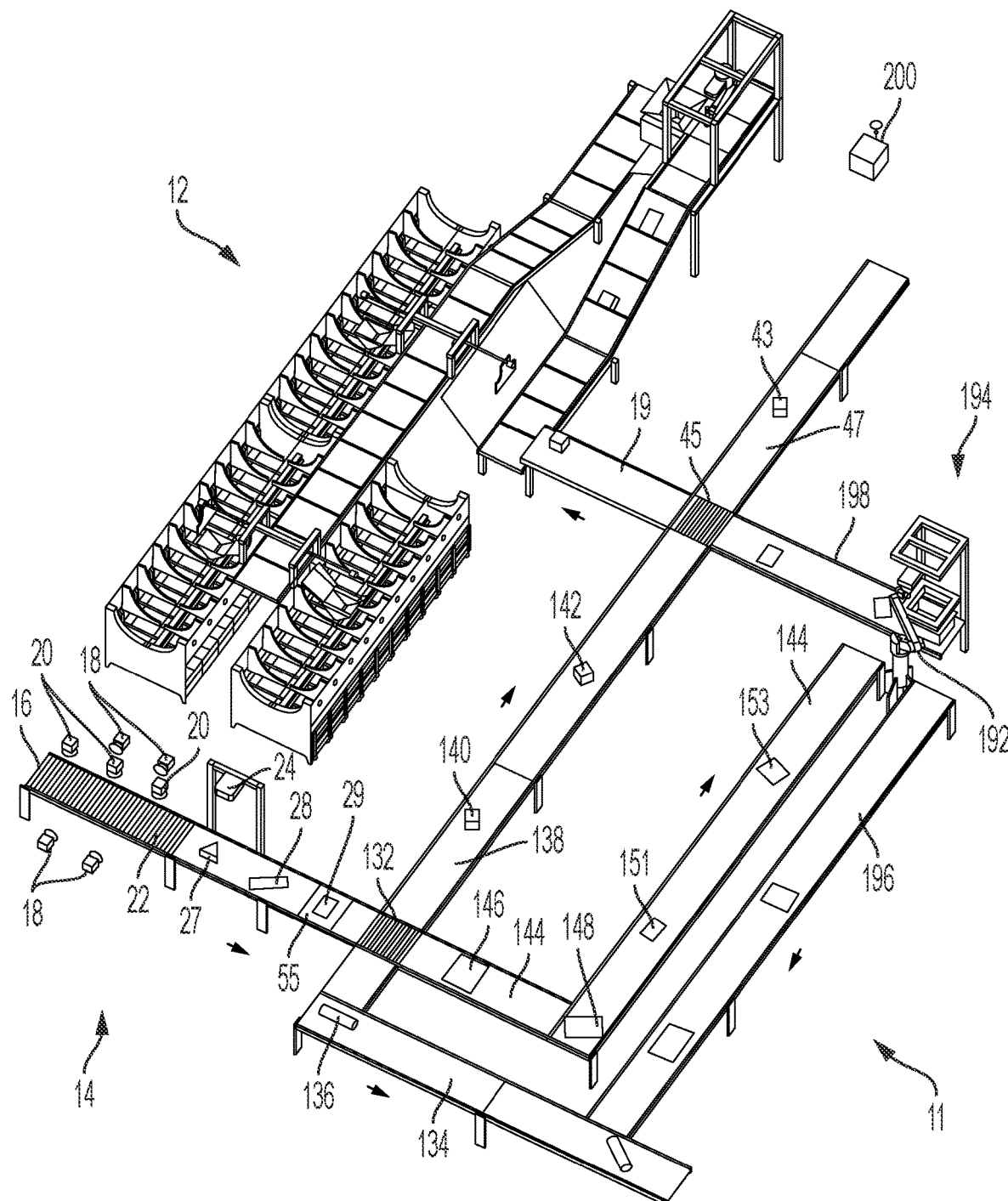
FIG. 9 shows an illustrative diagrammatic view of a processing system and an induction system in accordance with another embodiment of the present invention that includes a deformable object induction limiting system.

FIG. 9 shows an induction system 11 that may provide selected objects to the object processing system 12. The induction system 11 includes an input station 14 as discussed above with reference to FIGS. 1-8 that includes a conveyor 22 (with a response evaluation section 16 including transport rollers 30, perturbation rollers 32, and perception units 18, 20), as well as multipurpose perception unit 24, and weighing conveyor 55 for evaluating objects 34, 27, 28 and 29 as discussed above. Again, the system may, for example, determine which of the infeed objects are provided as bags by observing the object as it passes over a perturbation roller(s) using the perception unit(s), and in particular, observing the rate or amount of change in speed and/or the shape of the object as the object is processed.

In the induction system of FIG. 9, when each object arrives at an infeed multi-directional routing conveyor 132, the object is any of: routed to an out-of-specification conveyor 134 (e.g., object 136), routed to an in-specification conveyor 138 (e.g., objects 140, 142), or routed to bag-processing conveyor 144 (e.g., objects 146, 151, 153). When objects are provided as bags, for example, shipping bags made from polyethylene, it may be more difficult to determine an object's size or other handling parameters. If an object is identified as being a bag (or other flexible, malleable object), such objects (again, e.g., 146, 148, 151, 153) are diverted to a bag-processing system.

Figure 10C:
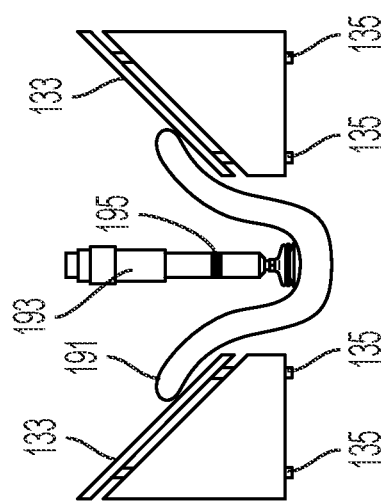
FIGS. 10A-10C show illustrative diagrammatic side views of an object being processed in the deformable object induction limiting system of FIG. 9.
Figure 10B:
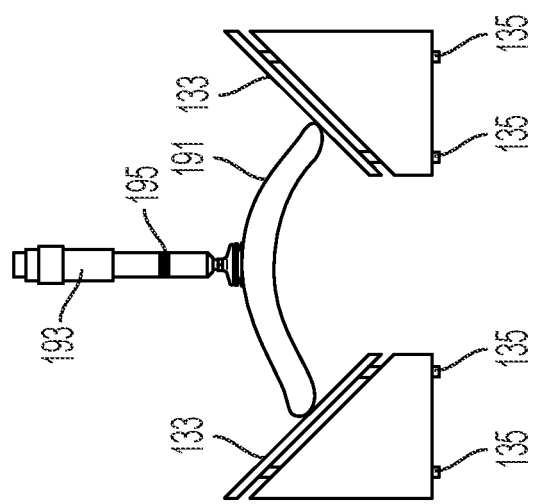
Figure 10A:
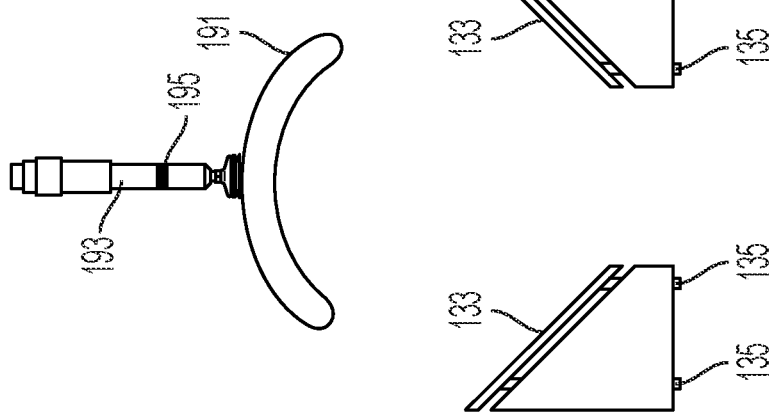

In particular, the conveyor 144 leads to a deformable object induction limiting system 194 that includes a programmable motion device such as an articulated arm 192 having an end effector 193 with a load cell or force torque sensor 195 (shown in FIGS. 10A-10C). In particular, the system will move the end effector 193 with the object 191 into contact with an opening formed by sloped walls 133. If the load cell or force torque sensor 195 detects too much force it (above a sensor threshold) when the object contacts the sloped walls 133, then the system may reject the object for processing. The object would then be placed on a conveyor 196, which joins conveyor 134, leading to an area for objects that are not to be processing by the system 12, such as, for example a collection bin or a manual processing station. The system may thereby limit the acceptance of objects that are deformable but still too rigid for processing by the system 12. Load cells or force torque sensors 135 may also be provided on the sloped walls as shown at 133 instead of or together with the use of the load cell or force torque sensor 195, or at the base of the sloped walls as shown at 135. If, on the other hand, movement of the object 191 into the opening provided by the sloped walls 133 does not trigger any load cell or force torque sensor above a threshold, then the system may move the object 191 to a conveyor 198 that leads to the processing system 12.

If the object 191 is determined to be insufficiently flexible for processing by the object processing system 12 (again with reference to FIG. 9), the object may be placed by the articulated arm 192 onto an out-of-specification conveyor 196 (that may join with conveyor 134). If the object 191 is determined to be sufficiently flexible for processing by the object processing system (or another system coupled thereto as discussed in more detail below), the object 191 is placed by the articulated arm 192 onto conveyor 198 that leads to a bi-directional conveyor 45. If the object is to be processed by object processing system 12, then the object is directed toward conveyor 19, and if the object is to be processed by a further object processing system (as discussed below for example with reference to FIG. 36), the object (e.g., 43) is directed toward a further conveyor 47. Again, the operation is controlled by one or more computer processing systems 200.

Figure 11:
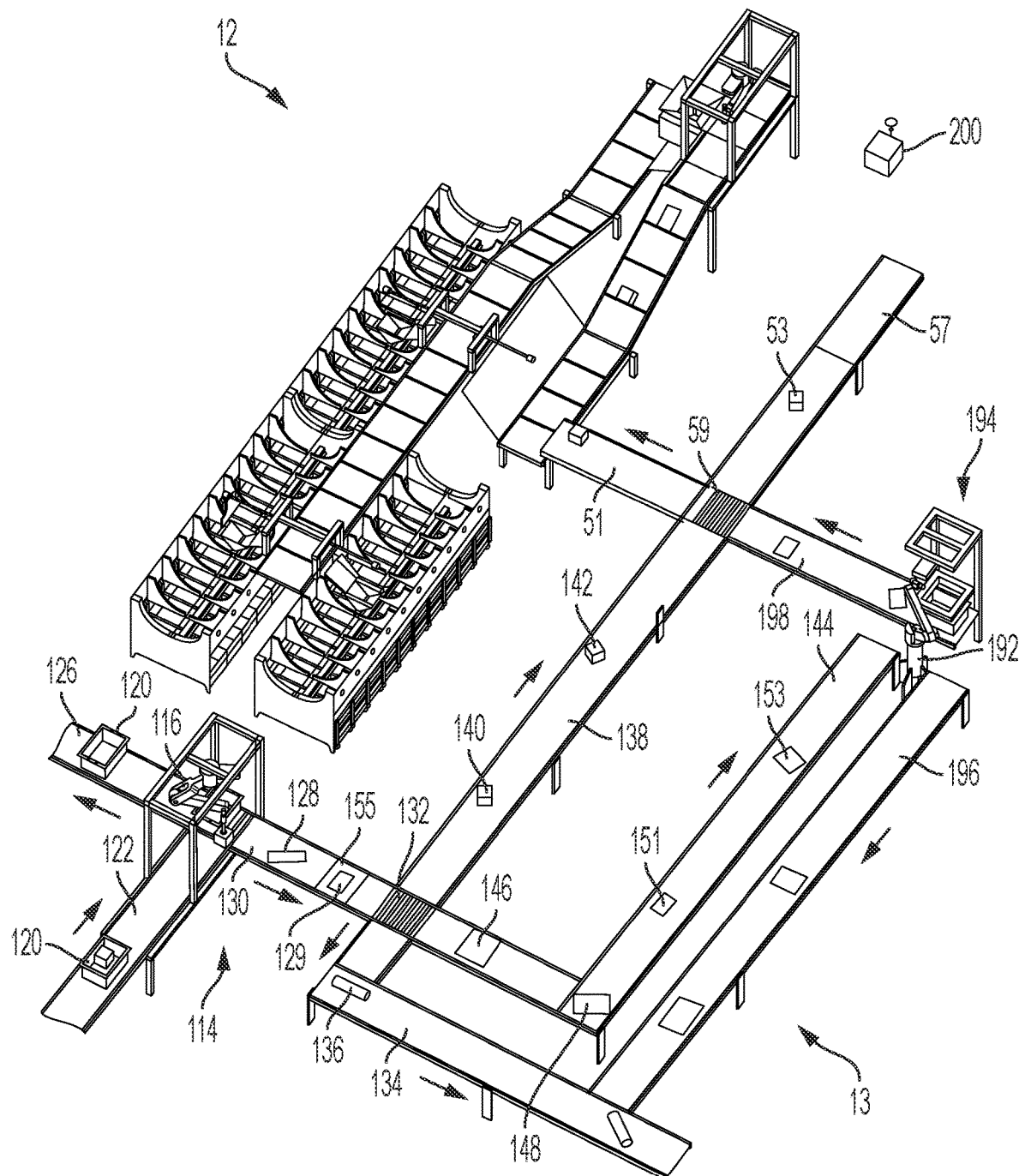
FIG. 11 shows an illustrative diagrammatic view of a processing system and an induction system in accordance with a further embodiment of the present invention that includes a programmable motion device at the input station.

FIG. 11 for example, shows a further induction system 13 in accordance with an embodiment of the present invention that limits or manages packages that are being fed to an object processing system 12. The induction system 13 includes an input station 114 that includes an induction input programmable motion device, such as an articulated arm 116 and end effector 118 (shown in FIGS. 12 and 13) that are designed to be able to grasp and move a wide variety of objects. In particular, the articulated arm 116 may be designed to grasp and move objects that are, for example, too large or too heavy to be handled by the processing system 12, as well as objects that the processing system 12 is designed to handle. Objects (either individually or in bins 120) are provided on an infeed conveyor 122 to the articulated arm 116. Any of a variety of detection units 117 may also be positioned around and directed toward the end effector 118 of the articulated arm 116 as discussed further below.

The input system may, for example, determine which of the infeed objects are provided as bags by observing the object as it is held by the end effector 118 as discussed further below with reference to FIGS. 22A-22D. In the induction system of FIG. 11, when each object (e.g., object 128 on conveyor 130 or object 129 on weight sensing conveyor section 155) arrives at an infeed multi-directional routing conveyor 132, the object is any of: routed to an out-of-specification conveyor 134 (e.g., object 136), routed to an in-specification conveyor 138 (e.g., objects 140, 142), or routed to bag-processing conveyor 144 (e.g., objects 146, 151, 153) as discussed above with reference to FIG. 9. When objects are provided as bags, for example, shipping bags made from polyethylene, it may be more difficult to determine an object's size or other handling parameters. If an object is identified as being a bag (or other flexible, malleable object), such objects (again, e.g., 146, 148, 151, 153) are diverted to a bag-processing system.

Again, the conveyor 144 leads to a deformable object induction limiting system 194 that includes a programmable motion device such as an articulated arm 192 having an end effector with a load cell or force torque sensor (as discussed above with reference to FIGS. 10A-10C). The system will move the end effector with the object into contact with an opening formed by sloped walls. If the load cell or force torque sensor detects too much force it (above a sensor threshold) when the object contacts the sloped walls, then the system may reject the object for processing. The object would then be placed on a conveyor 196, which joins conveyor 134, leading to an area for objects that are not to be processing by the system 12. Again, the conveyor 134 may, for example, lead to a collection bin or a manual processing station. The system may thereby limit the acceptance of objects that are deformable but still too rigid for processing by the system 12. Load cells or force torque sensors may also be provided on the sloped walls instead of or together with the use of the load cell or force torque sensor, or at the base of the sloped walls. If, on the other hand, movement of the object into the opening provided by the sloped walls does not trigger any load cell or force torque sensor above a threshold, then the system may move the object to a conveyor 198 that leads to the processing system 12.

If the object is determined to be insufficiently flexible for processing by the object processing system 12, the object may be placed by the articulated arm 192 onto an out-of-specification conveyor 196 (again, that may join with conveyor 134). If the object is determined to be sufficiently flexible for processing by the object processing system (or another system coupled thereto as discussed in more detail below), the object is placed by the articulated arm 192 onto conveyor 198 that leads to a bi-directional conveyor 59. If the object is to be processed by object processing system 12, then the object is directed toward conveyor 51, and if the object is to be processed by a further object processing system (as discussed below for example with reference to FIG. 37), the object (e.g., 53) is directed toward a further conveyor 57. Again, the operation is controlled by one or more computer processing systems 200.

Figure 12:
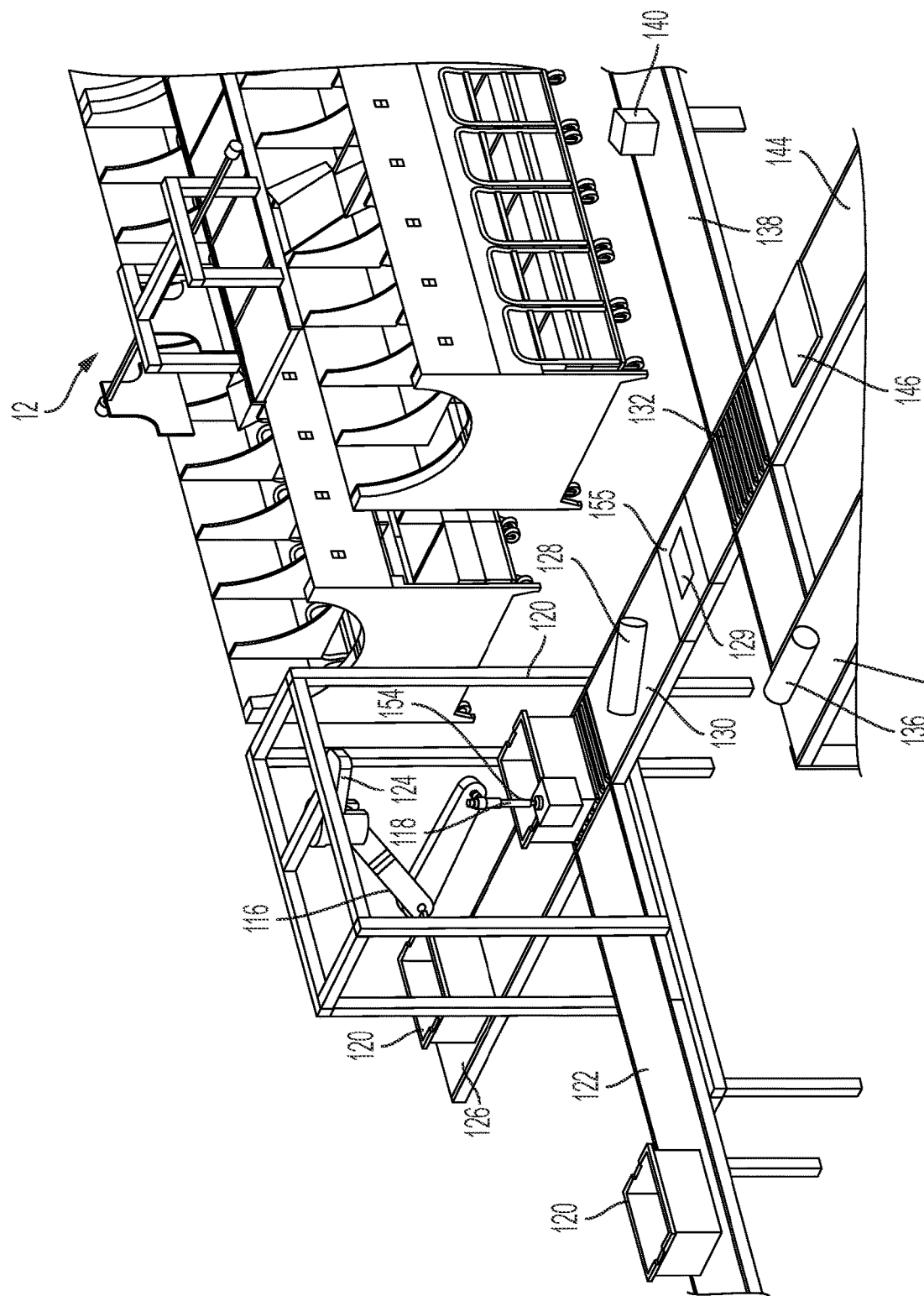
FIG. 12 shows an illustrative diagrammatic view of the input station of the system of FIG. 11.
Figure 13:
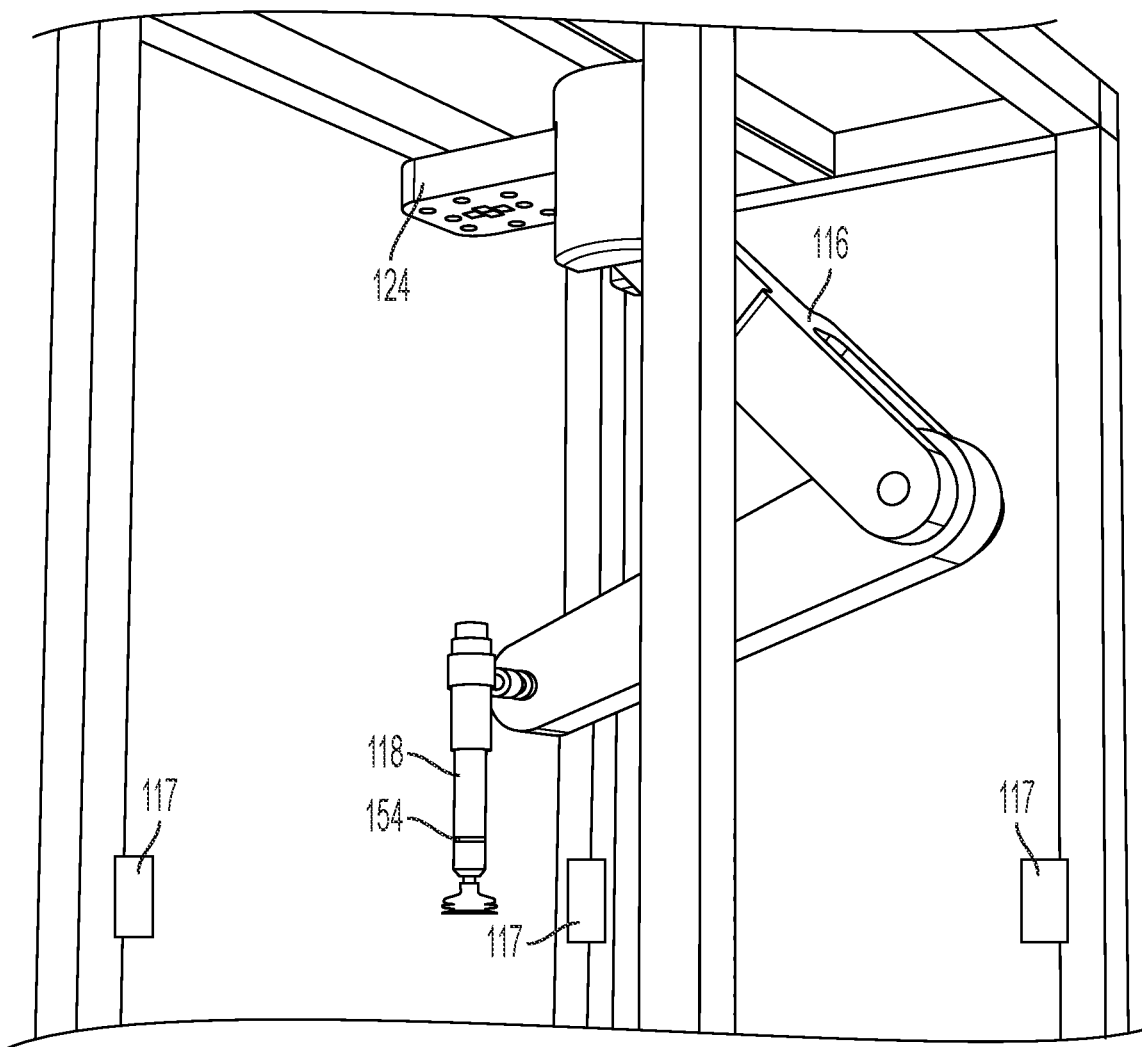
FIG. 13 shows an illustrative diagrammatic view of the programmable motion device of the input station of FIGS. 11 and 12, including additional optional engaged-object perception units (not shown in FIGS. 11 and 12)

With reference to FIGS. 12 and 13, a perception system 124 captures perception data regarding the objects (whether or not in bins 120) that are below the perception system 124. Objects 128 are identified by the perception system 124, then grasped and are placed on routing conveyor 130. Emptied bins 120 are routed along an empty bin conveyor 126. The placement location of the objects on the conveyor 130 is noted (and again each of the conveyors may be a cleated conveyor). With reference to FIG. 11, when each object arrives at an infeed-diverter 132, the object is either: routed to an out-of-specifications conveyor 134 (e.g., object 136), routed to an in-specifications conveyor 138 (e.g., objects 140, 142), or routed to bag-processing conveyor 144 (e.g., objects 146, 148, 151, 153). The conveyor 130 may also include a weight sensing conveyor section 155 for determining the weight of objects 129 as discussed below with reference to FIGS. 39A-43C. The end effector 118 may further include a force torque sensor 154 for determining a weight of an object being held by the end effector 118 as discussed further below with reference to FIGS. 44 and 45 and/or an internal air pressure and/or air flow sensor as discussed further below with reference to FIG. 46.

Again, when objects are provided as bags, for example, shipping bags made from, e.g., polyethylene, it may be more difficult to determine an object's size and handling parameters. If an object is identified as a bag (or other flexible, malleable object), such objects (again e.g., 146, 148, 151, 153) are diverted to a bag-processing system as discussed further above. The end effector 118 may also include a load cell or force torque sensor 154 (as discussed in more detail below with reference to FIGS. 44 and 45) for determining a weight of an object being grasped, and in further aspects, the conveyor 30 may include a weighing section 155 (again, as discussed below with reference to FIGS. 39A-43C), at which each object may be weighed.

Figure 14:
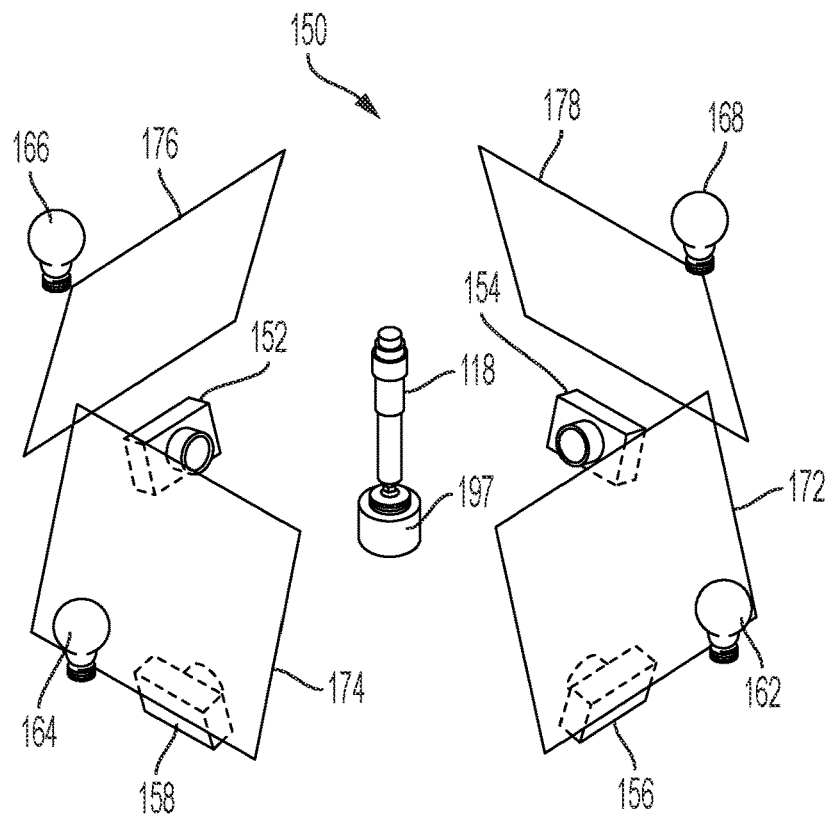
FIG. 14 shows an illustrative diagrammatic view of a grasped object with the additional optional engaged-object perception units of FIG. 13.
Figure 15:
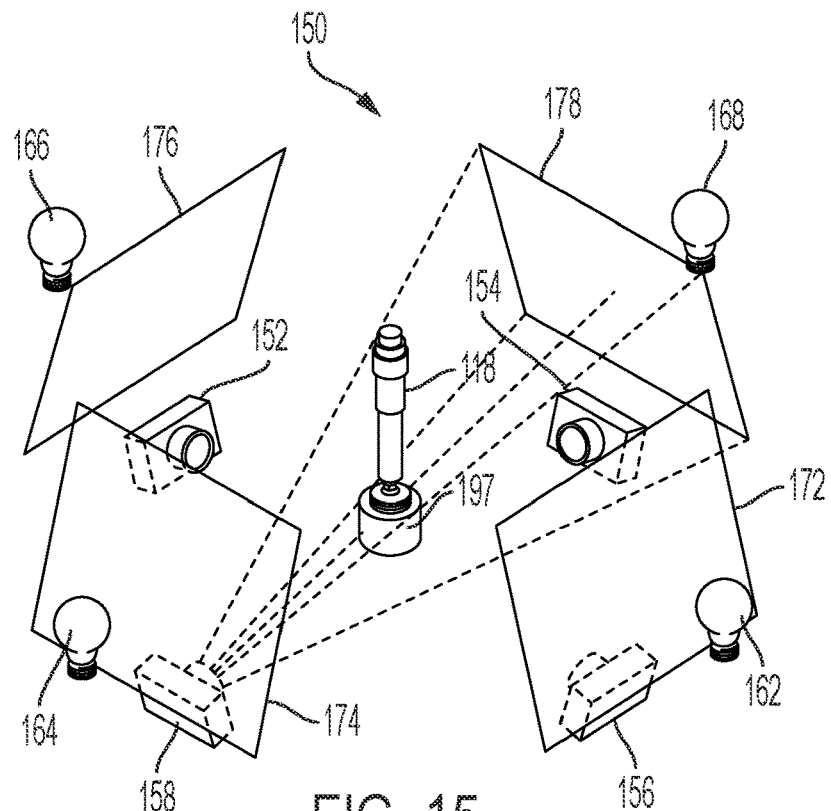
FIG. 15 shows an illustrative diagrammatic view of the grasped object of FIG. 14 with a set of illumination sources and perception units engaged in accordance with an aspect of the invention.
Figure 16:
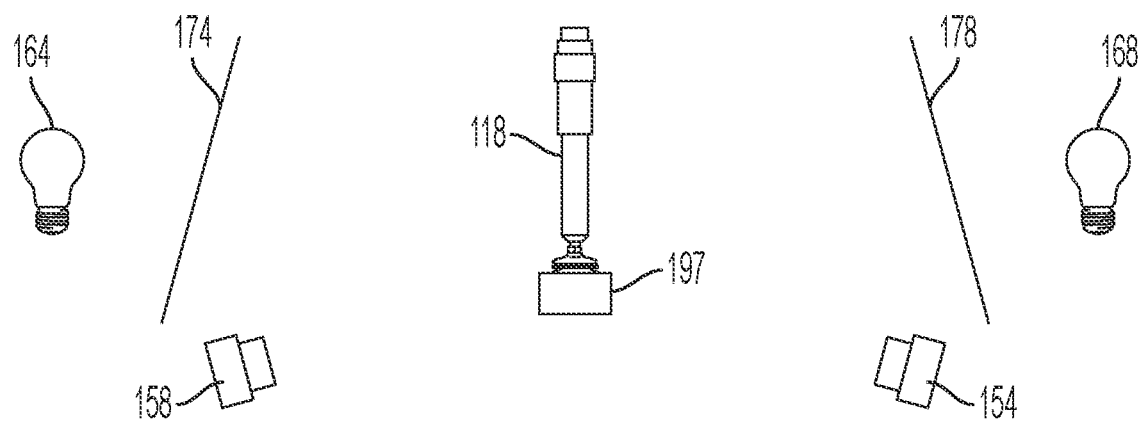
FIG. 16 shows an illustrative diagrammatic side view of the system of FIG. 14 showing two sets of perception units.
Figure 17:
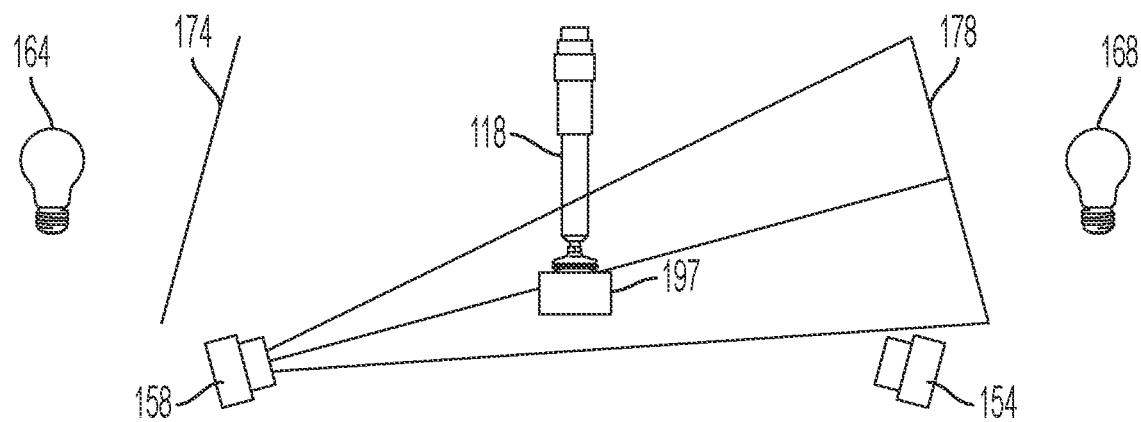
FIG. 17 shows an illustrative diagrammatic side view of the system of FIG. 15 showing the two sets of perception units shown in FIG. 16.

In accordance with further aspects, the system may estimate a volume of an object while the object is being held by the end effector. In particular, the system may estimate a volume of picked item while being held by gripper, and compare the estimated volume with a known volume. One approach is to estimate the volume of the one or more items while the gripper is holding the object 197 (or objects). With reference to FIGS. 14 and 15, in such as a system 150, one or more perception units 152, 154, 156, 158 (e.g., cameras or 3D scanners) are placed around a scanning volume. With further reference to FIGS. 16 and 17, opposite each perception unit is an illumination source 162, 164, 166, 168 as well as a diffusing screen 172, 174, 176, 178 in front of each illumination source.

As shown in FIG. 17, perception data regarding the object 197 as backlit by the illumination source (e.g., 168) and diffuser (e.g., 178) will be captured by each perception unit (e.g., 158). In accordance with various aspects, three perception units may be used, spaced apart by one hundred twenty degrees, and in accordance with further aspects, fewer perception units may be used (e.g., one or two), and the object may be rotated between data acquisition captures.

The scanning volume may be the volume above the area where the items are picked from; or the scanning volume may be strategically placed in between the picking location and the placing location to minimize travel time. Within the scanning volume, the system takes a snapshot of the volume of items held by the gripper. The volume could be estimated in a variety of ways depending on the sensor type as discussed above.

For example, if the sensors are cameras, then two or more cameras may be placed in a ring around the volume, directed slightly upward towards at a backlighting screen (as discussed above) that may be in the shape of sections of a torus, where the gripped volume is held in between all the cameras and the brightly lit white screen. The brightly lit screen backlights the one or more held objects, so that the interior volume is black. Each perception unit and associated illumination source may be activated in a sequence so that no two illumination sources are on at the same time. This allows easy segmentation of the held volume in the image.

The illumination may be provided as a particular wavelength that is not present in the room, or the illumination may be modulated and the detector may demodulate the received perception data so that only illumination from the associated source is provided. The black region once projected back into space, becomes a frustum and the objects are known to lie within a solid frustum. Each camera generates a separate frustum, with the property that the volume of the items is a subset of all of the frustums. The intersection of all the frustums yields an upper bound on the volume of the object(s). The addition of a camera improves the accuracy of the volume estimate. The gripper may be visible within the cameras, and because its position is known, its volume can be subtracted out of the frustum or volume estimate.

In accordance with other aspects, 3D scanners may be used that obtain 3D images of the scanning volume, then the volume estimates are obtained in a similar way by fusing together the point clouds received from each sensor, but without the need for segmenting the images from the background using backlighting. Each 3D scanner returns a 3D image, which for each pixel in the image returns a depth, and again, may use any of light detection and ranging (LIDAR) scanners, pulsed time of flight cameras, continuous wave time of flight cameras, structured light cameras, or passive stereo cameras, etc.

Figure 18:
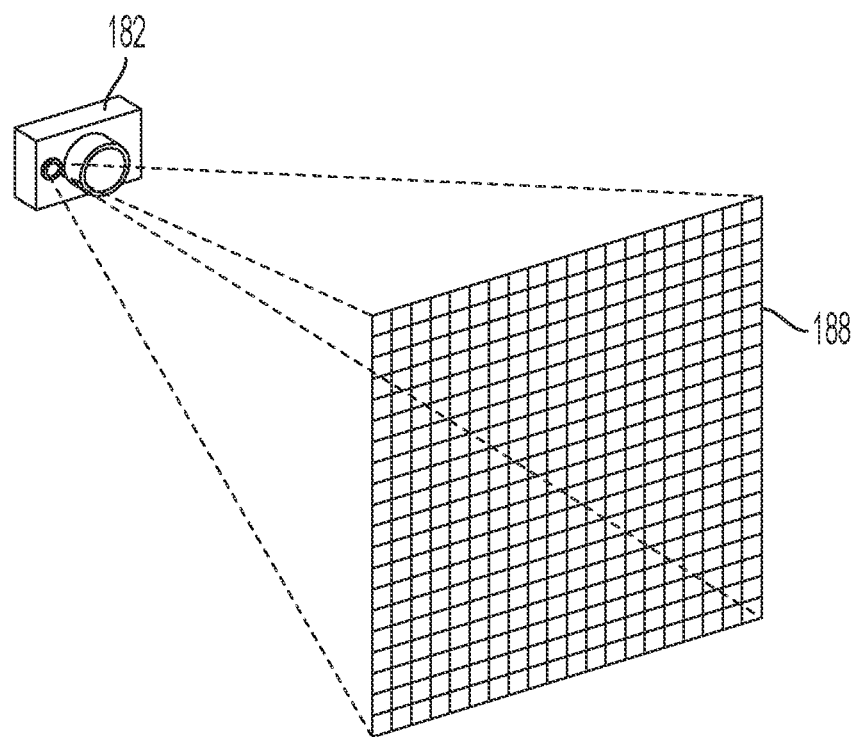
FIG. 18 shows an illustrative diagrammatic view of a 3D scanner system for use in accordance with another aspect of the invention.
Figure 19:
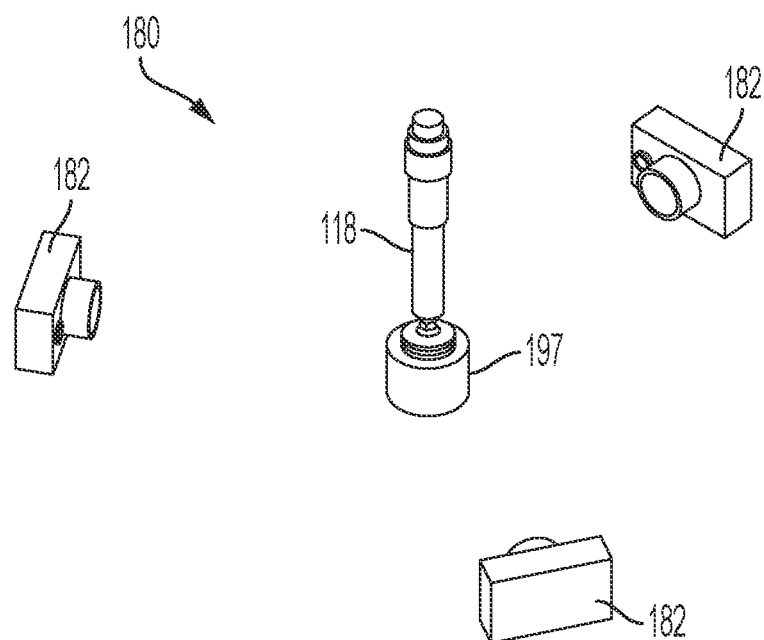
FIG. 19 shows an illustrative diagrammatic view of a plurality of 3D scanner systems being used in accordance with a further aspect of the invention.
Figure 20:
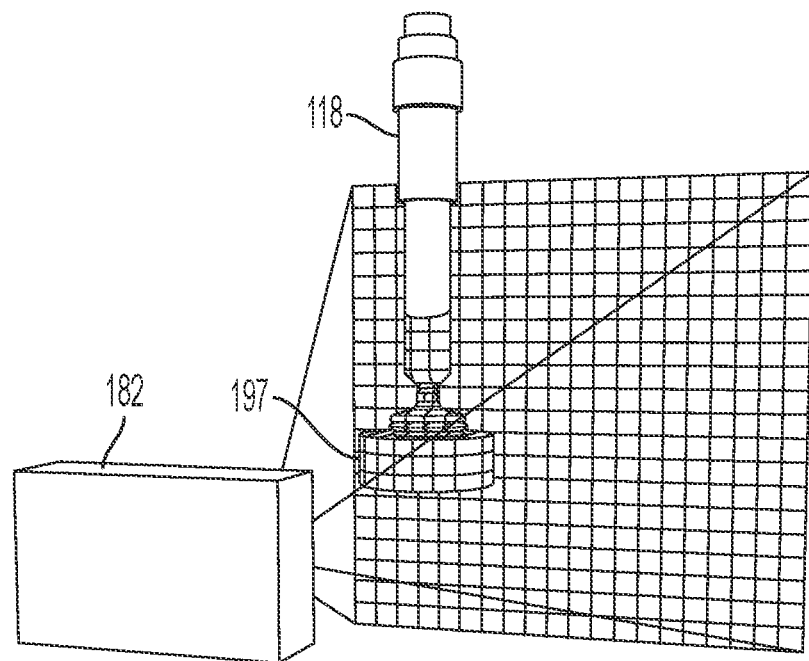
FIG. 20 shows an illustrative diagrammatic view of a 3D scan process of an end effector grasping an object.
Figure 21:
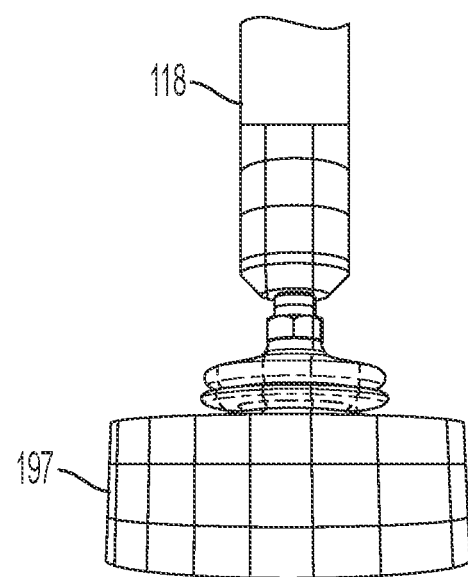
FIG. 21 shows an illustrative diagrammatic view of a net 3D scan of an object and a portion of the end effector that is grasping the object, showing the portion of the 3D scan of the end effector that will be removed.

FIG. 18, for example, shows a 3D scanner 182 that projects a grid 188 onto a field of view. The 3D scanner 182 may be used in a system 180 as shown in FIG. 19 together with one, two, or three other 3D scanners (two others are shown at 184, 186). The 3D scanners are directed toward a common volume in which the object 197 is positioned while attached to the end effector 118. Again, with three such 3D scanners, the scanners may be positioned one hundred twenty degrees apart (ninety degrees apart if four are used, and opposing each other if only two are used). With reference to FIGS. 20 and 21, each 3D scanner (e.g., 182) captures 3D data regarding the object 197. Again, the volume of the end effector may be removed from the captured data.

Figure 22B:
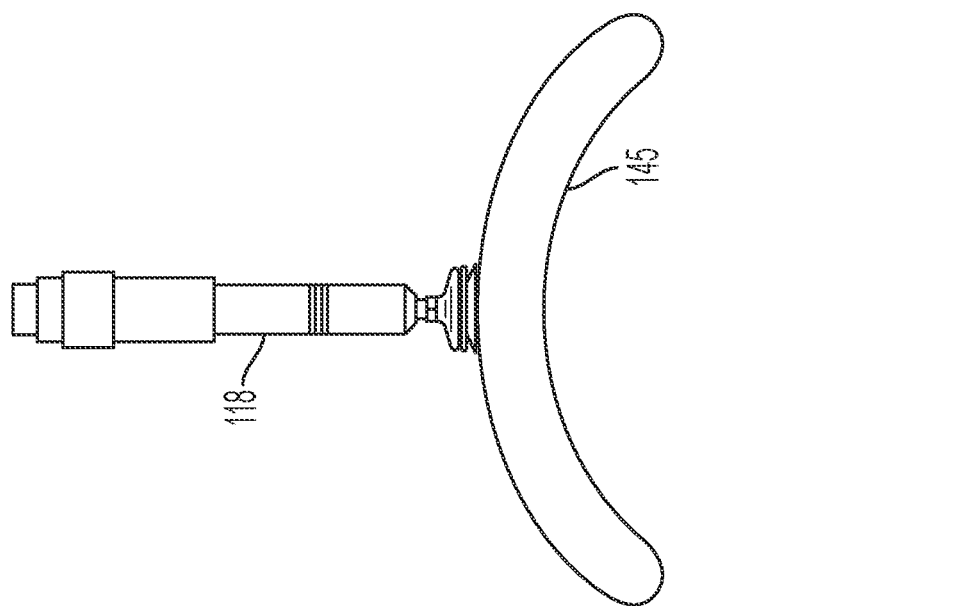
FIGS. 22A-22D show illustrative diagrammatic views of an object being subjected to deformability testing in accordance with an aspect of the invention.
Figure 22A:
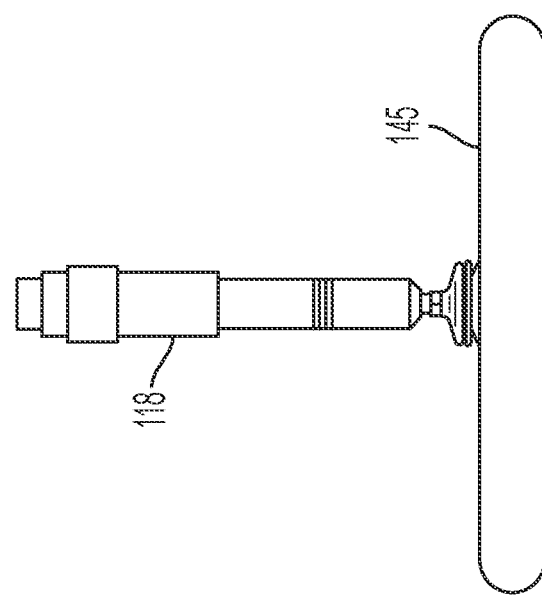
Figure 22C:
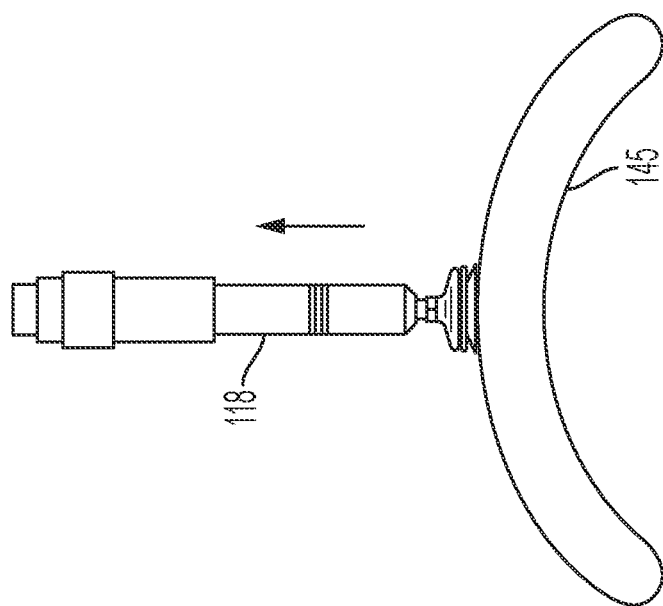
Figure 22D:
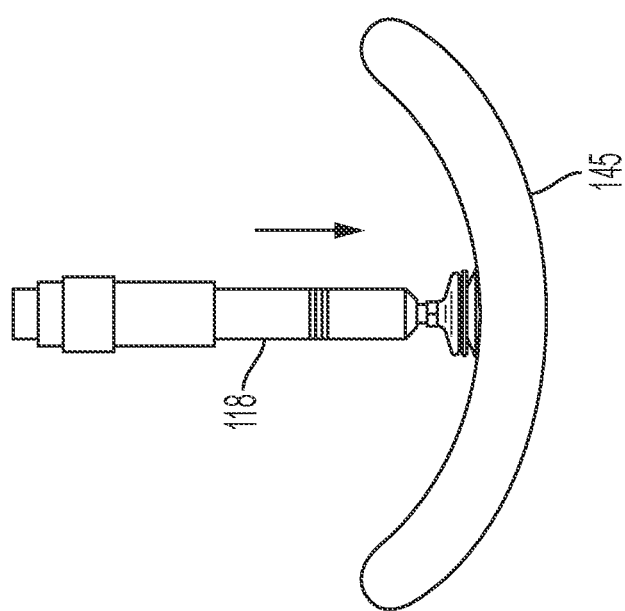

In accordance with further aspects, the system may detect changes in object shape when an object is jostled. This may be done when an object is first lifted (for example at the input station 114 in FIG. 11 and/or at the deformable object induction limiting system 194 in FIGS. 9 and 11). With reference to FIGS. 22A-22D, when an object (e.g., 145) is lifted from a bin or conveyor by the end effector 118, the object 145 may be held as shown in FIG. 22B, and then subjected to a quick shake motion as shown in FIGS. 22C and 22D. If the shape of the object changes (beyond, for example, 2%, 5% or 10%), then the object may be classified as being a deformable object such as a polyethylene shipping bag. The scanning may be done by any of the above discussed volumetric scanning, edge detection, LIDAR, and camera image analysis systems. If the object is determined to be a deformable object, it is routed to the conveyor 44 as discussed above.

Again, the conveyor 144 leads to a deformable object induction limiting system 194. The deformable object induction limiting system 194 includes a programmable motion device such as an articulated arm 192 having an end effector 193 with a load cell or force torque sensor 195 (shown in FIGS. 10A-10C). In particular, the system will move the end effector 193 with the object into contact with an opening formed by sloped walls 133. If the load cell or force torque sensor 195 detects too much force it (above a sensor threshold) when the object contacts the sloped walls 133, then the system may reject the object for processing. The object would then be placed on a conveyor 196, which joins conveyor 134, leading to an area for objects that are not to be processing by the system 12. The system may thereby limit the acceptance of objects that are deformable but still too rigid for processing by the system 12. Load cells or force torque sensors may also be provided on the sloped walls as shown at 133 instead of or together with the use of the load cell or force torque sensor 195, or at the base of the sloped walls as shown at 135. If, on the other hand, movement of the object 145 into the opening provided by the sloped walls 133 does not trigger any load cell or force torque sensor above a threshold, then the system may move the object 145 to a conveyor 198 that leads to the processing system 12.

The processing system 12, for example, may include an infeed area 201 into which objects may be provided by the processing infeed conveyor (e.g., 46, 19, 51). An infeed conveyor 202 conveys objects from the infeed area 201 to an intermediate conveyor 204 at a processing station 206. The infeed conveyor 202 may include cleats for assisting in lifting the objects from the input area 200 onto the intermediate conveyor 204.

Figure 23:
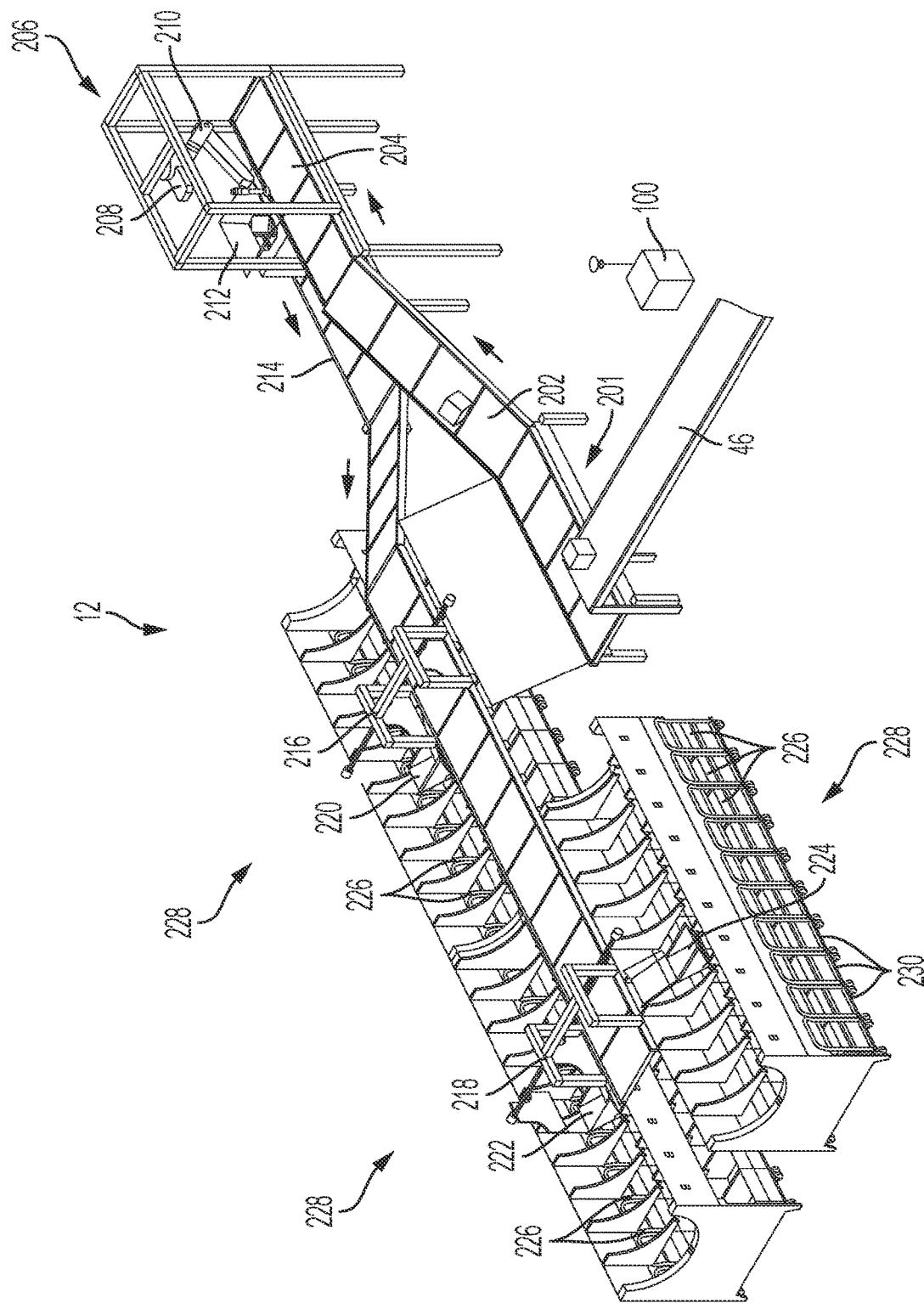
FIG. 23 shows an illustrative diagrammatic view of an object processing system for use with a pre-processing system in accordance with an aspect of the invention.

The processing station 206 also includes a grasp perception system 208 that views the objects on the intermediate conveyor 204, and identifies grasp locations on the objects as further shown in FIG. 23. The processing station 206 also includes a programmable motion device 210, such as an articulated arm, and a primary perception system 212 such as a drop perception unit. The grasp perception system 212 surveys the objects to identify objects when possible, and to determine good grasp points. The object is then grasped by the device 210, and dropped into the drop perception system 212 to ensure that the object is accurately identified. The object then falls through the primary perception system 212 onto a primary transport system 214, e.g., a conveyor. The primary transport system 214 carries the objects past one or more diverters 216, 218 that may be engaged to divert an object off of the primary transport system 214 into any of carriages 220, 222, 224 (when the respective carriage is aligned with the diverter) or into the input area 200. Each of the carriages 220, 222, 224 is reciprocally movable along a track the runs between rows of destination stations 226 of shuttle sections 228 (as discussed below in more detail).

Figure 24:
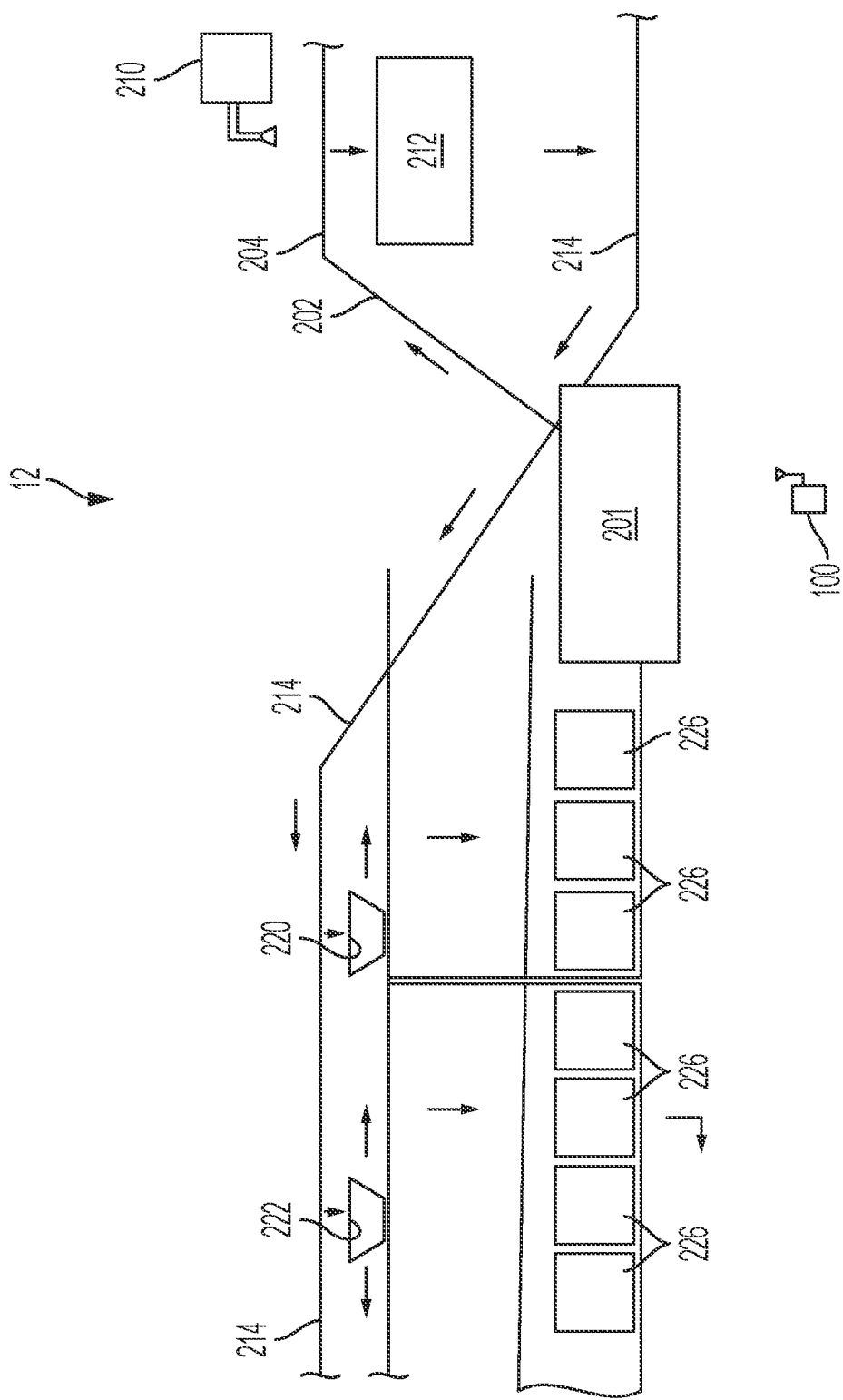
FIG. 24 shows an illustrative diagrammatic side view of the object processing system of FIG. 23.

The flow of objects is diagrammatically shown in FIG. 24, which shows that objects move from the infeed area 201 to the intermediate conveyor 204. The programmable motion device 210 drops the objects into the drop perception unit 212, and the objects then land on the primary transport system 214. The objects are then conveyed by the primary transport system 214 to diverters that selectively divert objects to carriages (e.g., 220, 222, 224). The carriages bring the objects to one of a plurality of destination stations 226 (e.g., a processing box or a processing bin) and drops the object into the appropriate destination station. When a destination station is full or otherwise complete, the destination station is moved to an output conveyor.

Figure 25:
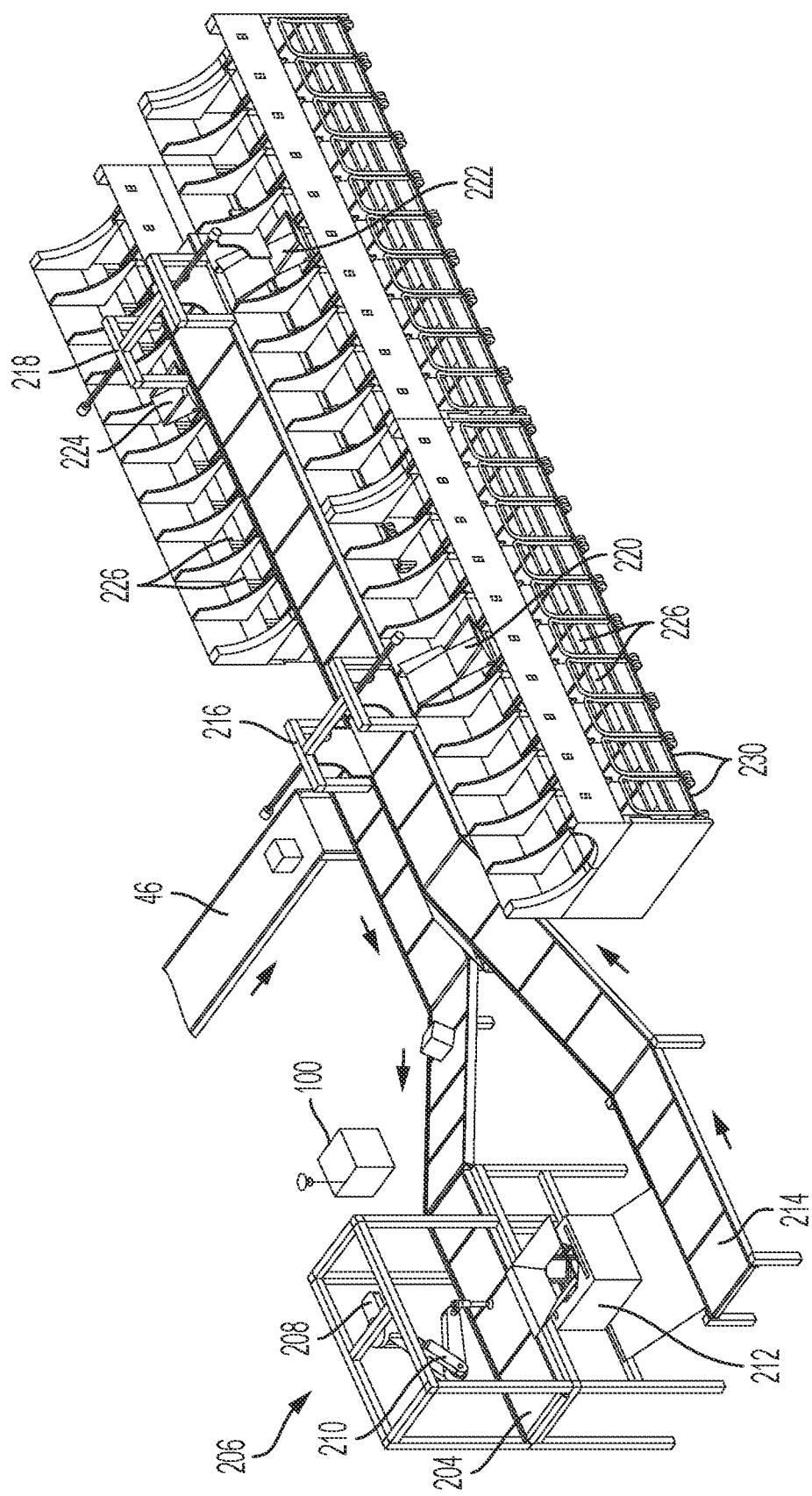
FIG. 25 shows an illustrative diagrammatic rear view of the object processing system of FIG. 23.

FIG. 25 shows a rear view of the system of FIG. 23 that more clearly shows the programmable motion device and the drop perception system. The primary transport system 214 may be a cleated conveyor and the objects may be dropped onto the cleated conveyor such that one object is provided per cleated section. The speeds of the conveyors 202 and 214 may also be controlled to assist in providing a singulated stream of objects to the diverters 216, 218. The system may operate using a computer processing control system 200 that communicates with the conveyor control systems, the perception units, the programmable motion devices, the diverters, the box or bin removal systems, and any and all sensors that may be provided in the system.

Figure 26:
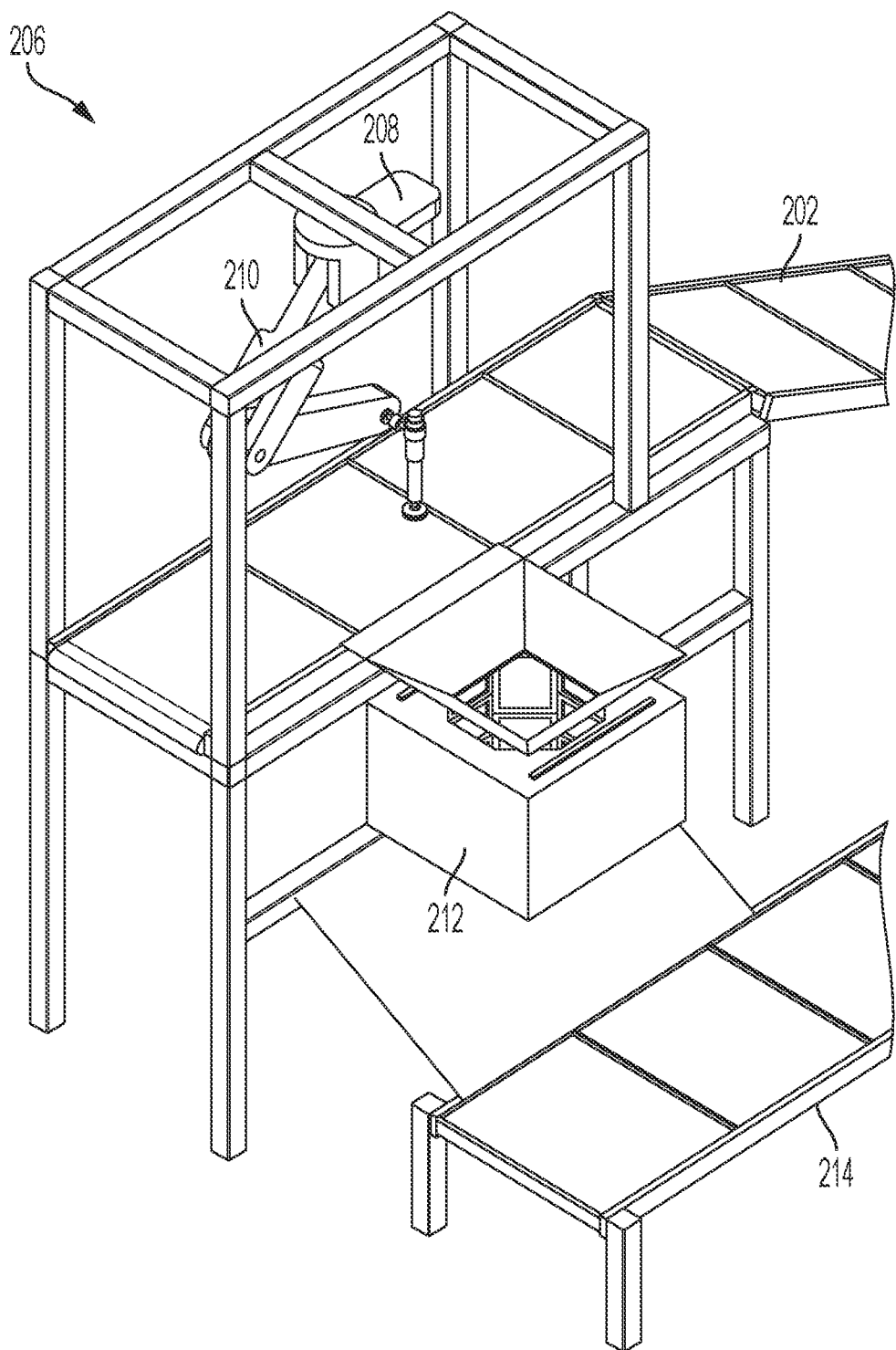
FIG. 26 shows an illustrative diagrammatic view of the processing station in the object processing system of FIG. 23.

With reference to FIG. 26, the processing station 206 includes a grasp perception system 208 that is mounted above the intermediate conveyor 204, which provides objects to be processed. The grasp perception system 20, for example, may include (on the underside thereof), a camera, a depth sensor and lights. A combination of 2D and 3D (depth) data is acquired. The depth sensor may provide depth information that may be used together with the camera image data to determine depth information regarding the various objects in view. The lights may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

The programmable motion device 210 may include a robotic arm equipped with sensors and computing, that when combined is assumed herein to exhibit the following capabilities: (a) it is able to pick objects up from a singulated stream of objects using, for example, an end effector; (b) it is able to move the object to arbitrary places within its workspace; and, (c) it is able to generate a map of objects that it is able to pick, represented as a candidate set of grasp points in the workcell, and as a list of polytopes enclosing the object in space. The allowable objects are determined by the capabilities of the robotic system. Their size, weight and geometry are assumed to be such that the robotic system is able to pick, move and place them. These may be any kind of ordered goods, packages, parcels, or other articles that benefit from automated processing.

The correct processing destination is determined from the symbol (e.g., barcode) on the object. It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers, which identify the object.

Once grasped, the object may be moved by the programmable motion device 210 to a primary perception system 212 (such as a drop scanner). The object may even be dropped into the perception system 212. In further aspects, if a sufficiently singulated stream of objects is provided on the intermediate conveyor 204, the programmable motion device may be provided as a diverter (e.g., a push or pull bar) that diverts object off of the intermediate conveyor into the drop scanner. Additionally, the movement speed and direction of the intermediate conveyor 204 (as well as the movement and speed of infeed conveyor 202) may be controlled to further facilitate providing a singulated stream of objects on the intermediate conveyor 204 adjacent the drop scanner.

Figure 27:
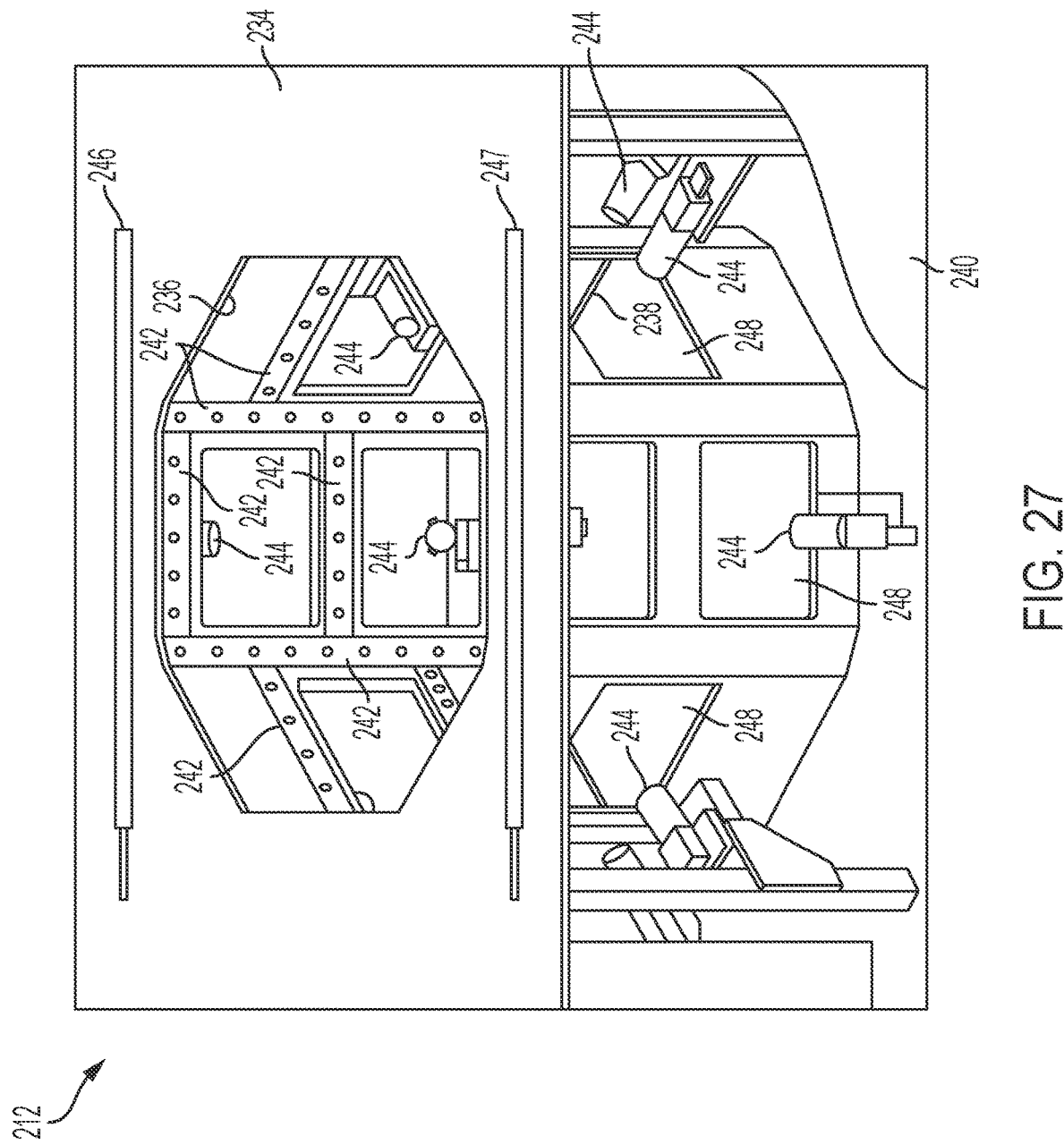
FIG. 27 shows an illustrative diagrammatic front view of a primary perception system in the object processing system of FIG. 23.

As further shown in FIG. 27, the primary perception system 212 may include a structure 234 having a top opening 236 and a bottom opening 238, and may be covered by an enclosing material 240. The structure 234 includes a plurality of sources (e.g., illumination sources such as LEDs) 242 as well as a plurality of image perception units 244 (e.g., cameras) 244. The sources 242 may be provided in a variety of arrangements, and each may be directed toward the center of the opening. The perception units 244 are also generally directed toward the opening, although some cameras are directed horizontally, while others are directed upward, and some are directed downward. The system 212 also includes an entry source (e.g., infrared source) 246 as well as an entry detector (e.g., infrared detector) 247 for detecting when an object has entered the perception system 212. The LEDs and cameras therefore encircle the inside of the structure 234, and the cameras are positioned to view the interior via windows that may include a glass or plastic covering (e.g., 248).

In accordance with certain aspects, the invention provides the ability to identify via barcode or other visual markings of objects by employing a perception system into which objects may be dropped. Automated scanning systems would be unable to see barcodes on objects that are presented in a way that their barcodes are not exposed or visible. The system 212 therefore is designed to view an object from a large number of different views very quickly, reducing or eliminating the possibility of the system 212 not being able to view identifying indicia on an object.

Following detection by the perception unit 212, the object is now positively identified and drops onto the primary transport system 214 (e.g., a conveyor). With reference again to FIGS. 23 and 25, the primary transport system 214 moves the identified object toward diverters 216, 218 that are selectively engageable to divert the object off of the conveyor into any of carriages 220, 222, 224 or (if the object was not able to be identified), the object may be either returned to the input area 200 or it may be dropped off of the end of the conveyor 214 into a manual processing bin. Each carriage 220, 224, 226 is reciprocally movable among destination bins 230 of one of a plurality of destination sections 228. Efficiencies in space may be provided in accordance with certain aspects by having objects first move from the input area 201 along the infeed conveyor 202 in a direction that a horizontal component and a vertical component. The object then drops through the drop scanner 212 (vertically) and lands on the primary transport conveyor 214, which also moves the object in a direction that has a horizontal component (opposite in direction to that of the infeed conveyor 202) and a vertical component. The object is then moved horizontally by a carriage 220, 222, 224, and dropped (vertically) above a target destination station 230, such as a destination bin.

Figure 28A:
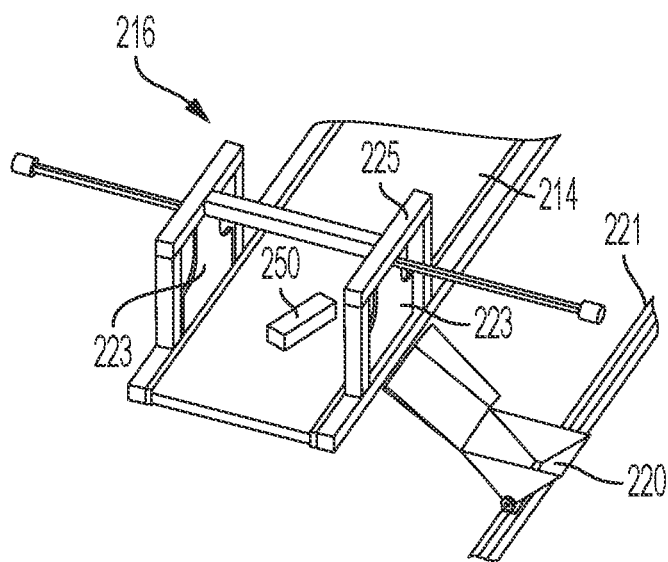
FIGS. 28A-28C show an illustrative diagrammatic views of a diverting station in the object processing system of FIG. 23 showing an object on a conveyor (FIG. 28A), engaged by a diverting paddle (FIG. 28B), and discharging the object into a carriage (FIG. 28C)
Figure 28B:
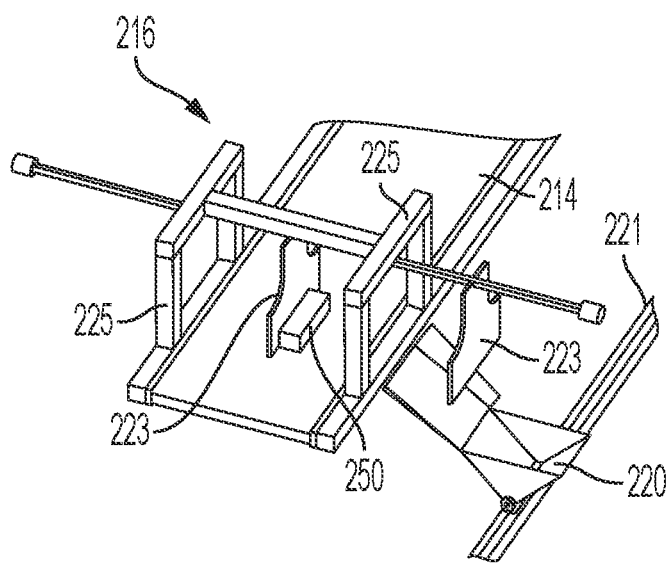
Figure 28C:
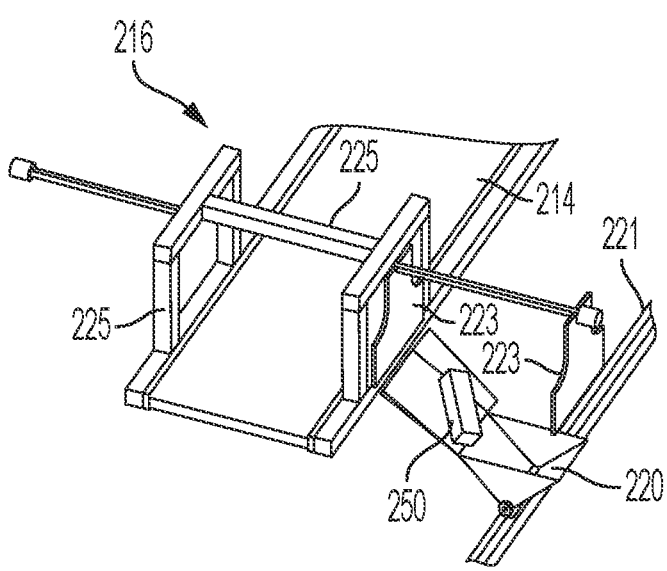

With reference to FIGS. 28A-28C, a diverter unit (e.g., 216) may be actuated to urge an object (e.g., 250) off of the conveyor 214 into a selected carriage (e.g., 220) that runs along a rail 221 between destination locations (stations) 230. The diverter unit may include a pair of paddles 223 that are suspended by a frame 225 that provide that the paddles are actuatable linearly to move an object 250 off of the conveyor in either direction transverse to the conveyor. Again, with reference to FIG. 18, one direction of diversion for diverter 216, is to return an object to the infeed area 201.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

Figure 29:
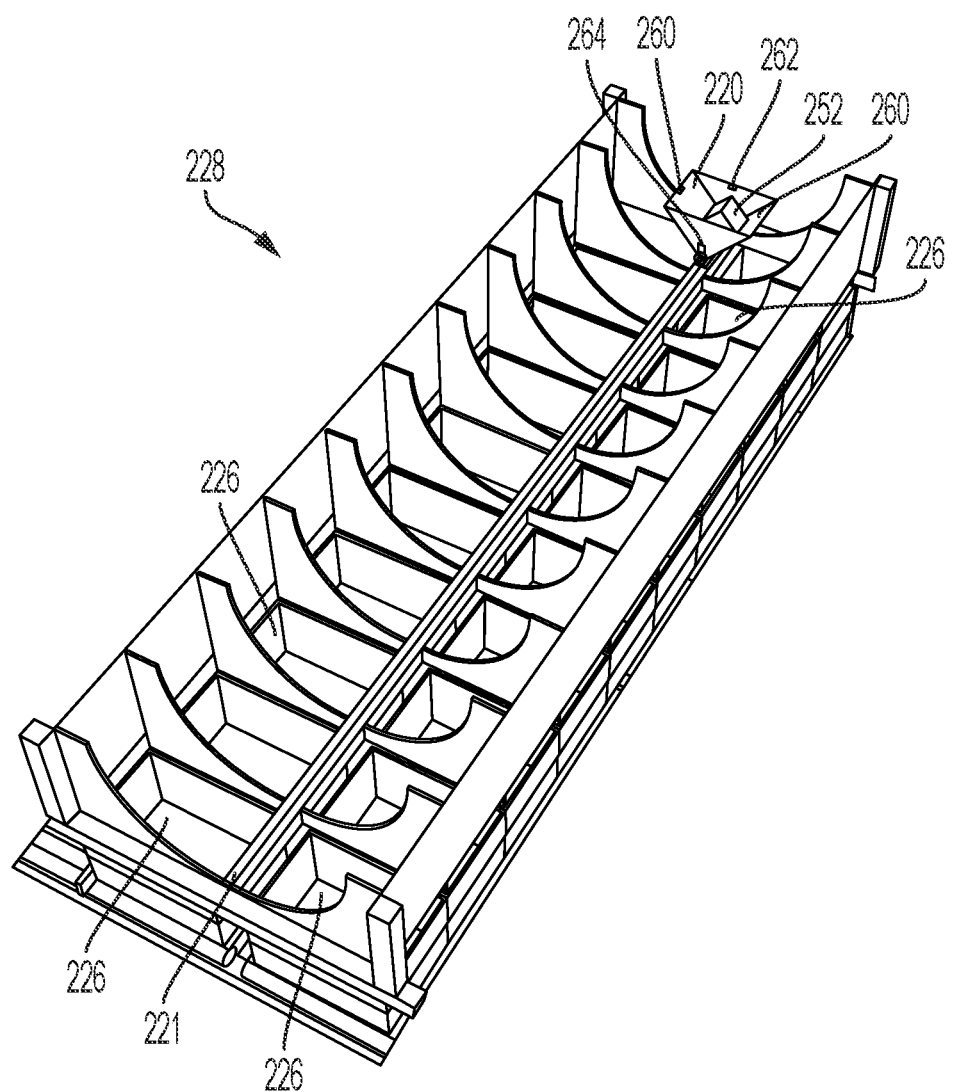
FIG. 29 shows an illustrative diagrammatic view of a destination section in the object processing system of FIG. 23.
Figure 30:
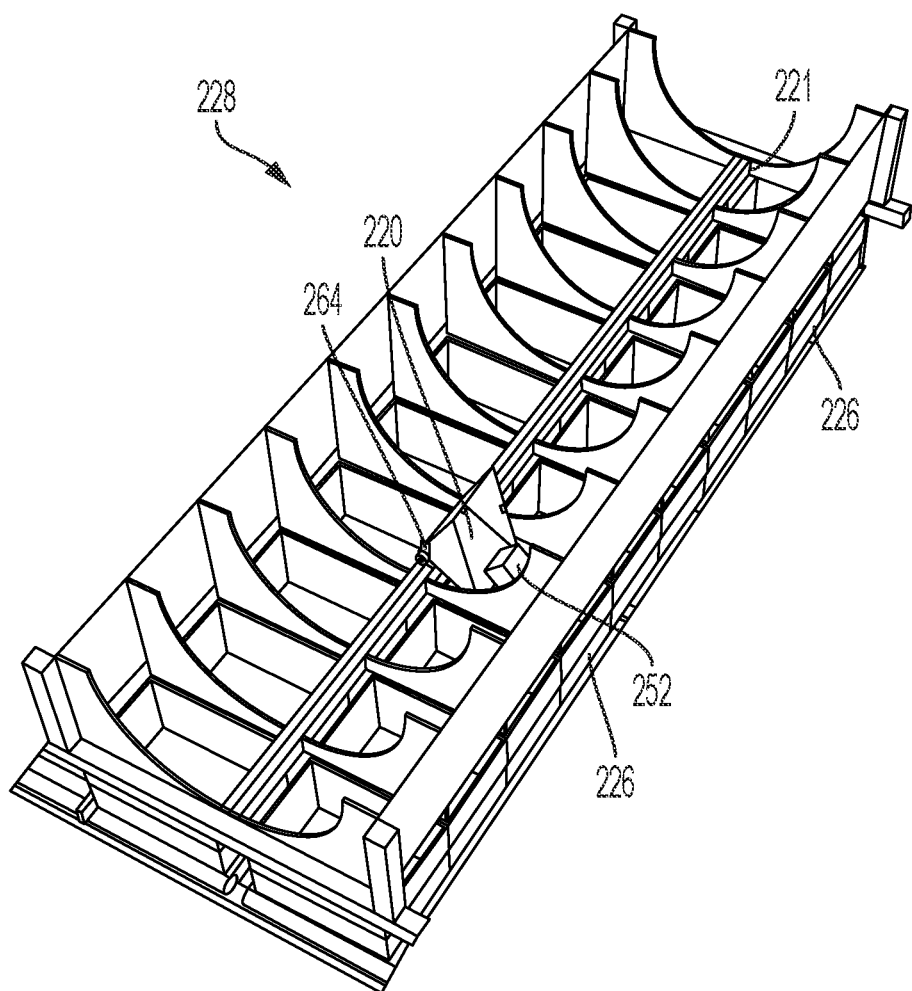
FIG. 30 shows an illustrative diagrammatic view of the destination section of FIG. 29, with the carriage moved along the track and discharging the object into a destination bin.

FIG. 29 shows a destination section (e.g., such as any of sections 228 of the system 12) that includes a movable carriage (e.g., 220) that may receive an object 252 from the end effector of the programmable motion device. The movable carriage 220 is reciprocally movable between two rows of the destination bins 230 along a guide track 221. As shown in FIG. 29, each destination bin 230 includes a guide chute that guides an object dropped therein into the underlying destination bin 230. The carriage 220 moves along a track 221, and the carriage may be actuated to drop an object 252 into a desired destination bin 230 via the guide chute (as shown in FIG. 30).

The movable carriage is therefore reciprocally movable between the destination bins, and the/each carriage moves along a track, and may be actuated to drop an object (e.g., 252) into a desired destination bin. In certain aspects, the carriage (e.g., 220) may include sensors (e.g., transmitter and receiver pairs 260 and/or 262 that may be used to confirm that an object has been received by the carriage or confirming that an object has been discharged by the carriage. In still further aspects, the carriage may be mounted onto a rail chassis via load cells 264 such that the weight within the carriage may be determined from load cell output sensor data as discussed further below with reference to FIGS. 47 and 48. Knowledge of the weight in the carriage may be used to confirm that an object has been received by the carriage, and that an object has been discharged by the carriage. Knowing the weight may also confirm that the object in the carriage is indeed the object that the system expects is in the carriage (where the system includes previously recorded data regarding each object's weight).

In accordance with an aspects, the invention provides an automated material handling system that is tasked, in part, with routing objects carried in bins to stations where objects are transferred from one bin to another with one or more programmable motion devices (such as articulated arms) at automated stations, and may further include manual stations. The objects may be provided in bins, which may be containers, totes, or boxes etc. An overall objective of the system may be to sort and ship goods, to perform order fulfillment, to replenish store stock, or to provide any general-purpose system requiring the transfer of individual objects from one bin to a processing system.

The objects may be packages, boxes, flats or polybags etc. in a shipping center, or consumer products in an e-commerce order fulfillment center, or products and warehouse packs in a retail distribution center (DC). The conveyance of objects or bins of objects could take many forms, including belt or roller conveyors, chutes, mobile robots, or human workers. The picking stations, where items are transferred, might be automated systems including robotic systems, or a station manned by a human being.

Figure 31:
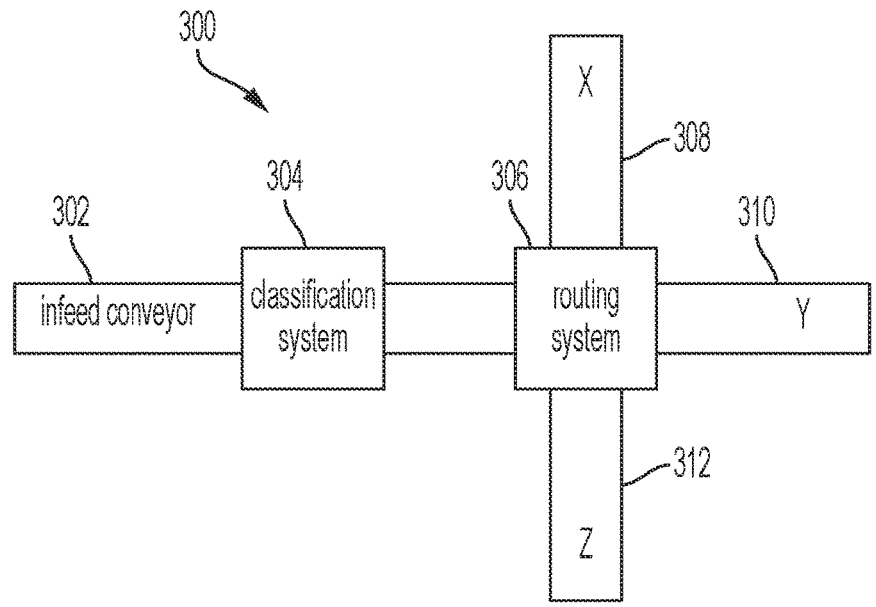
FIG. 31 shows an illustrative diagrammatic layout model view of an induction system in accordance an aspect of the invention.
Figure 32:
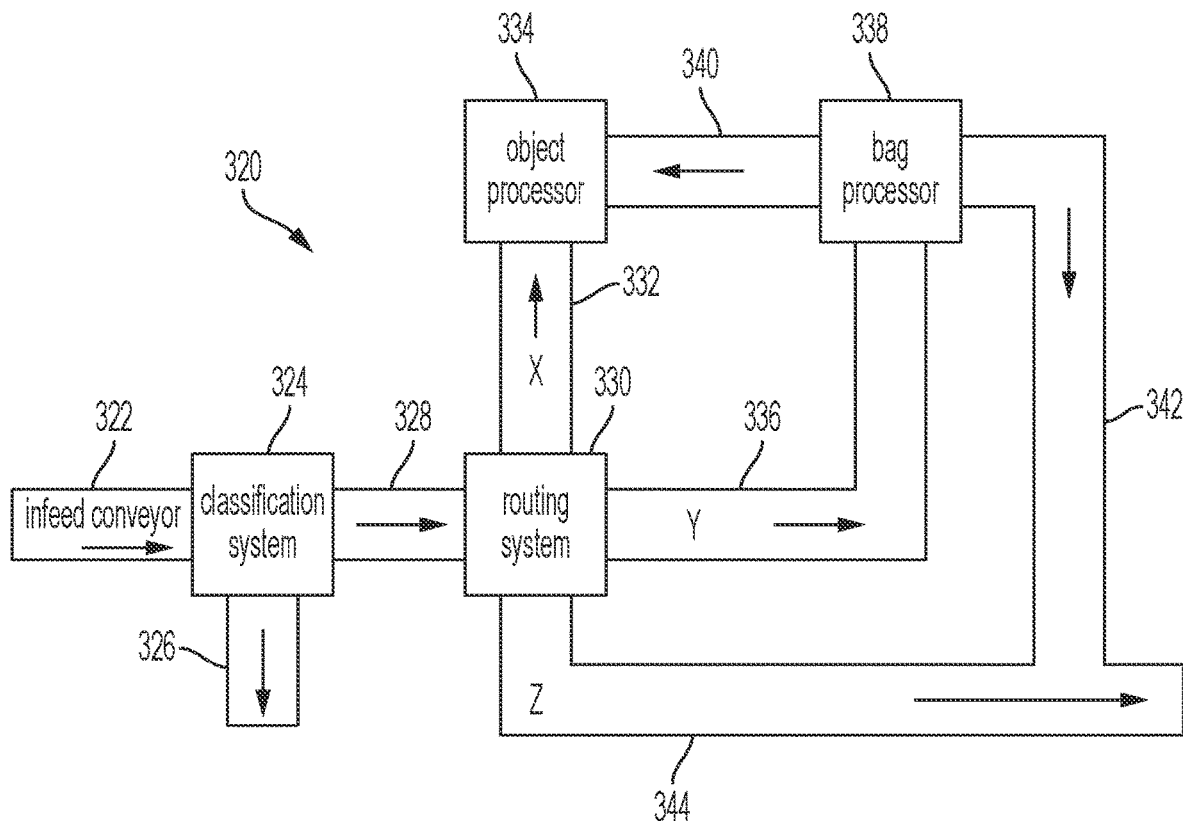
FIG. 32 shows an illustrative diagrammatic layout model view of another induction system in accordance another aspect of the invention showing a layout similar to the system of FIG. 9.

FIG. 31 shows a diagrammatic view of an induction limiting system 300 that includes an infeed conveyor 302 that leads to a classification system 304. Once classified by the classification system 304, objects are directed toward a routing system 306, which routes the objects to one of a plurality of directions as shown at 308, 310, 312. A model for a system similar to that shown in FIG. 11 for example, is shown in FIG. 32. The system 320 of FIG. 32 includes an infeed conveyor 322 that directs objects to a classification system 324. The classification system 324, in combination with one or more computer processing systems 100, 200 and a database therein or coupled thereto, directs the objects toward a routing system 330 (via a conveyor 328), and directs empty bins along a bin outbound conveyor 326. The routing system 330 directs the objects into one of three different directions. Objects that are accepted for processing are directed along a conveyor 332 for processing by the object processing system 334. Objects that are outside of system specifications for processing, are directed along a non-processable objects conveyor 344 for processing by systems or methods other than the processing system 334. Certain objects that do not fall directly into either classification (e.g., objects that are provided in polyethylene bags) are provided to a bag processor 338 via a bag processing conveyor 336. At the bag processor 338, the objects are subjected to a test, and depending on the results are either directed toward the object processor 334 via processor 340, or are directed toward the non-processable objects station via a conveyor 342.

Figure 33:
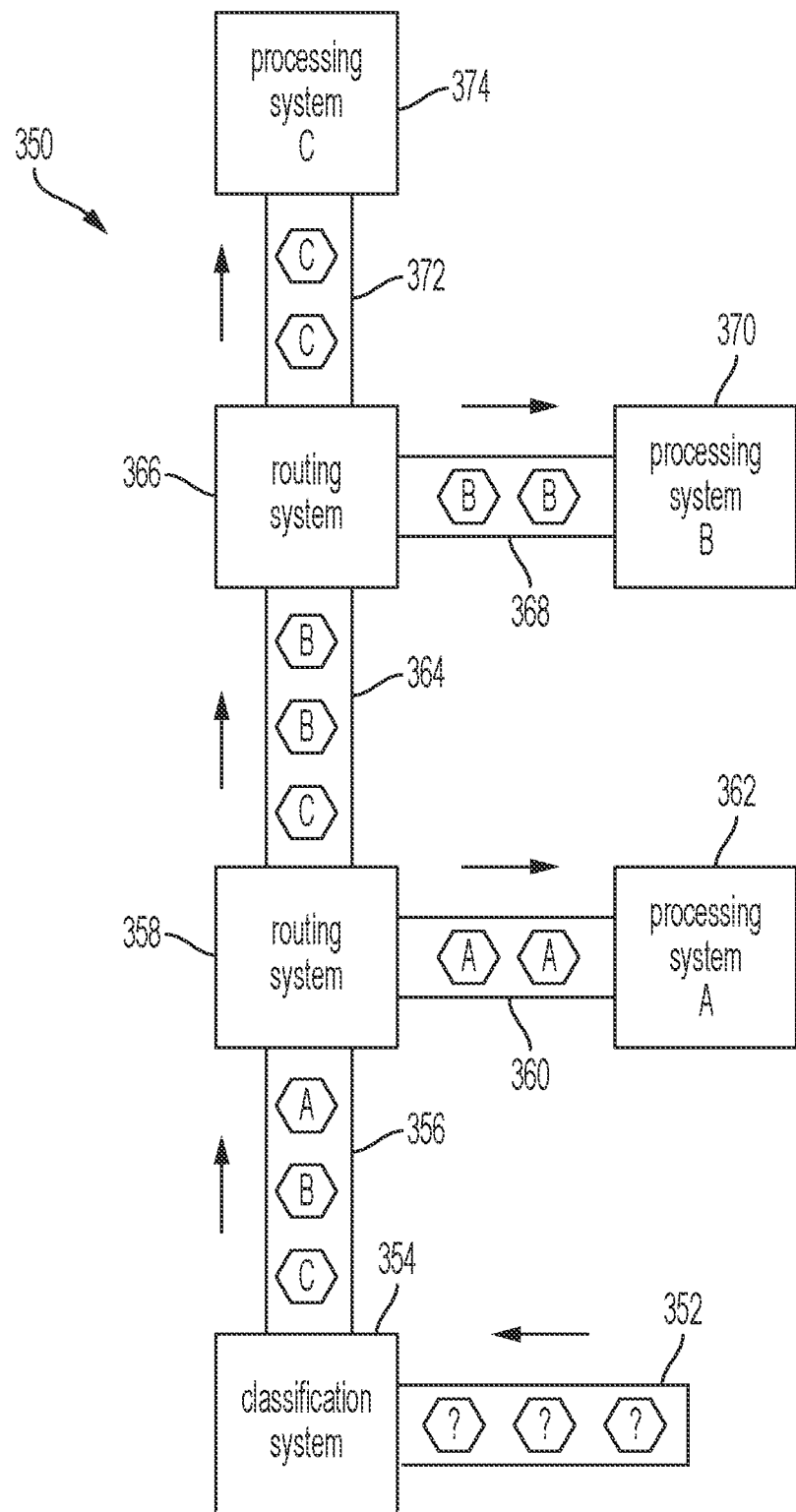
FIG. 33 shows an illustrative diagrammatic model view of an induction system in accordance another aspect of the invention that includes a classification system.

Systems of the invention may be employed in a wide variety of routing system applications. For example, induction limiting systems of the invention may be employed with multiple routing and processing system. FIG. 33, for example, shows a system 350 that includes an infeed conveyor 352 that provides objects to a classification system 354. The classification system 354 determines which of a plurality of processing systems (e.g., A, B or C as shown at 362, 370, 374) to have the object sent. In particular, objects first leave the classification system 354 and travel along a conveyor 356 toward a first routing system 358. Certain objects (that are determined by the classification system 354) to be directed toward the processing system (A) 362, are directed along conveyor 360 toward processing system (A) 362. All other objects are directed along conveyor 364 toward a second routing system 366. Further objects (that are determined by the classification system 354) to be directed toward the processing system (B) 370, are directed along conveyor 368 toward processing system (B) 370. All other objects are directed along conveyor 372 toward routing system 374. Any of processing systems A, B or C may, for example, be automated processing stations (e.g., designed for large or small/heavy or light objects) or manual processing stations (e.g., at which a person may make decisions regarding object processing, or physically move objects to destination locations). In further aspects, the station C may be a pass-through exceptions bin into which objects that are to be processed manually are deposited.

Figure 34:
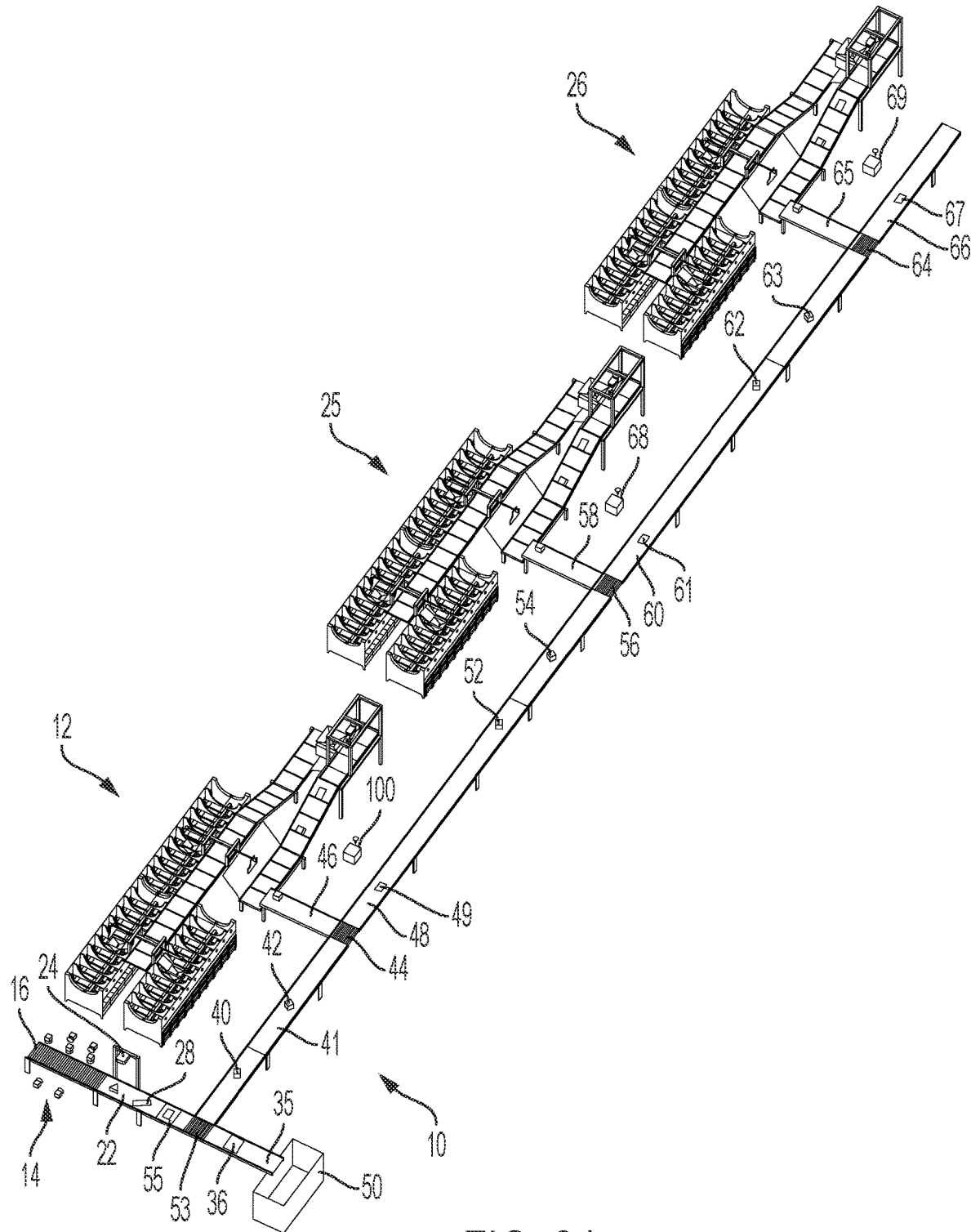
FIG. 34 shows an illustrative diagrammatic view of an induction system in accordance with an embodiment of the present invention together with a plurality of processing systems.

As an example, FIG. 34 shows the induction system 10 and object processing system 12 as discussed above with reference to FIGS. 1-8 together with additional object processing systems 25 and 26 in series. In particular, the induction system 10 includes an input station 14 with the response evaluation section 16 of conveyor 22, the multipurpose perception unit 24 and weight sensing conveyor section 55 for evaluating objects (e.g., 28), and providing objects either to the exception bin 50 via conveyor 35 (e.g., object 35) or to conveyor 41 (e.g., objects 40, 42) using the multidirectional conveyor 53 as discussed above with reference to FIGS. 1-8.

The objects to be processed (e.g., objects 40, 42) are each assigned an object processing station (e.g., 12, 25, 26) toward which they are routed. In particular, the objects to be processed (again, e.g., 40, 42) may be routed to an appropriate processing station based on any of a variety of parameters, such as size, weight, packaging material (boxes, bags, odd shaped objects etc.), and even shipping location, and each object processing station may, for example, include components that are particularly suited for certain sizes, weights, packaging materials etc. Certain objects may be routed by multidirectional conveyor 44 along conveyor 46 to object processing station 12, while others (e.g., objects 49, 52, 54) are directed along conveyor 48 toward further processing stations. Certain of those objects may be routed by multidirectional conveyor 56 along conveyor 58 toward object processing station 25, while others (e.g., objects 61, 62, 63) are directed along conveyor 60 toward further processing stations. Certain of these objects may be routed by multidirectional conveyor 64 along conveyor 65 toward processing station 26, while others (e.g., 67) are directed along conveyor 66 toward further object processing stations. The operation of the systems may be controlled by one or more computer processing systems (e.g., 100, 68 and 69).

Figure 35:
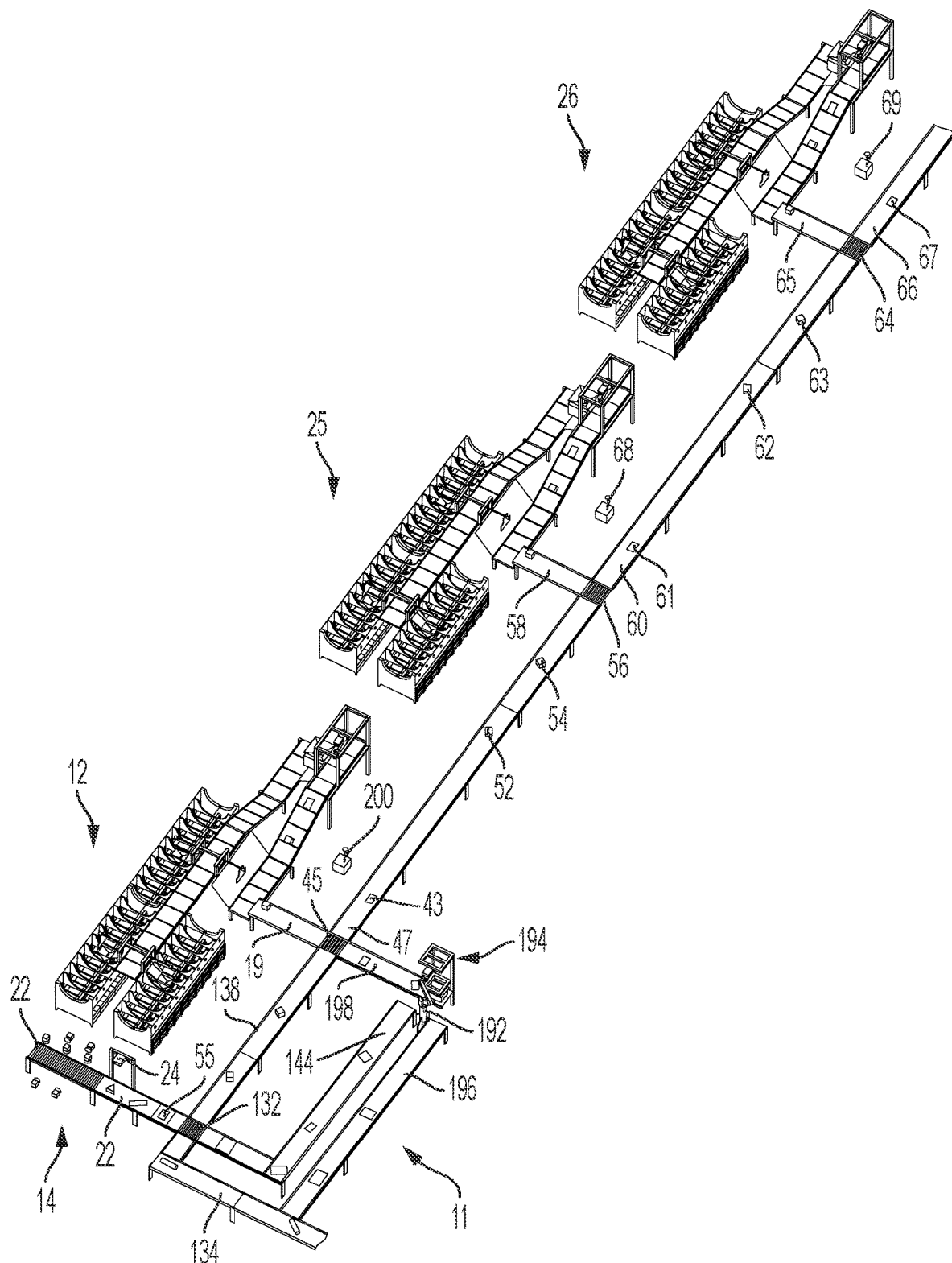
FIG. 35 shows an illustrative diagrammatic view of an induction system in accordance with another embodiment of the present invention together with a plurality of processing systems.

As another example, FIG. 35 shows the induction system 11 and object processing system 12 as discussed above with reference to FIGS. 9 and 10, together with additional object processing systems 25 and 26 in series. In particular, the induction system 11 includes an input station 14 with the response evaluation section 16 of conveyor 22, the multipurpose perception unit 24 and weight sensing conveyor section 55 for evaluating objects, and providing objects to any of an exception bin via conveyor 134 or to conveyor 138 or to a bag processing conveyor 144 using the multidirectional conveyor 132 as discussed above with reference to FIGS. 9 and 10. Any objects that are detected as being packaged in bags are directed to conveyor 144 toward deformable object induction system 194 including articulated arm 192, where objects are tested as discussed above with reference to FIGS. 9 and 10, and either directed along non-processable object conveyor 196 or along processable object conveyor 198 as discussed above with reference to FIGS. 9 and 10.

Again, the objects to be processed are each assigned an object processing station (e.g., 12, 25, 26) toward which they are routed. In particular, the objects to be processed (e.g., 43, 52, 54) may be routed to an appropriate processing station based on any of a variety of parameters, such as size, weight, packaging material (boxes, bags, odd shaped objects etc.), and even shipping location, and each object processing station may, for example, include components that are particularly suited for certain sizes, weights, packaging materials etc. Certain objects may be routed by multidirectional conveyor 45 along conveyor 19 to object processing station 12, while others (e.g., objects 43, 52, 54) are directed along conveyor 47 toward further processing stations. As discussed above with reference to FIG. 34, certain of those objects may be routed by multidirectional conveyor 56 along conveyor 58 toward object processing station 25, while others (e.g., objects 61, 62, 63) are directed along conveyor 60 toward further processing stations. Certain of these objects may be routed by multidirectional conveyor 64 along conveyor 65 toward processing station 26, while others (e.g., 67) are directed along conveyor 66 toward further object processing stations. The operation of the systems may be controlled by one or more computer processing systems (e.g., 200, 68 and 69).

Figure 36:
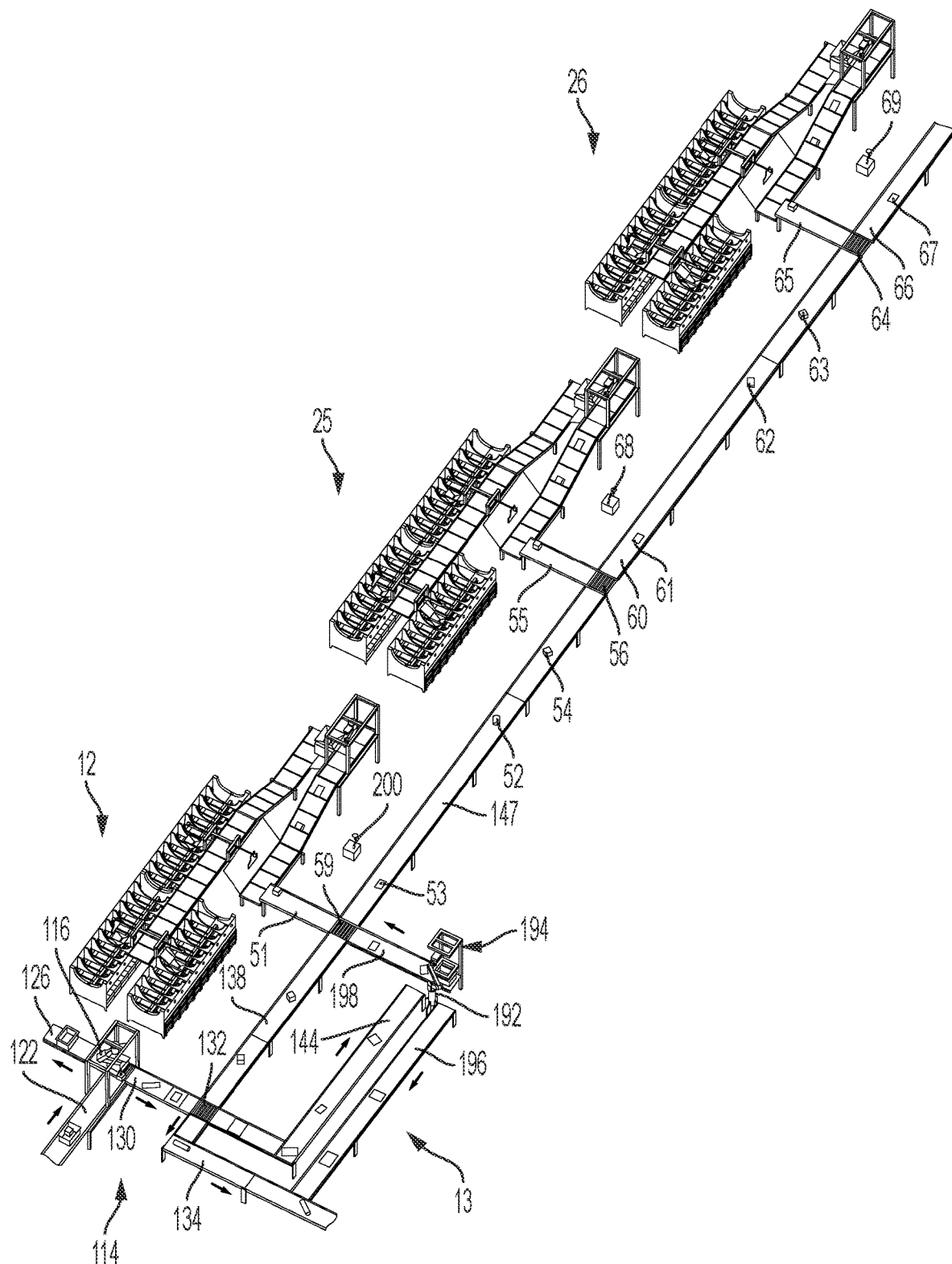
FIG. 36 shows an illustrative diagrammatic view of an induction system in accordance with a further embodiment of the present invention together with a plurality of processing systems.

FIG. 36 shows a system that includes the induction system 13 and object processing system 12 as discussed above with reference to FIGS. 11-22D, together with additional object processing systems 25 and 26 in series. In particular, the induction system 13 includes an input station 114 including a bin in-feed conveyor 122, a bin output conveyor 126, an articulated arm 132 and an object in-feed conveyor 13, and providing objects to any of an exception bin via conveyor 134 or to conveyor 138 using the multidirectional conveyor 132 or to a bag processing conveyor 144 as discussed above with reference to FIGS. 11-22D. Any objects that are detected as being packaged in bags are directed to conveyor 144 toward deformable object induction system 194 including articulated arm 192, where objects are tested as discussed above with reference to FIGS. 11-22D, and either directed along non-processable object conveyor 196 or along processable object conveyor 198 as discussed above with reference to FIGS. 11-22D.

Again, the objects to be processed are each assigned an object processing station (e.g., 12, 25, 26) toward which they are routed. In particular, the objects to be processed may be routed to an appropriate processing station based on any of a variety of parameters, such as size, weight, packaging material (boxes, bags, odd shaped objects etc.), and even shipping location, and each object processing station may, for example, include components that are particularly suited for certain sizes, weights, packaging materials etc. Certain objects may be routed by multidirectional conveyor 59 along conveyor 51 to object processing station 12, while others (e.g., objects 52, 53, 54) are directed along conveyor 47 toward further processing stations. As discussed above with reference to FIG. 35, certain of those objects may be routed by multidirectional conveyor 56 along conveyor 55 toward object processing station 25, while others (e.g., objects 61, 62, 63) are directed along conveyor 60 toward further processing stations. Certain of these objects may be routed by multidirectional conveyor 64 along conveyor 65 toward processing station 26, while others (e.g., 67) are directed along conveyor 66 toward further object processing stations. The operation of the systems may be controlled by one or more computer processing systems (e.g., 200, 68 and 69).

Figure 37:
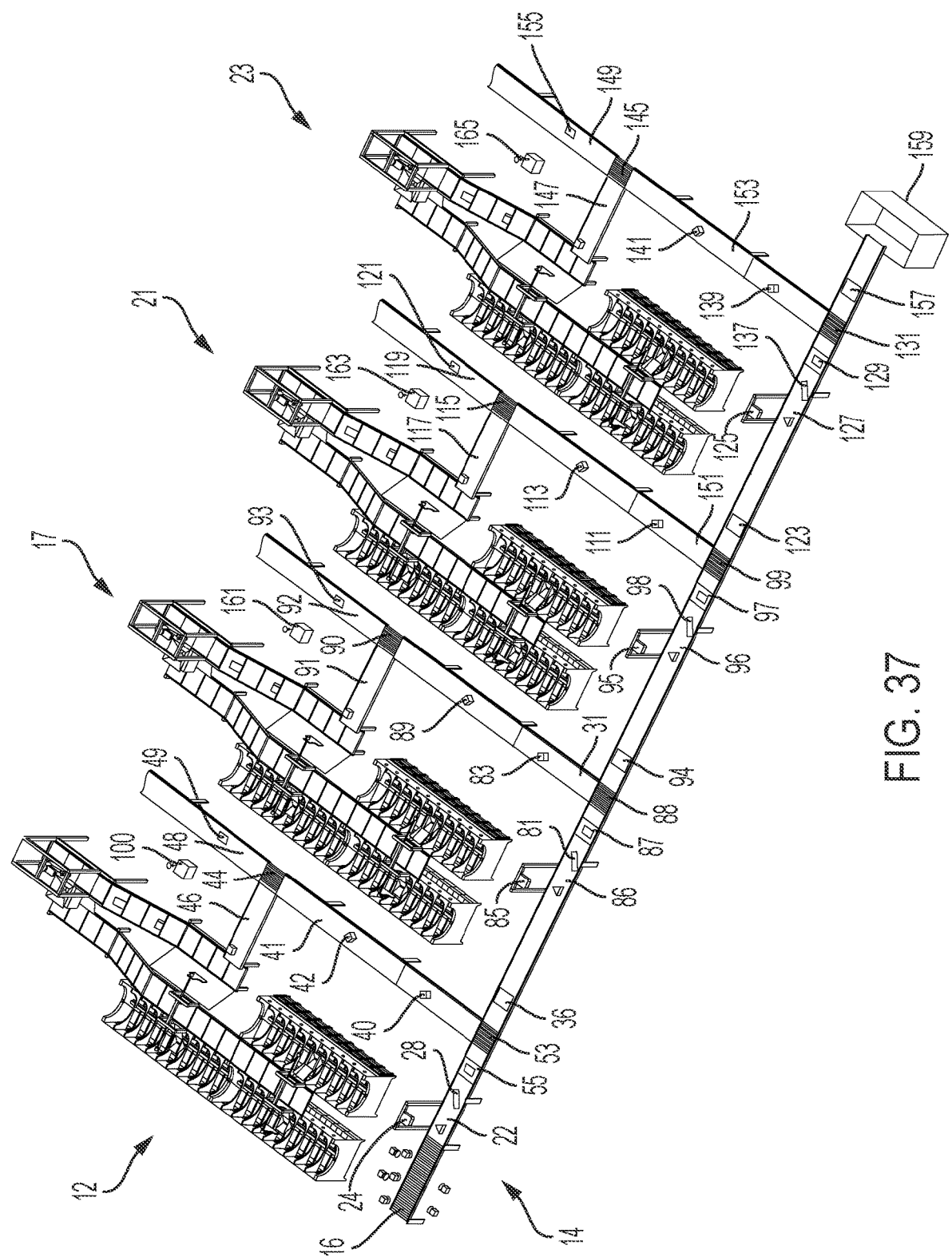
FIG. 37 shows an illustrative diagrammatic view of a plurality of induction systems in accordance with an embodiment of the present invention together with a plurality of processing systems.

FIG. 37 shows the induction system 15 and object processing systems 12, 17, 21, 23 in parallel. The induction system 15 includes not only the input station 14 including the response evaluation section of conveyor 22, the multipurpose perception unit 24, the weight sensing conveyor section 55 and the multidirectional conveyor 53 as discussed above with reference to FIGS. 1-8, the induction system 15 further includes a plurality of sets of multipurpose perception units, weight sensing conveyor sections and multidirectional conveyors for evaluating objects (e.g., 28). Multidirectional conveyor 53 leads to conveyor 41 and multidirectional conveyor 44 for providing objects (e.g., 40, 42) to object processing system 12 via conveyor 46 as well as any additional object processing systems (e.g., object 49 on conveyor 48) in series with the object processing system 12 as discussed above with reference to FIG. 34.

In particular, conveyor 22 also includes an additional inspection station 86 with a multipurpose perception unit 85, a weight sensing conveyor section 87 and a multidirectional conveyor 88 for evaluating objects (e.g., 81), and for optionally directing objects (e.g., 83, 89) along conveyor 31 toward a multidirectional conveyor 90. Multidirectional conveyor 90 leads to conveyor 91 for providing objects to object processing system 17 as well as to any additional object processing systems (e.g., object 93) along conveyor 92 in series with the object processing system 17.

Conveyor 22 further includes an additional inspection station 96 with a multipurpose perception unit 95, a weight sensing conveyor section 97 and a multidirectional conveyor 99 for evaluating objects (e.g., 98), and for optionally directing objects (e.g., 111, 113) along conveyor 151 toward a multidirectional conveyor 115. Multidirectional conveyor 115 leads to conveyor 117 for providing objects to object processing system 21 as well as to any additional object processing systems (e.g., object 121) along conveyor 119 in series with the object processing system 21.

Conveyor 22 further includes an additional inspection station 127 with a multipurpose perception unit 125, a weight sensing conveyor section 129 and a multidirectional conveyor 131 for evaluating objects (e.g., 137), and for optionally directing objects (e.g., 139, 141) along conveyor 153 toward a multidirectional conveyor 145. Multidirectional conveyor 145 leads to conveyor 147 for providing objects to object processing system 23 as well as to any additional object processing systems (e.g., object 155) along conveyor 149 in series with the object processing system 21. Objects (e.g., 28, 36, 81, 94, 98, 123, 137) may therefore be routed along conveyor 22 to any of a plurality of processing stations, and then directed along a transverse conveyor (e.g., 41, 31, 151, 153) to any of a plurality of processing stations in series along the transverse conveyor. Non-processable objects (e.g., object 157) may be provided to an exception bin 159 at the end of the conveyor 22. Operation of the system may be controlled by one or more computer processing systems 100, 161, 163, 165. Again, the objects to be processed may be routed to an appropriate processing station based on any of a variety of parameters, such as size, weight, packaging material (boxes, bags, odd shaped objects etc.), and even shipping location, and each object processing station may, for example, include components that are particularly suited for certain sizes, weights, packaging materials etc.

Figure 38:
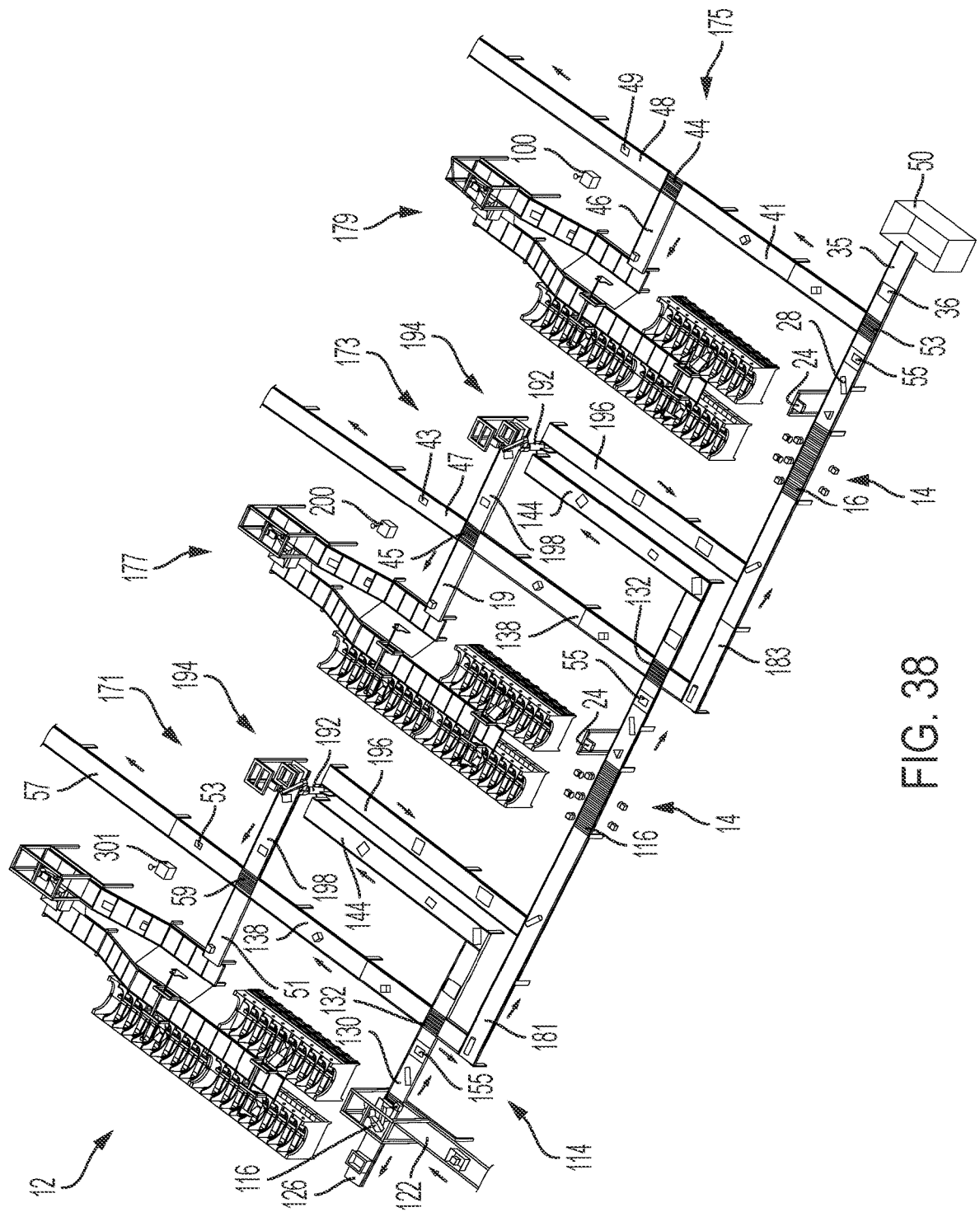
FIG. 38 shows an illustrative diagrammatic view of a plurality of different induction systems in accordance with another embodiment of the present invention together with a plurality of processing systems.

FIG. 38 shows a plurality of different types of induction systems used with a plurality of object processing systems. The induction system 114 includes the input bin conveyor 122, output bin conveyor 126 and articulated arm 116, weight sensing conveyor 155, multidirectional conveyor 132, deformable object induction limiting system 194 and articulated arm 192 as discussed above with reference to FIGS. 11-22, together with conveyors 57, 130, 138, 144, 196, 134 and 198. Conveyors 138 and 198 lead to multidirectional conveyor 59, where objects are either directed to object processing system 12 via conveyor 51, or are directed along conveyor 57 (e.g., object 53) toward one of a plurality of further object processing systems as discussed above with reference to FIG. 36. The multidirectional conveyor 132 however does not lead to a non-processable object collection bin, but rather leads to further induction systems via conveyor 181.

In particular, conveyor 181 leads to an induction system 14 that includes the response evaluation section 16, the multipurpose perception unit 24, the weight sensing conveyor section, multidirectional conveyor 132 and deformable object induction limiting system 194 and articulated arm 192 as discussed above with reference to FIGS. 9 and 10, together with conveyors 19, 22, 138, 144, 196 and 198. Conveyors 138 and 198 lead to multidirectional conveyor 45, where objects are either directed to object processing system 177 via conveyor 19, or are directed along conveyor 47 (e.g., object 43) toward one of a plurality of further object processing systems as discussed above with reference to FIG. 35. Again, the multidirectional conveyor 132 does not lead to a non-processable object collection bin, but rather leads to a further induction systems via conveyor 183.

Conveyor 183 leads to a further induction system 14 including the response evaluation section 16, the multipurpose perception unit 24, the weight sensing conveyor section, multidirectional conveyor 132 and deformable object induction limiting system 194 and articulated arm 192 as discussed above with reference to FIGS. 1-8, together with conveyors 22, 40, 46, 48 and 35. Conveyor 41 leads to multidirectional conveyor 44, where objects are either directed to object processing system 179 via conveyor 46, or are directed along conveyor 48 (e.g., object 49) toward one of a plurality of further object processing systems as discussed above with reference to FIG. 34. Objects that are not to be processed (e.g., object 36) are provided to non-processable object exception bin 50 via conveyor 35.

Again, the objects to be processed are each assigned an object processing station (e.g., 12, 177, 179) toward which they are routed. In particular, the objects to be processed may be routed to an appropriate processing station based on any of a variety of parameters, such as size, weight, packaging material (boxes, bags, odd shaped objects etc.), and even shipping location, and each object processing station may, for example, include components that are particularly suited for certain sizes, weights, packaging materials etc. Operation of the system may be controlled by one or more computer processing systems 100, 200, 301.

Any of a wide variety of detection systems may also be employed in the above disclosed and further aspects of the present invention. For example, as discussed above with regard to the weight sensing conveyors discussed above, such a weight sensing conveyor may be provided in a wide variety of systems. For example, and with reference to FIGS. 39A and 39B, a weight sensing conveyor system 380 that may be used in an induction system of any of FIGS. 1, 9, 11, 34-38, 49, 56 and 70, and that include a weight scale 382, including a base 384 and a scale 386, that is provided between upper 388 and lower 390 portions of a conveyor section 392. Objects on the conveyor may thereby be weighed while on the conveyor.

Figure 40A:
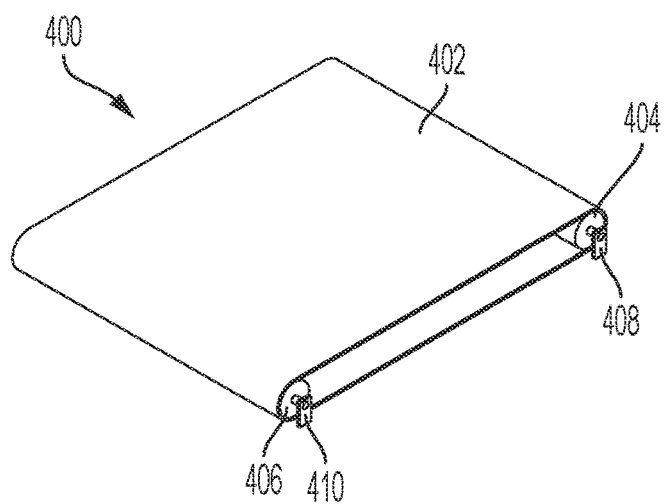
FIGS. 40A and 40B show illustrative diagrammatic views of a weight sensing conveyor section in accordance with an aspect of the invention that includes load cells or force torque sensors.
Figure 40B:
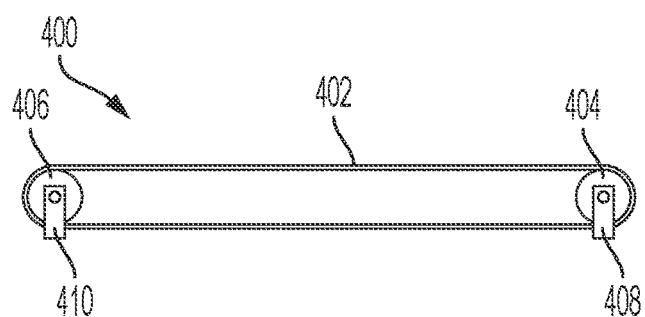

FIGS. 40A and 40B show a weight sensing conveyor system 400 that may be used in an induction system of any of FIGS. 1, 9, 11, 34-38, 49, 56 and 70, and that includes a conveyor section 402 that is mounted on rollers 404, 406, each of which is mounted at both ends on a pair of load cells 408, 410 (only one of which is shown at one end of each roller 404, 406). Damaged packages may also be identified by the perception system, for example, if a package appears to be wet or leaking. Moisture sensitive sensors may be employed in connection with conveyor 382 in any of the pre-processing systems of FIGS. 1, 9, 11, 34-38, 49, 56 and 70 by having a load cell 408, 410 include moisture sensors. In other embodiments, cameras (e.g., one trillion fps cameras that are able to track photons) that are able to detect moisture may also be used in such induction systems. Any dampness detected would indicate that the object is likely damaged, requiring exception processing.

With reference to FIGS. 41A-41D, the system 400 may further provide that an object 412 on the conveyor section 402 may determine not only the weight of the object 412, but may further use the difference between the ends of the lengths and the ends of the widths, as well as weights perceived by each of the load cells 408, 410, to determine an area of the center of mass of the object 412 in accordance with a further aspect of the present invention. The system 400 may, for example, be used in any of the induction systems of FIGS. 1, 9, 11, 34-38, 49, 56 and 70.

Figure 39A:
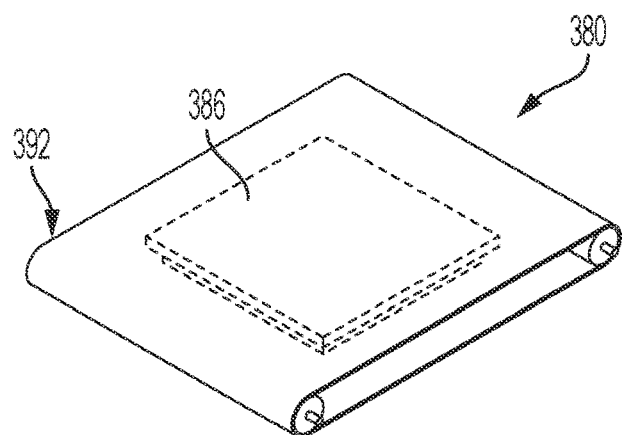
FIGS. 39A and 39B show illustrative diagrammatic views of a weight sensing conveyor section in accordance with an aspect of the invention that includes a weight scale.
Figure 39B:
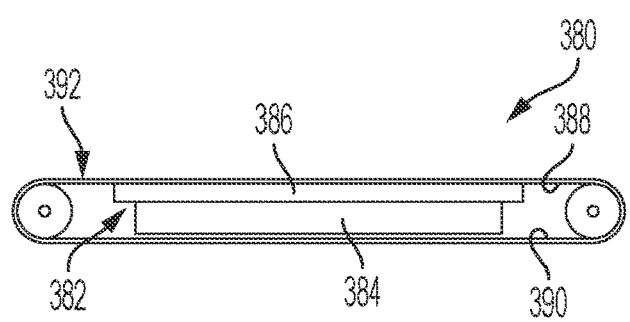
Figure 42A:
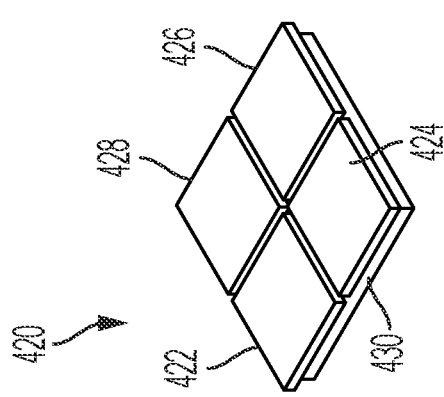
FIGS. 42A and 42B show illustrative diagrammatic views of a weight sensing conveyor section in accordance with an aspect of the invention that includes multiple scales.
Figure 42B:
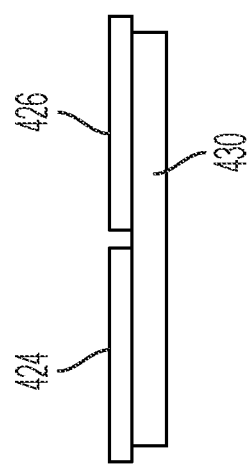

With reference to FIGS. 42A and 42B, a weight scale such as that shown in FIGS. 39A-39B, may be provided as multiple scales. FIGS. 42A and 42B, for example, show the scale system 420 that includes four scale sections 422, 424, 426, 428 on a scale base 430. The scale system 420 may be used in any of the pre-processing systems of FIGS. 1, 9 and 11. Using such a scale system, the use of the multiple scales may also be employed to locate a center of mass of an object on the scale system 420.

Figure 43C:
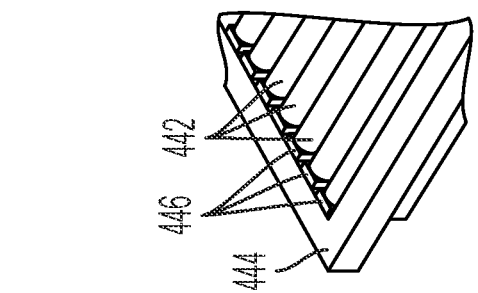
FIGS. 43A-43C show illustrative diagrammatic views of a weight sensing conveyor section in accordance with an aspect of the invention that includes multiple rollers with any of load cells or force torque sensors.
Figure 43A:
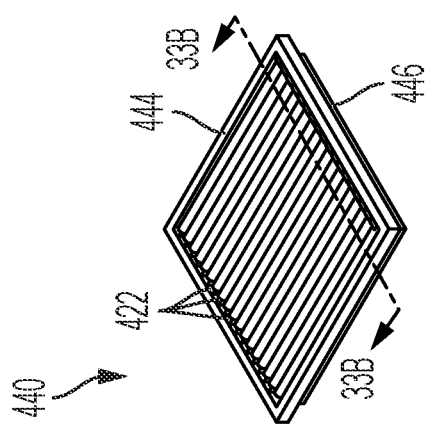
Figure 43B:
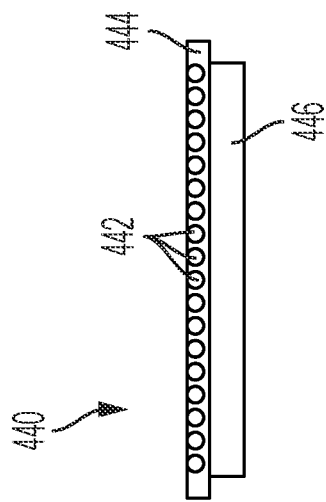

FIGS. 43A-43C show a scale system 440 that includes multiple rollers 442 mounted within a frame 444 on a base 446, wherein each roller 442 is mounted to the frame 444 via a load cell or force torque sensor 446 on either end of the each roller 442. The system 440 may be used in any of the pre-processing systems of FIGS. 1, 9 and 11. By monitoring the outputs of each of the load cells or force torque sensors 446, the center of the mass of an object on the rollers may be determined.

Such systems therefore, that provide weight sensing in the presentation conveyor may include one or more load cells or weight sensitive mechanisms embedded into the surface on which objects are presented to a programmable motion device such as an articulated arm. Each object's weight and/or observed density (weight/volume) as may be estimated using the programmable motion system's cameras or range sensors that can perceive volume. Objects may be diverted or otherwise pass by the processing system when these values exceed specifications. To better localize incompatible objects (e.g., packages), there may be a grid of such weight sensitive mechanisms that are able to sense which region of the picking area contains the one or more incompatible objects, and then allow picking from any area except where the incompatible object(s) has been detected. Further, the systems may detect flow readings while gripping an object. If a flow of air ($F_1$) is too high (as compared to an expected flow ($F_2$) for a particular object, then the system may permit the object to be diverted from or move past an object processing system.

Figure 44:
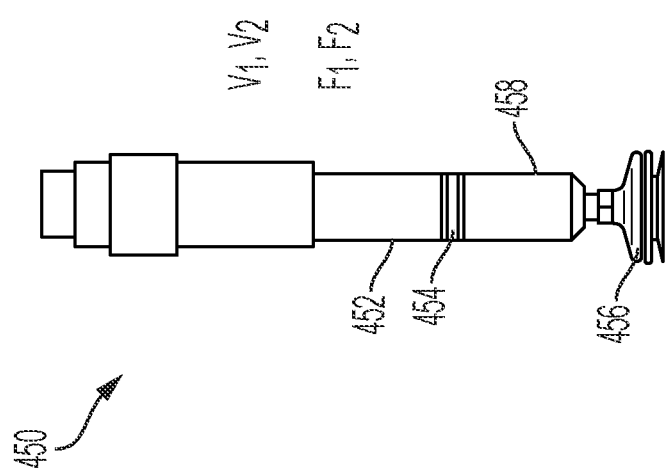
FIG. 44 shows an illustrative diagrammatic view of an end effector for use in accordance with an aspect of the invention that includes any of load cells or force torque sensors.

In further aspects therefore, the end effector of the programmable motion device (and as discussed herein with reference to FIGS. 9-22D, 35, 36, 38, 54, 70 and 71) may include an end effector 450 as shown in FIG. 44 that includes a load cell or force torque sensor 454 that separates an upper portion 452 that is coupled to the programmable motion device, and a lower portion 458. The system may employ the load sensitive device at the gripper to estimate the weight of the object. If the object exceeds an acceptable weight specification, the object is released into a stream directed toward an exception area. Also, any movement of the lower portion with respect to the upper portion will be detected by the load cell. A weight therefore of any object that is being grasped by the flexible bellows 456 under vacuum, may be determined. Although an object may move with respect to the lower portion 458 (e.g., by use of the flexible bellows), any movement of grasped object that translates to movement of the lower portion 458 with respect to the upper portion 452 will be detected by the load cell or force torque sensor 454. Not only weight therefore, bus also a balance/imbalance of the grasp, as well as any torque being applied to the lower portion 458 will also be detected. Again, if the sensed (estimated) weight of an object being grasped exceeds either an expected weight (beyond a threshold), then the system may release the object either to be simply diverted from the processing station, or to be directed to an exception area.

In accordance with further aspects, the system may limit the initial grip force. For example, the system may employ a partially open gripper valve to limit the maximum grip force ($V_1$) in a vacuum gripper 450 until an object is lifted. Once the object is lifted, the gripper valve may be fully closed, bringing the vacuum force to a greater vacuum ($V_2$) to execute a secure and reliable transfer of the object. Such a process ensures that objects will not be dropped during transfer, and limits the induction of objects to the processing system that are potentially at risk of being dropped or not processed properly.

Figure 45:
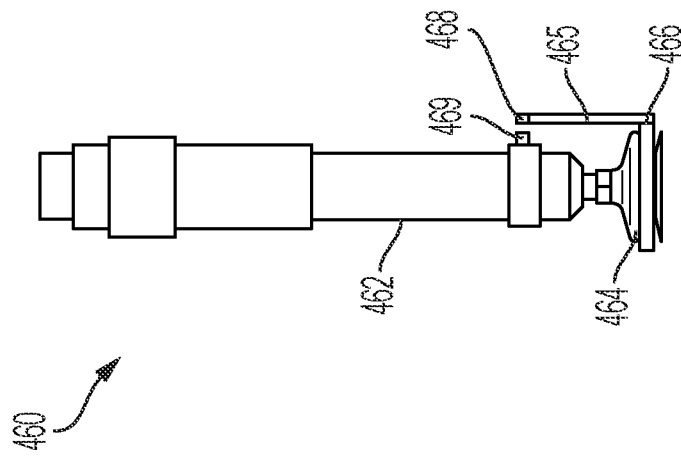
FIG. 45 shows an illustrative diagrammatic view of an end effector for use in accordance with an aspect of the invention that includes a magnetic sensor.

FIG. 45 shows an end effector 460 for use in a system in accordance with a further aspect of the present invention that includes a rigid portion 462 that is coupled to the programmable motion device, and a flexible bellows 464 that may move with respect to the rigid portion. Attached to a lower portion of the flexible bellows 464 is a rigid bracket 466 that is includes a band portion around the flexible bellows, and a vertical portion 465 that is orthogonally disclosed with regard to the band portion. The top of the vertical portion includes either a magnet or a sensor, and mounted on the end effector is the other of either a magnet or a sensor pair 468, 469. The magnet and sensor pair provide that any movement of the bottom of the end effector with respect to the rigid portion 462 of the end effector, will be detected by the sensor system. In this way, any of a weight of an object, or characterization of a grasp of any object (e.g., balance/imbalance, or torque applied to the end effector) may also be determined. The end effector 460 may be used with any of the end effector systems discussed herein with reference to FIGS. 9-22D, 35, 36, 38, 54, 70 and 71.

Figure 46:
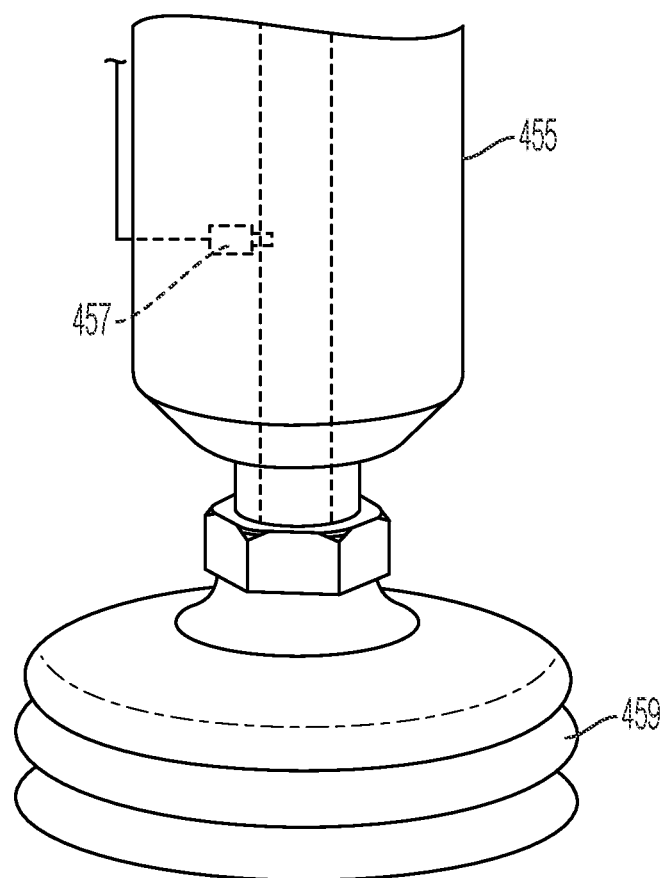
FIG. 46 shows an illustrative diagrammatic view of an end effector for use in accordance with an aspect of the invention that includes vacuum flow and/or pressure sensor.

With reference to FIG. 46, the system may use an end effector 455 (such as any end effector discussed herein) that includes a sensor 457 such as a flow sensor or pressure sensor. The system may compute from observations of flow and/or pressure while holding an item, whether the gripper 459 has a sufficient grasp on an object. In particular, the system may measure flow readings when gripping an object and determine whether the measured values are within a pickable object range of values. If the object is not pickable, the object may be passed to an exception area without being processed. The end effector 455 may be used with any of the systems discussed above with reference to FIGS. 10A-13 and 54.

Figure 47:
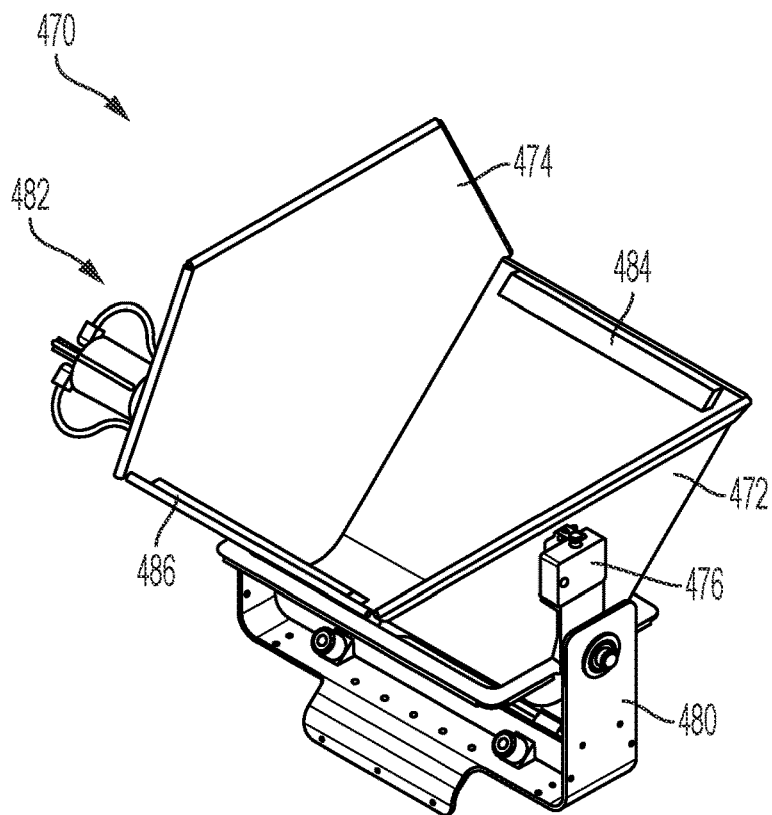
FIG. 47 shows an illustrative diagrammatic view of a weight sensing carriage for use in accordance with an aspect of the invention.
Figure 48:
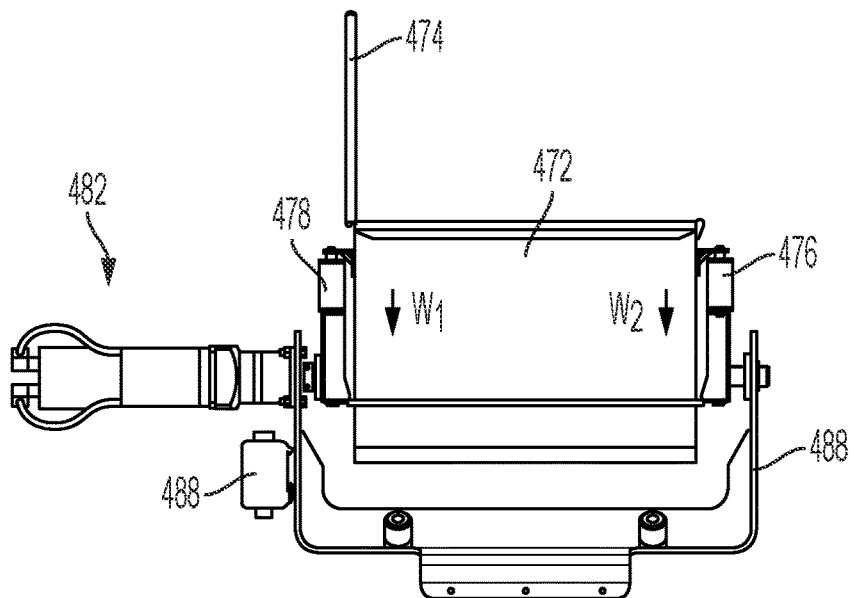
FIG. 48 shows an illustrative diagrammatic side view of the weight sensing carriage of FIG. 47.

FIGS. 47 and 48 show a carriage 470 for use in a system in accordance with an aspect of the invention similar to that shown in FIGS. 23, 25 and 28A-30 having a body 472 that includes a taller back wall 474 against which objects may be re-directed into the generally V-shaped body 472 of the carriage. The carriage 470 is mounted via load cells or force torque sensors 476, 478 on a frame 480, and its motion along a rail and in tipping, is controlled by actuation system 482. Communication and electronic controls are provided by electronic processing and communication system 488 (shown in FIG. 43). Again, the load cells or force torque sensors 476, 478 may be used to determine the weight of the contents of the carriage. For example, once an object is detected by the beam-break transmitter and receiver pair 484, 486, the system in accordance with an embodiment, will average the weight value of the two load cells ($W_1$, $W_2$) together, double the result, and subtract the weight of the body 472. In accordance with other embodiments, the load cells themselves may register a change, indicating that the carriage has received or expelled an object.

Many further filter systems, diverter systems, testing systems, routing systems and processing systems may be used in the above aspects and further below aspects of the invention. For example, certain embodiments may involve approaches to filtering packages that are too heavy, and doing so before they reach one of the robot pickers. Such systems may include a passive bomb-bay drop system. Such a system may involve routing incoming packages over a chute with a bomb-baby door or doors. The bomb-bay door is held closed by a spring whose stiffness is tuned so that packages that are too-heavy fall through the bomb-bay door. Packages whose weight is less than the limit, do not exert enough force to open the passive bomb-bay door(s). The passive bomb-bay door is mounted to a chute, so that packages fall naturally or slide over the bomb-bay without dropping.

In accordance with further aspects therefore, filtering systems of the invention may include an actuatable bomb-bay drop system (e.g., motor actuated or spring loaded). A sensor measures the weight of packages as they travel over the bomb-bay door(s), and a controller opens the bomb-baby door(s), either by a motor to open the bomb-bay, or by a mechanism that unlocks the bomb-bay door, and then a motor that closes it again in accordance with an aspect of the invention.

Figure 49:
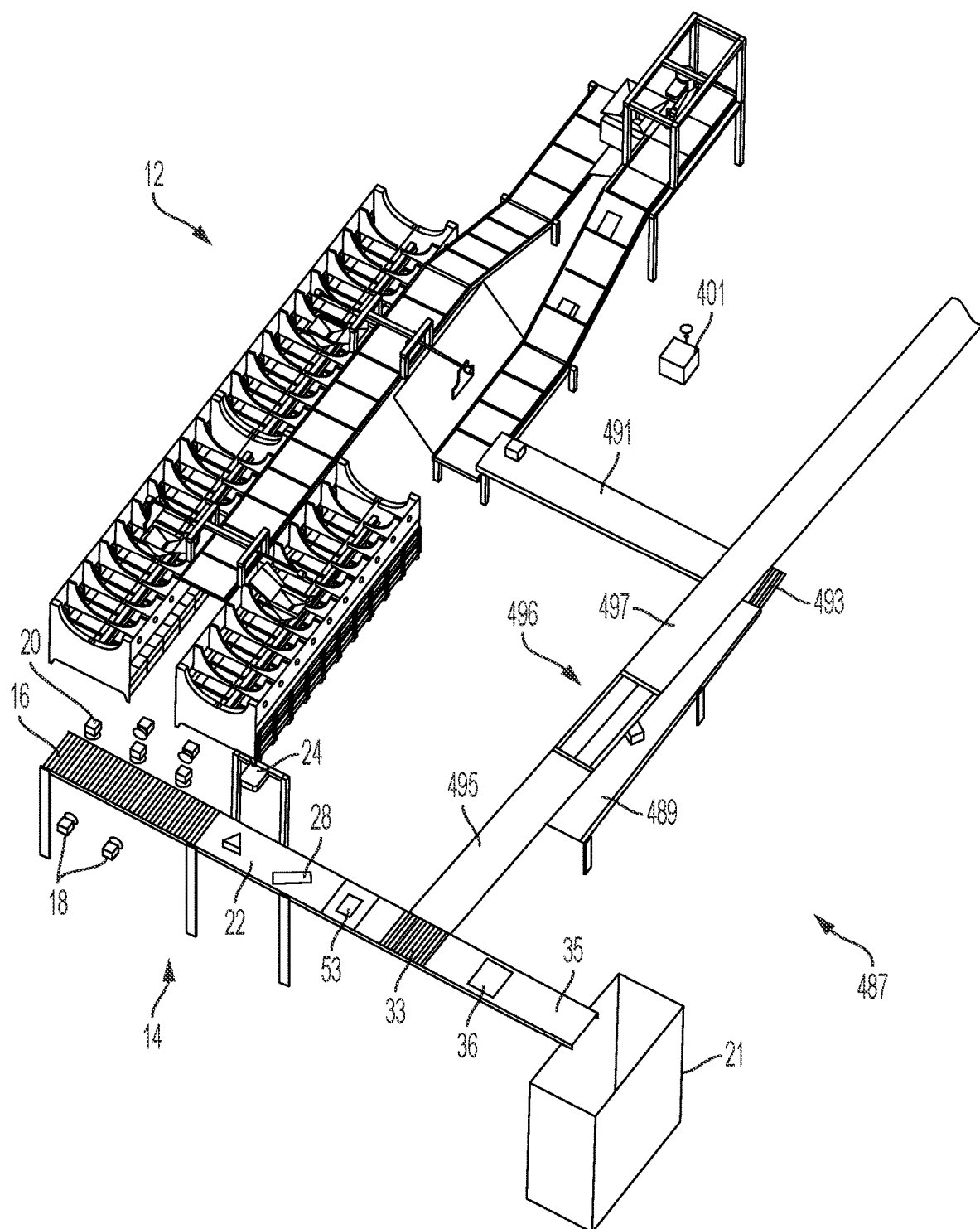
FIG. 49 shows an illustrative diagrammatic view of an induction system in accordance with an aspect of the invention that includes a sloping conveyor with a conveyor section that includes bomb-bay drop doors.
Figure 50A:
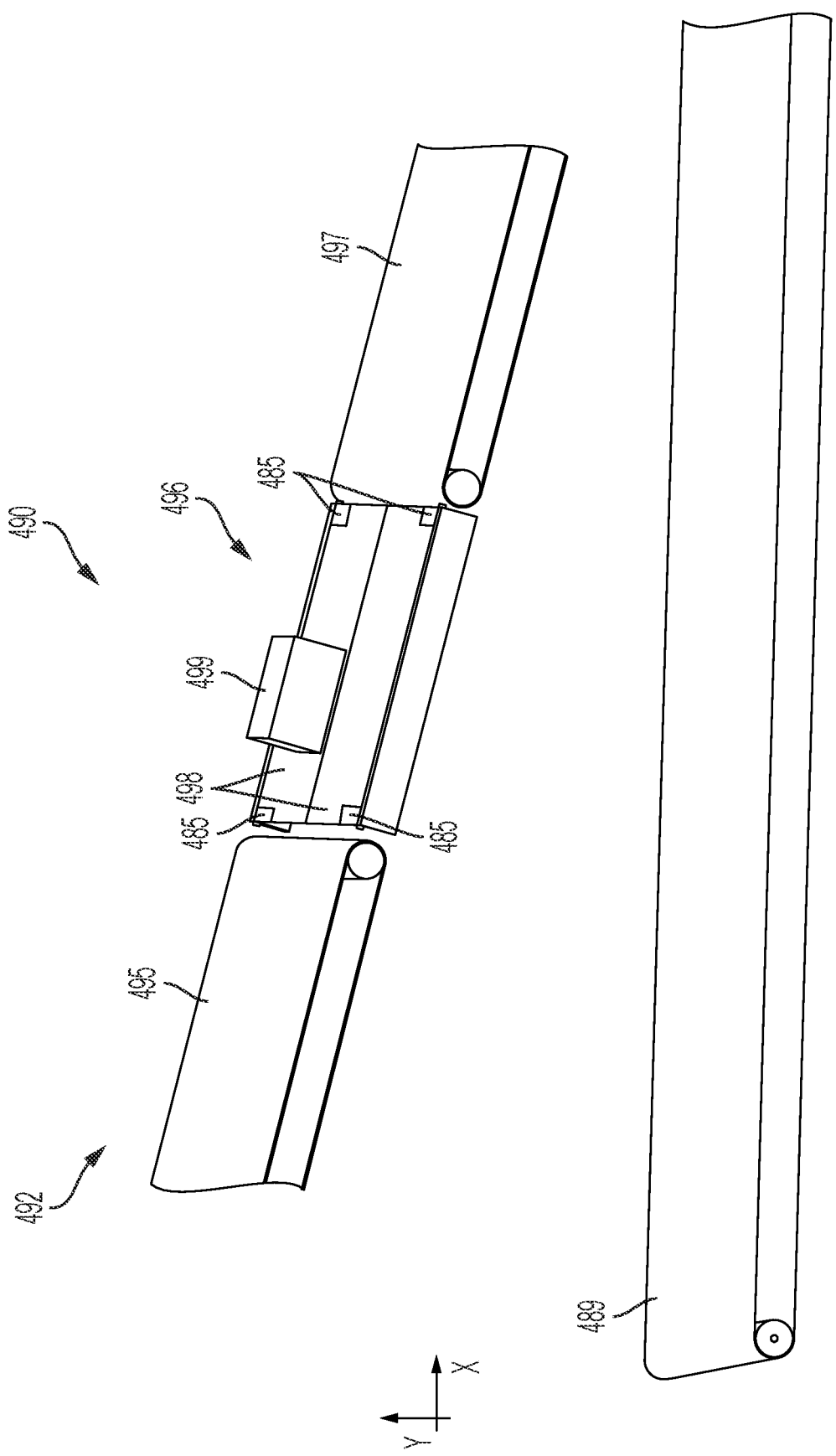
FIGS. 50A and 50B show illustrative diagrammatic views of the conveyor section of FIG. 49 over a horizontal conveyor in accordance with an aspect of the invention.
Figure 50B:
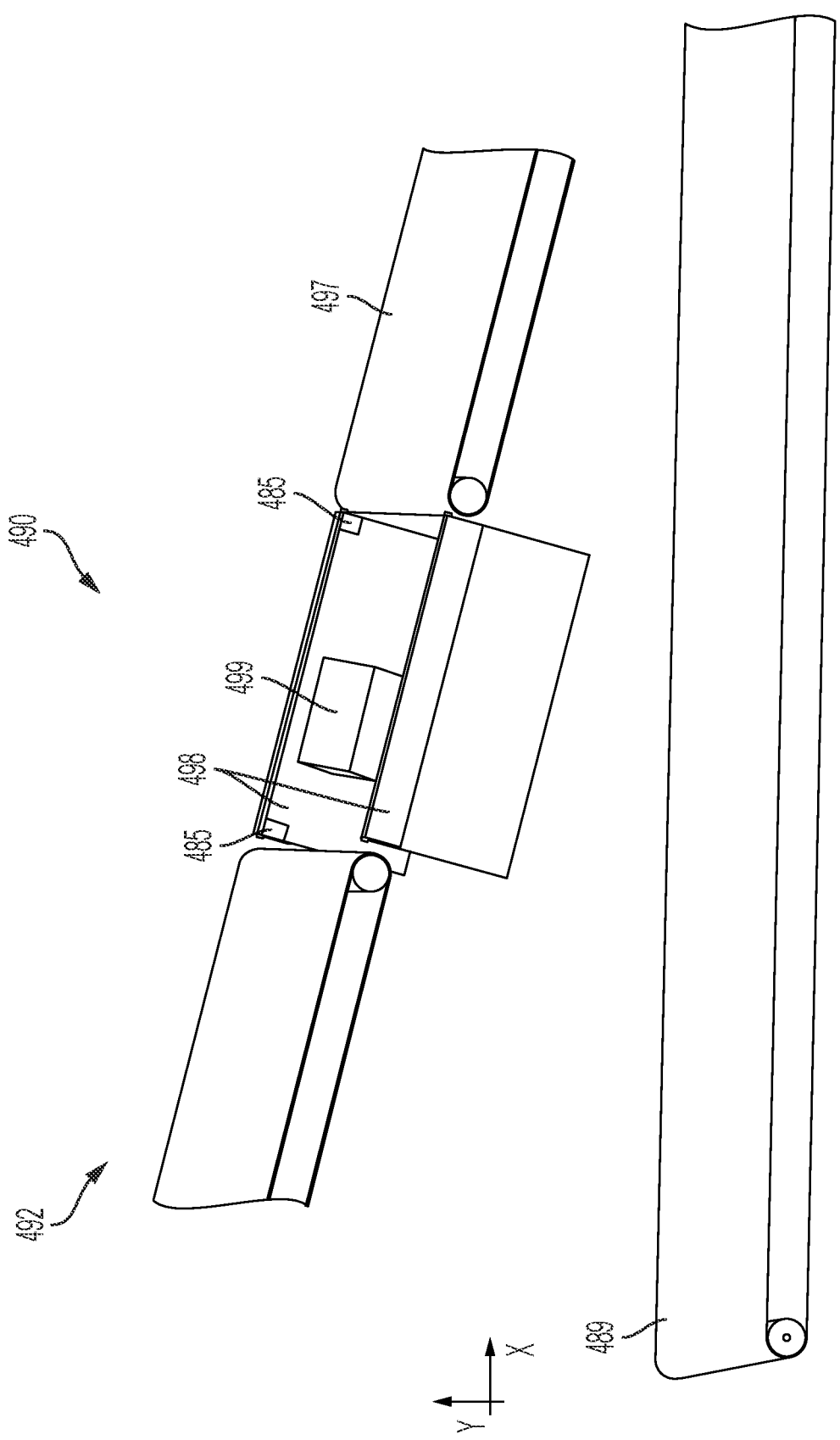

FIG. 49 shows an induction system 487 with an object processing system 12. The induction system 487 includes an input section 14 including a response evaluation section 16 of a conveyor 22, side perception units 18, overhead perception units 20, multipurpose perception unit 24, weight sensing conveyor section 53 and multidirectional conveyor 33 as discussed above with reference to FIGS. 1-8, as well as an exception bin 21 for receiving non-processable objects (e.g., 36) via conveyor 35. The induction system 487 also includes a sloping conveyor 492 that includes sections 495, 496 and 497 and travels over a second lower conveyor 489. With further reference to FIGS. 50A and 50B, when an object 499 travels from the conveyor section 495 onto the conveyor section 496, weight sensors (e.g., force torque sensors) 485 detect the weight of the object. If the object is either above or below a specified weight, the object is dropped onto the lower conveyor 489 and is routed via multidirectional conveyor 493 toward object processing system 12 via conveyor 491. The system may elect to drop an object through the bomb-bay doors 498 is the object is too heavy or too light for processing by processing stations coupled to the conveyor section 497 as discussed above. The doors may be actuated by motors 483. Alternatively, the bomb-bay conveyor may designed to operate via spring mechanisms that open then the weight is above a threshold, and the conveyor 497 may lead to appropriate object processing systems.

FIGS. 51A and 51B show end views of the bomb-bay doors 498 over the conveyor 494 where the doors are closed (FIG. 51A), and opened (FIG. 51B), such as by s a spring or motor actuator responsive to input from force torque sensors, for dropping an object 499 from the upper conveyor 496 to the lower conveyor 489. In accordance with further aspects, the doors may include weight-triggered flexible interlocking fingers or tynes, such as, for example shown in FIGS. 66A and 66B.

Figure 52A:
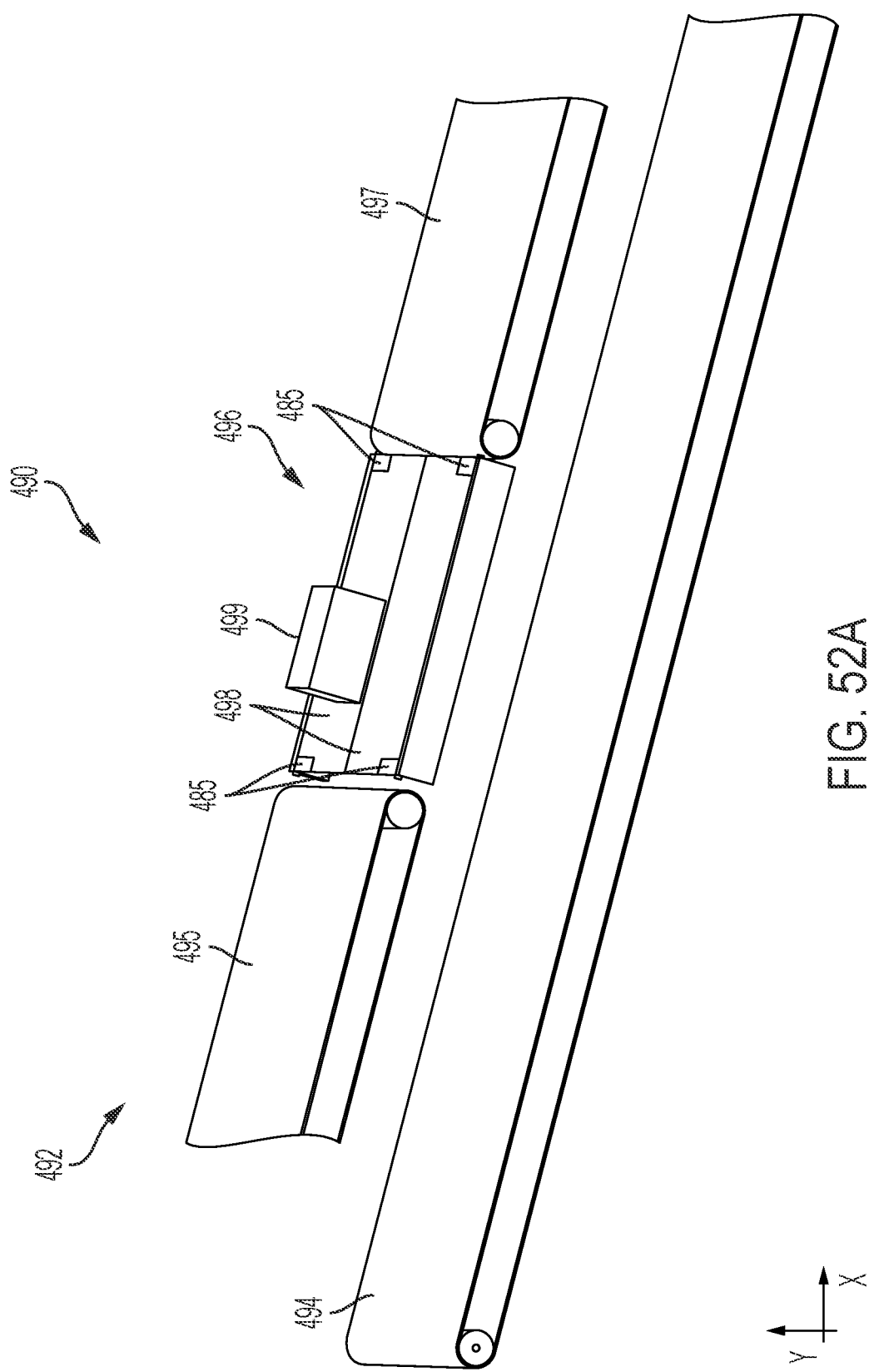
FIGS. 52A and 52B show illustrative diagrammatic views of a conveyor section for use in accordance with an aspect of the invention that includes bomb-bay doors over a further sloped conveyor.
Figure 52B:
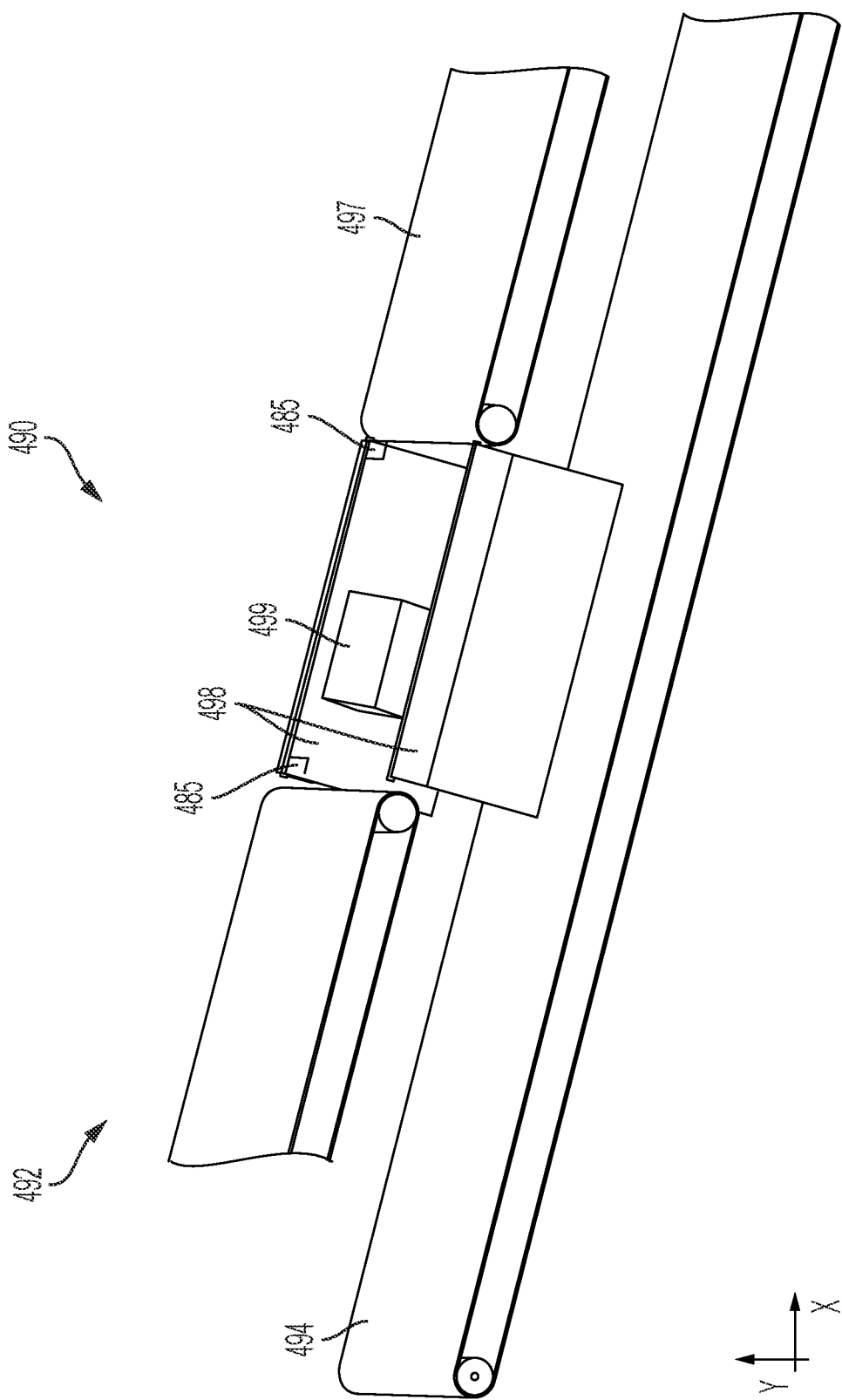

FIGS. 52A and 52B, for example, show a system 491 that includes an upper sloped conveyor system 492 that runs above a lower sloped conveyor 494. The system 491 may be used with any of the induction systems of FIGS. 1, 9 and 11, replacing one or more of the conveyors shown in FIGS. 1, 9 and 11, e.g., as shown by example in FIG. 49. The lower conveyor 494 of such systems may alternately lead to an exception bin. The upper conveyor 492 includes active conveyor sections 495, 497, as well as set of bomb-bay doors. The upper conveyor 492 (as well as the lower conveyor 494) may be inclined (extend in X and Y directions), such that an object 499 on top of the doors 498 may slide over the doors to the next conveyor section 497 if it is not dropped. With reference to FIG. 52B, if the doors 498 are passive bomb-bay doors, and if the object 499 is too heavy (e.g., overcomes a spring mechanism), then the doors 498 will open dropping the object 499 to the lower conveyor 494. If the doors 498 are motor-actuated bomb-bay doors, and if the object 499 is determined to be too heavy (e.g., by a different weighing system disclosed above such as if conveyor section 495 is a weighing conveyor as discussed above), then the doors 498 will be opened by a motor, dropping the object 499 to the lower conveyor 494.

Figure 53:
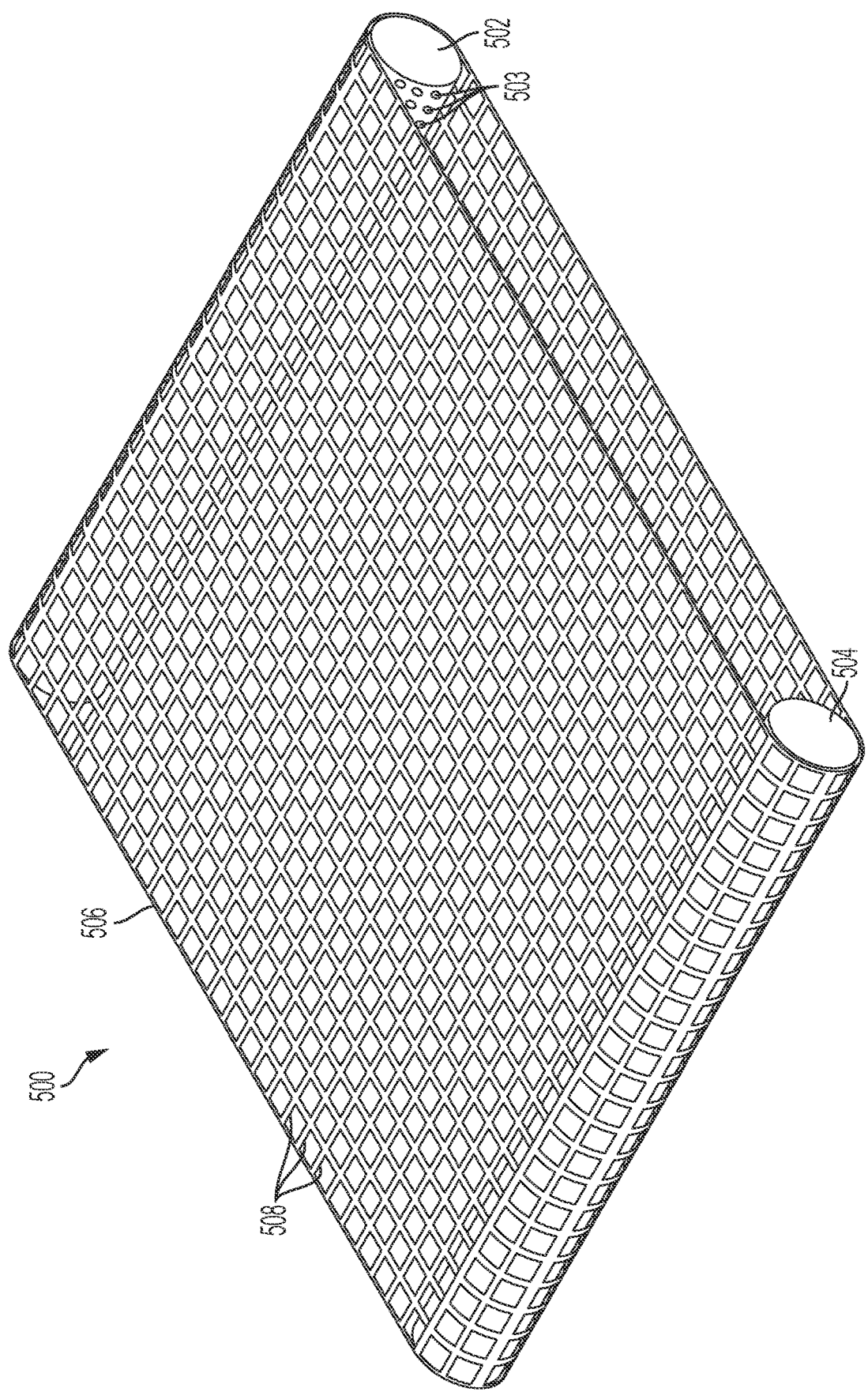
FIG. 53 shows an illustrative diagrammatic view of an air-permeable conveyor section for use in accordance with an aspect of the invention with a vacuum roller.

FIG. 53 shows an air-permeable conveyor 500 that includes a conveyor material 506 with openings 508 therein that permit air to flow through the material 506. The air-permeable conveyor 500 may be formed of a perforated, mesh or woven material and is driven over rollers 502, 504, and one roller (e.g., 502) includes openings 503 and provides a vacuum through the openings 503 into the roller 502. Such a system may be used in an induction system 489 with an object processing system 12 as shown in FIG. 54.

Figure 54:
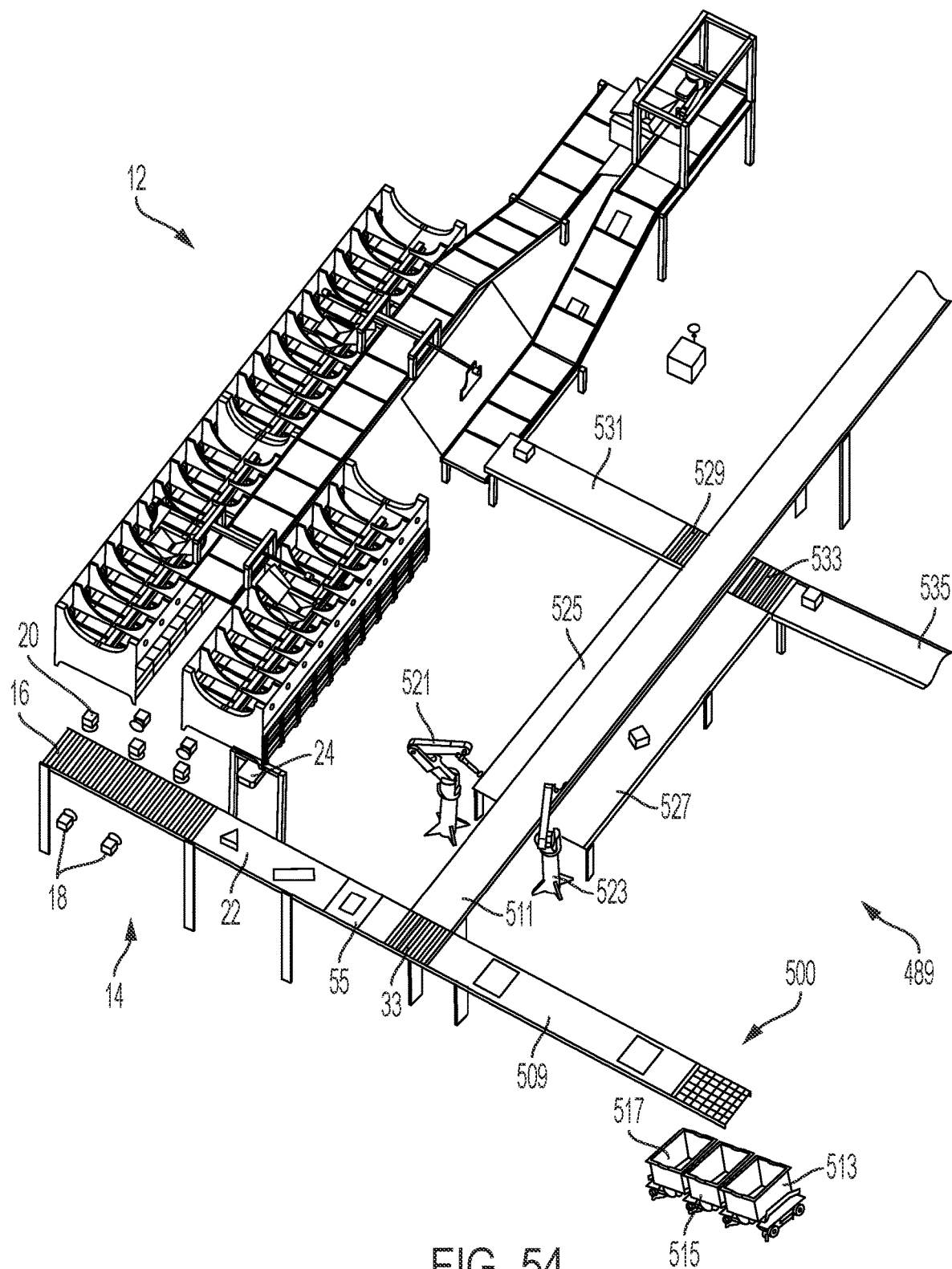
FIG. 54 shows an illustrative diagrammatic view of an induction system in accordance with an aspect of the present invention that includes an air-permeable conveyor section and a vacuum roller.

The induction system 489 of FIG. 54 includes an input section 14 including a response evaluation section 16 of a conveyor 22, side perception units 18, overhead perception units 20, multipurpose perception unit 24, weight sensing conveyor section 53 and multidirectional conveyor 33 as discussed above with reference to FIGS. 1-8, as well as an additional conveyor 509 leading to the air-permeable conveyor 500. The free end of the air-permeable conveyor is positioned over two or more receiving stations, which may be conveyors, chutes, or automated carriers. Three automated carriers 513, 515, 517 are shown in FIG. 54. Objects that are to processed, may be routed by multidirection conveyor 33 to conveyor 511, which runs between a pair of articulated arms 521, 523 as well as a pair of conveyors 525, 527, which via further multidirectional conveyors 529, 533 lead to object processing conveyors 531 (leading to object processing system 12), and 535.

Figure 55A:
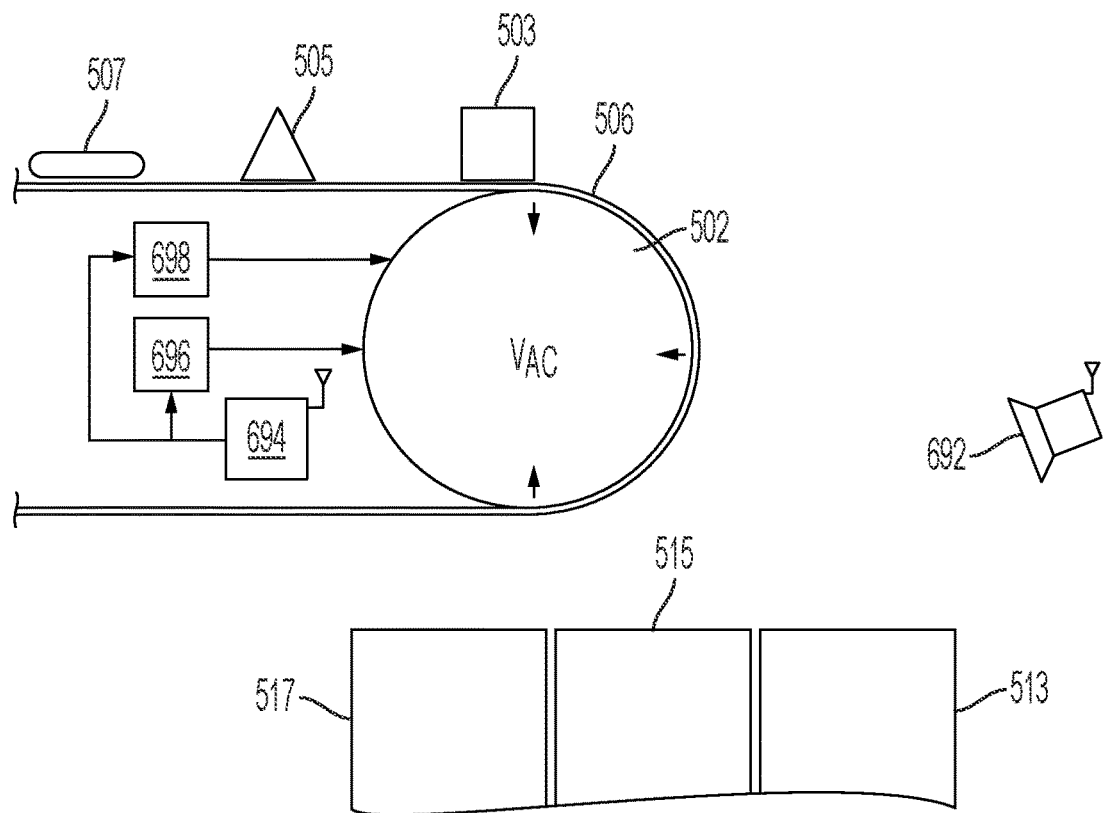
FIGS. 55A-55D show illustrative diagrammatic side views of the air-permeable conveyor section and vacuum roller of FIG. 54 in a system providing sortation by weight.
Figure 55B:
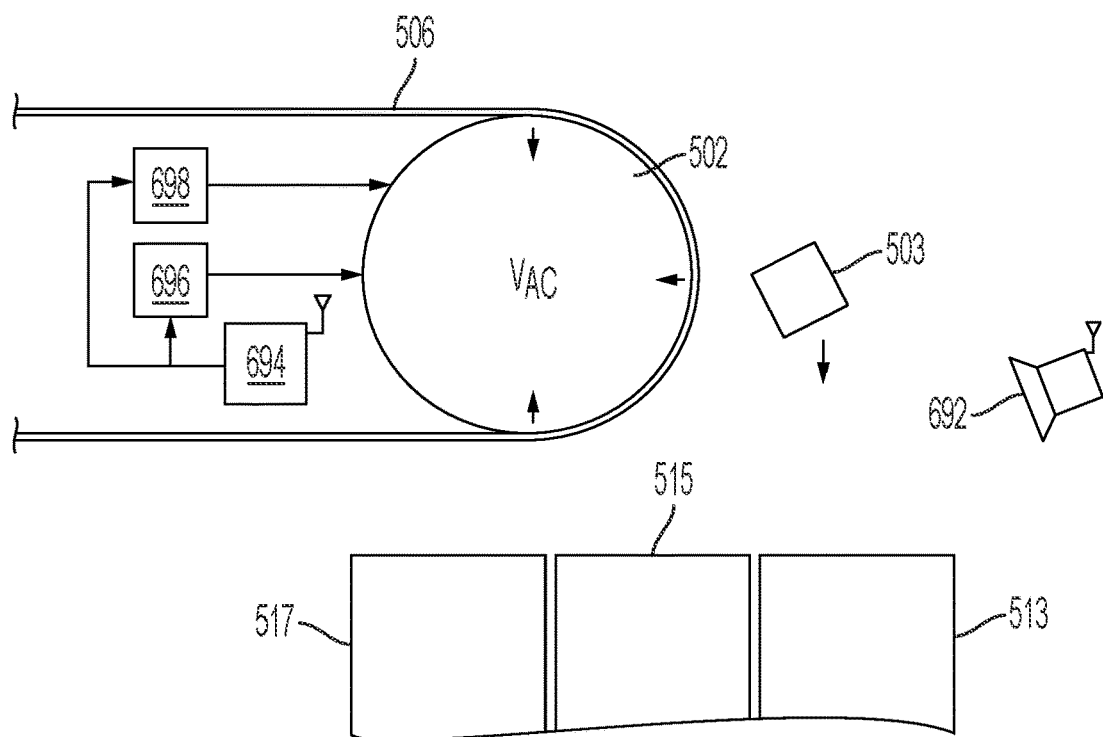
Figure 55C:
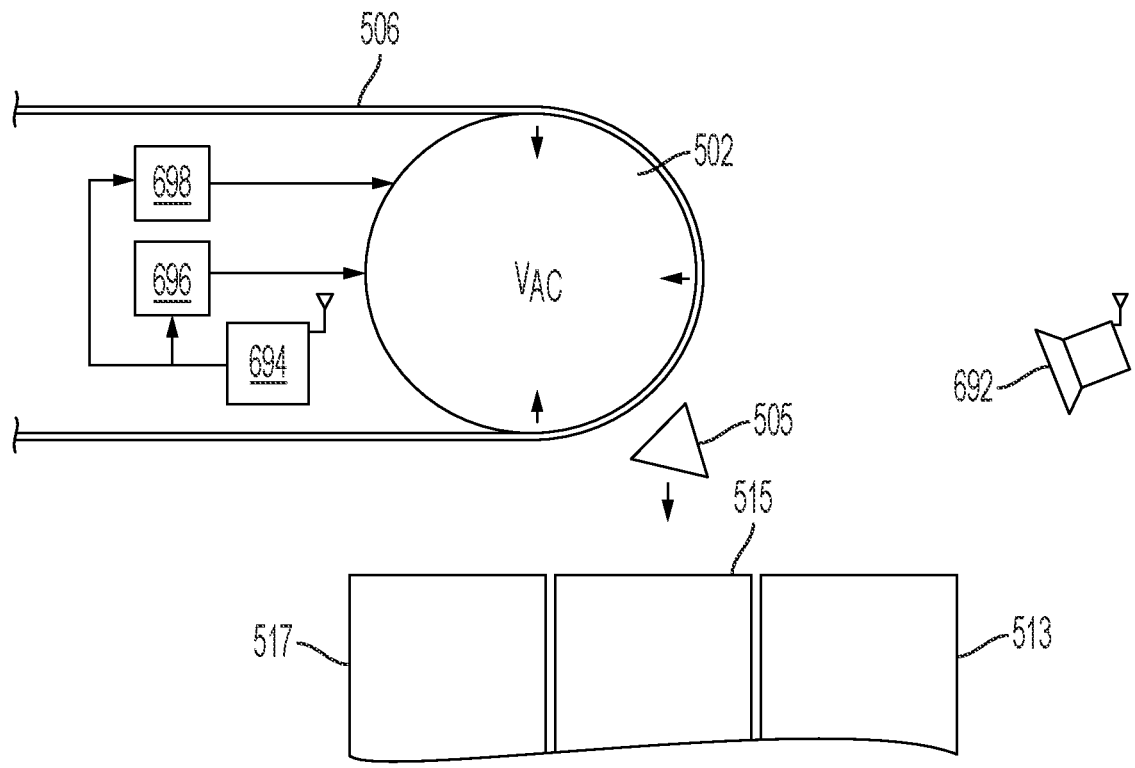
Figure 55D:
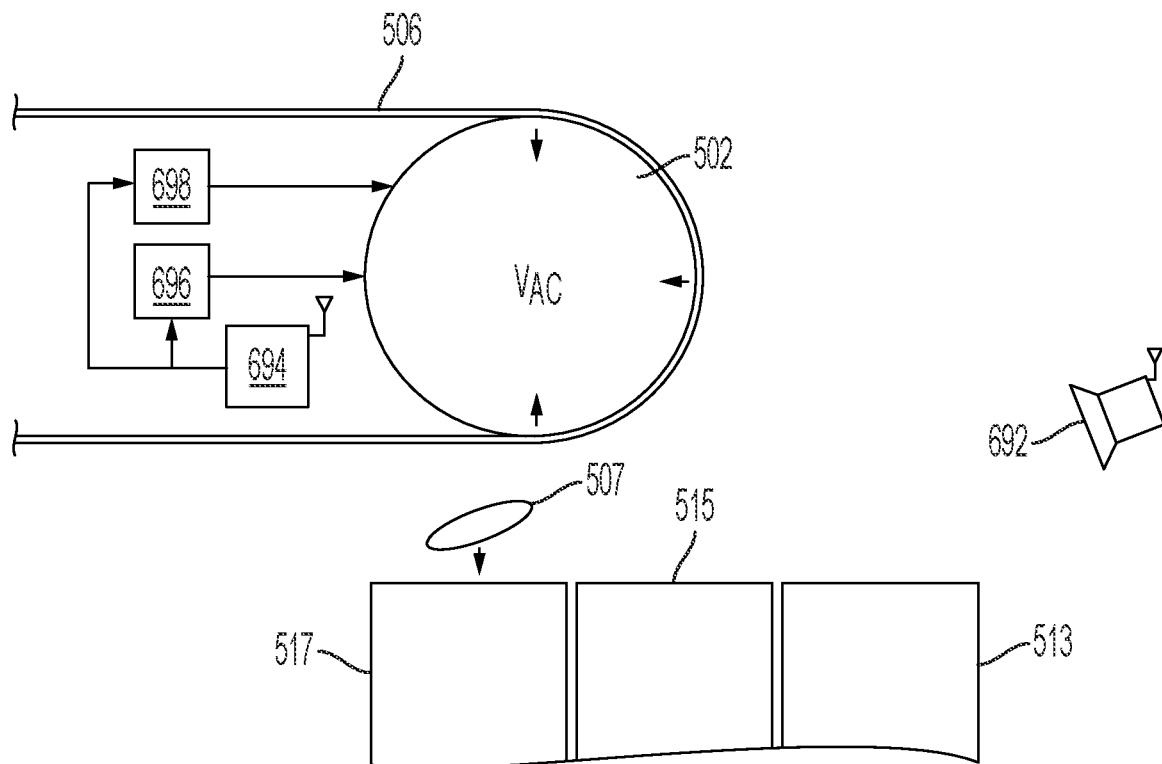

With further reference to FIG. 55A, objects may be provided on the conveyor 500 with the vacuum applied, and as objects pass around the outside of the roller, the heavier ones may directly fall from the conveyor (e.g., object 503) into bin 513 as shown in FIG. 55B. Somewhat lighter objects (e.g., 505) may travel farther under the roller 502 into bin 515 as shown in FIG. 55C, and very light objects (e.g., 507) may drop from the now upside down conveyor 506 into bin 517 only when the conveyor leaves the vacuum provided through the roller 502, as shown in FIG. 55D. With such a system, the objects also need not be singulated on the conveyor since objects next to each other will fall according to their own response to the vacuum. Additionally, one or more perception systems 692 may monitor the actions of objects being dropped from the conveyor, and may communicate with one or more control systems 694 to adjust any of the vacuum pressure at the conveyor (via vacuum controller) 696 or conveyor speed (via rotational speed controller) 498. The system of FIGS. 53 and 55A-5D may be used for example, in further systems as disclosed herein.

Figure 56:
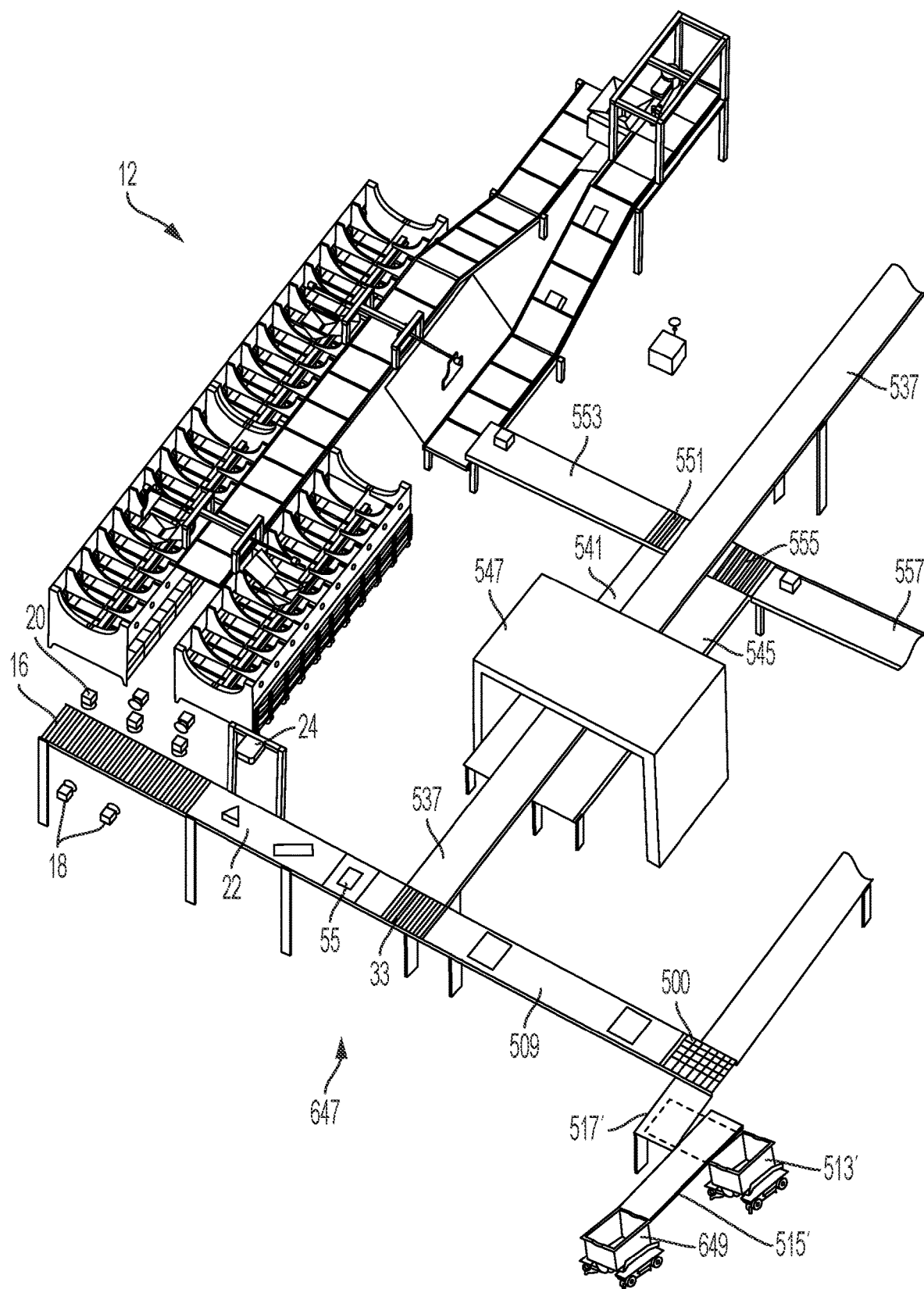
FIG. 56 shows an illustrative diagrammatic view of an induction system in accordance with an aspect of the present invention that includes a conveyor-to-conveyor transfer station.

Again, the receiving stations may be any of automated carriers, chutes or conveyors. FIG. 56 shows an induction system 647 that includes an input section 14 including a response evaluation section 16 of a conveyor 22, side perception units 18, overhead perception units 20, multipurpose perception unit 24, weight sensing conveyor section 53 and multidirectional conveyor 33 as discussed above with reference to FIGS. 1-8, as well as an additional conveyor 509 leading to the air-permeable conveyor 500. In this example, the air-permeable conveyor is positioned over an automated carrier 513', a chute 515' that leads to an automated carrier 649, and a carrier 517'. Objects that are to processed, may be routed by multidirection conveyor 33 to conveyor 537, which runs between a pair of conveyors 541, 545, which via further multidirectional conveyors 551, 555 lead to object processing conveyors 553 (leading to object processing system 12), and 557. The conveyors 537, 541 and 545 also pass through an object transfer station 547 as discussed further below with reference to FIGS. 57-69, and in some examples, conveyors 541 and 545 are lower than conveyor 537, while in other examples, each is at the same height. At the object transfer station, objects are transferred from a conveyor to any of a variety of further units such as to other conveyors, chutes or mobile units.

In accordance with further aspects of the invention for example, induction systems may be used that may discriminate between objects by passing objects by an air blower that pushes lighter packages from a stream of packages, leaving the heavier packages. The heavier packages' larger inertia overcomes the air resistance arising from the blown air. For lighter packages, the air resistance exceeds the lighter packages' lower inertia. The air flow are tuned to so that for common package types, the stream blown away contains to the greatest extent those packages meeting the weight specifications.

Figure 57:
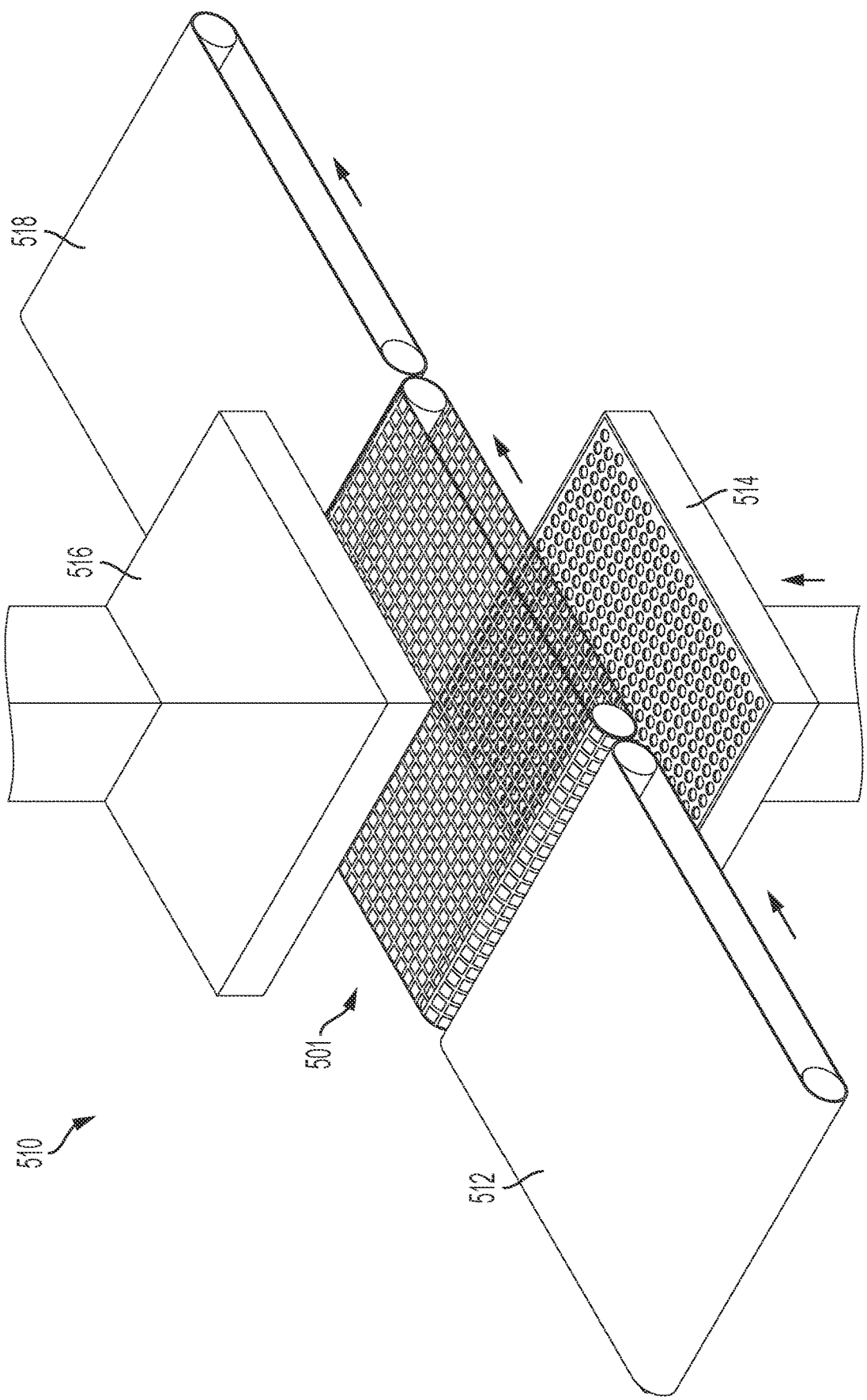
FIG. 57 shows an illustrative diagrammatic view of an air-permeable conveyor section for use in accordance with an aspect of the invention with a blower and a vacuum source.

FIG. 57 for example, shows an air permeable conveyor 501 similar to that discussed above with reference to FIG. 53 that is designed to permit a substantial amount of air to be blown through openings 508 in a web 506 that moves (providing the conveying surface) along rollers. As shown in FIG. 57 such an air-permeable conveyor 501 may be used in a system 510 in which objects are moved along an approach conveyor 512, and over the air-permeable conveyor 501. Below the air-permeable conveyor 501 is a blower source 514 that blows air through the air-permeable conveyor 500, and above the air-permeable conveyor 501 is a vacuum source 516 that draws air through the air-permeable conveyor 501. Both the blower 514 and the vacuum source 516 may include a screen or array of openings (as partially shown in FIG. 60). The combination of the blower 514 and the vacuum source 516 will cause some objects to be lifted off of the conveyor 501. Objects that are too heavy to be lifted off of the conveyor 501 will travel along the conveyor 501 and be transferred to a follower conveyor 518. The system 510 may be used in place of any of the conveyors in the systems of FIGS. 1, 9 and 11 with the lighter objects being then routed to a light object processing station as discussed further with reference to FIGS. 59A-59C.

Figure 58:
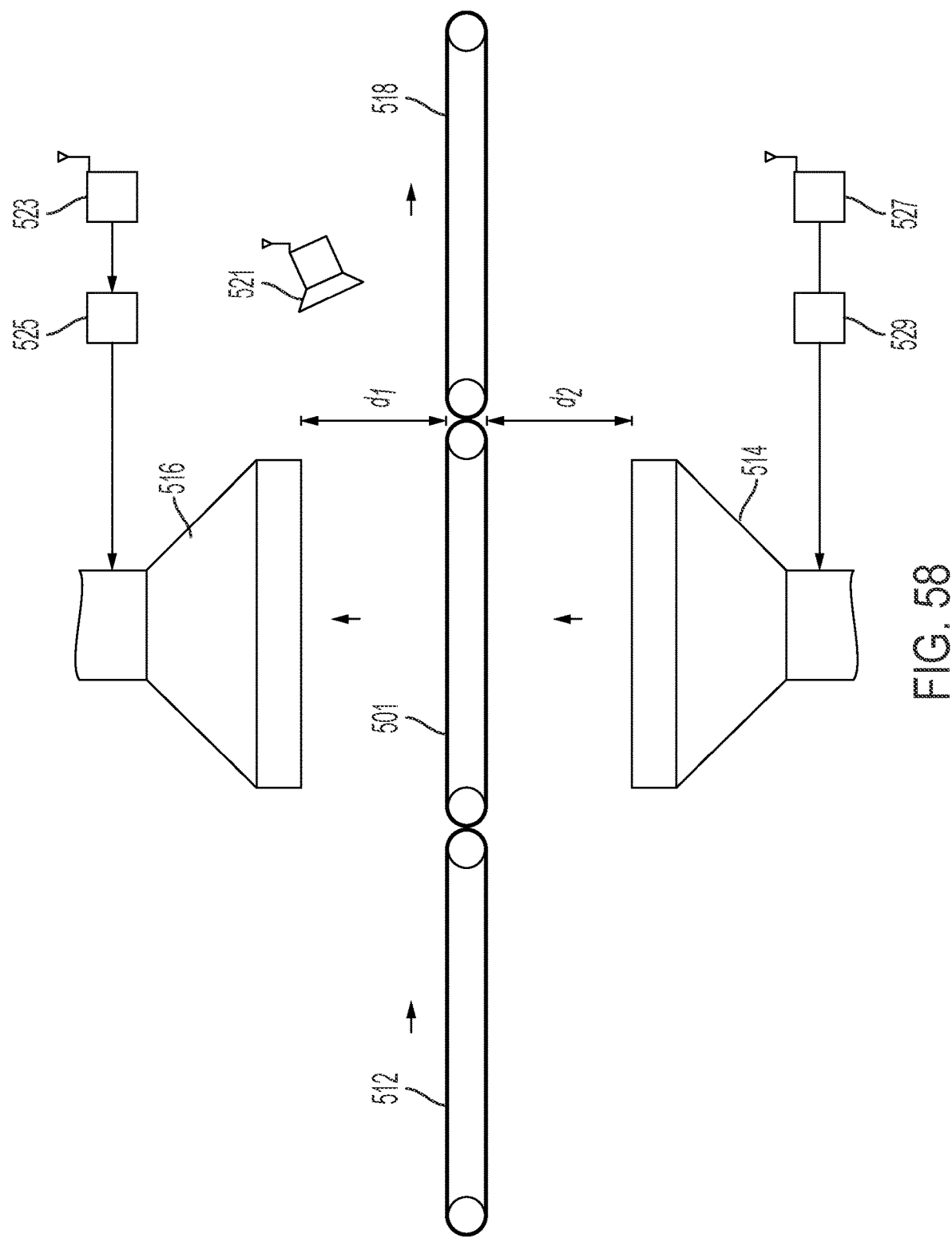
FIG. 58 shows an illustrative diagrammatic side view of the air-permeable conveyor section, blower and vacuum of FIG. 57.

Additionally, and as shown in FIG. 58, the system may further include one or more perception systems 521 that communicate with a vacuum control processor 523 coupled to a vacuum controller 525, and that communicate with a blower control processor 527 coupled to a blower controller 529. In this way, operation of the system may be monitored and rate of flow of air by the blower and the vacuum may be adjusted as required.

Figure 59A:
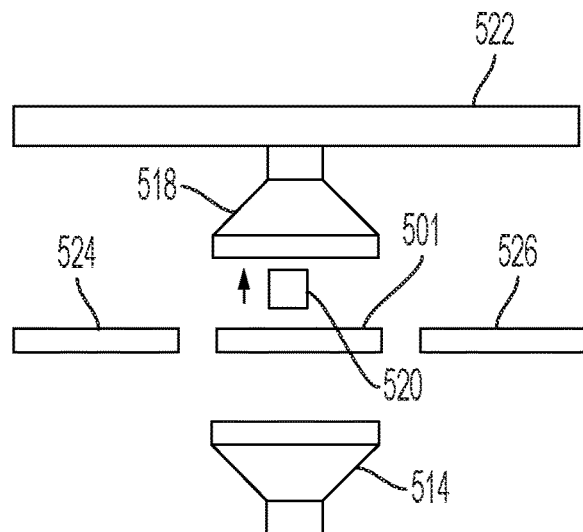
FIGS. 59A-59C show illustrative diagrammatic side views of the air-permeable conveyor section, blower and vacuum of FIG. 57 being used to move an object.
Figure 59B:
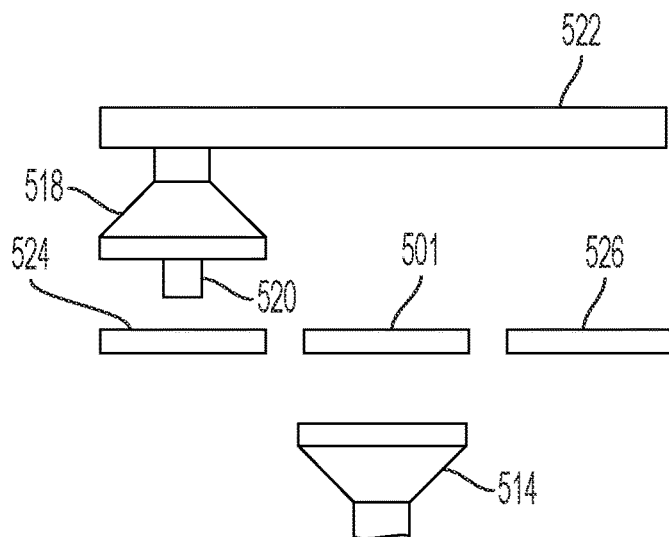
Figure 59C:
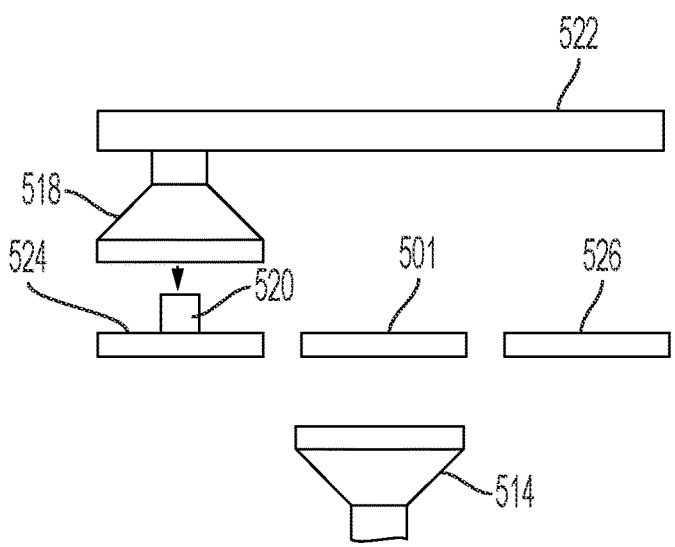

With reference to FIG. 59A, when an object 520 is lifted toward the vacuum source 516, it is initially pushed by air from the blower source 514 and lifted by the vacuum source 516. Once the object contacts a screen on the vacuum source 516, the vacuum force will be strong enough that the air from the blower is no longer necessary to hold the object against the vacuum source 516. The vacuum source 516 may be movably mounted on a rail 522 such that the vacuum source 518 may be moved to be positioned over any of conveyor 501 or adjacent conveyors 524, 526, With reference to FIG. 59B, the vacuum source 516, for example, may be moved over conveyor 524 while holding the object 520, and may then cease the vacuum, permitting the object to fall onto the conveyor 524 as shown in FIG. 59C. The vacuum source 516 is then returned to the position over the conveyor 501. In this way, vacuum sources and/or blower sources may be used to distinguish and separate objects of different characteristics such as weight or mass.

In accordance with further aspects, the system may further provide bulk picking by such vacuum systems. Objects may pass by an area in which a large vacuum surface is suspended upside down over the objects. The system may grip objects in bulk—many at a time—but is only able to achieve a lift for light objects, while heavy objects are not lifted out of the object stream. The balance of vacuum lifting force verses weight and packaging material may be adjusted such that either all objects that remain have a minimum weight, or that all objects that are lifted are below a maximum weight.

Figure 60:
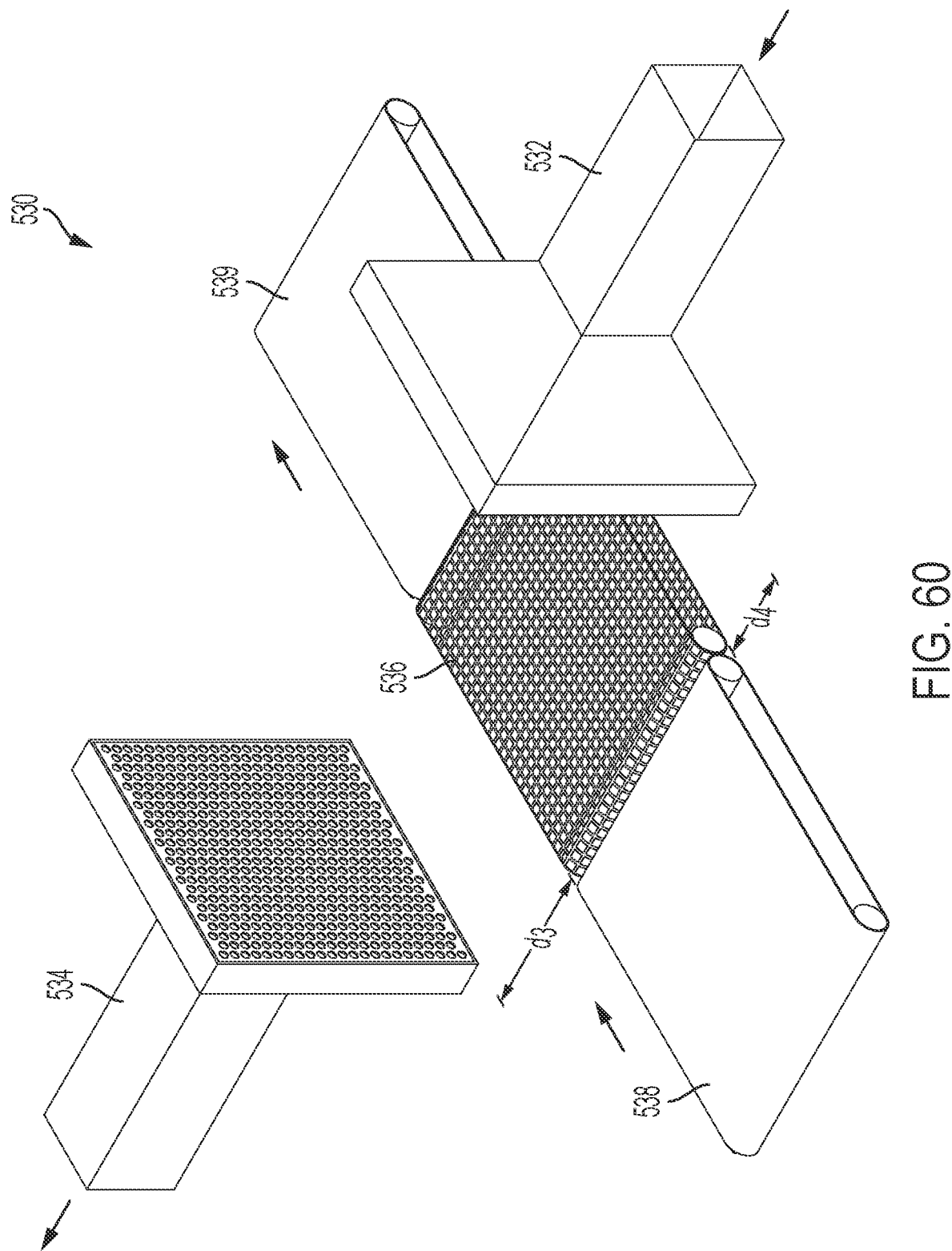
FIG. 60 shows an illustrative diagrammatic view of an air-permeable conveyor section for use in accordance with an aspect of the invention with a side blower and a side vacuum source.

Induction systems in accordance with a further embodiment of the invention may include system 530 that includes a blower source 532 and a vacuum source 534 that are positioned on either side of an air-permeable conveyor 536 as shown in FIG. 60. The use of the air-permeable conveyor may facilitate drawing certain objects toward the vacuum source 534 by permitting a greater flow of air. The conveyor 536 is fed objects by an in-feed conveyor 538, and provides objects (that are not removed from the conveyor 536 by the blower source 532 and vacuum source 534) to an out-feed conveyor 539. Objects that are removed from the conveyor 536 fall onto any of another conveyor below and to the side of the conveyor 536 or a chute or other mobile carrier as discussed in more detail below. Monitoring and control systems similar to that of FIG. 58 may also be used with the system of FIG. 60.

Figure 61:
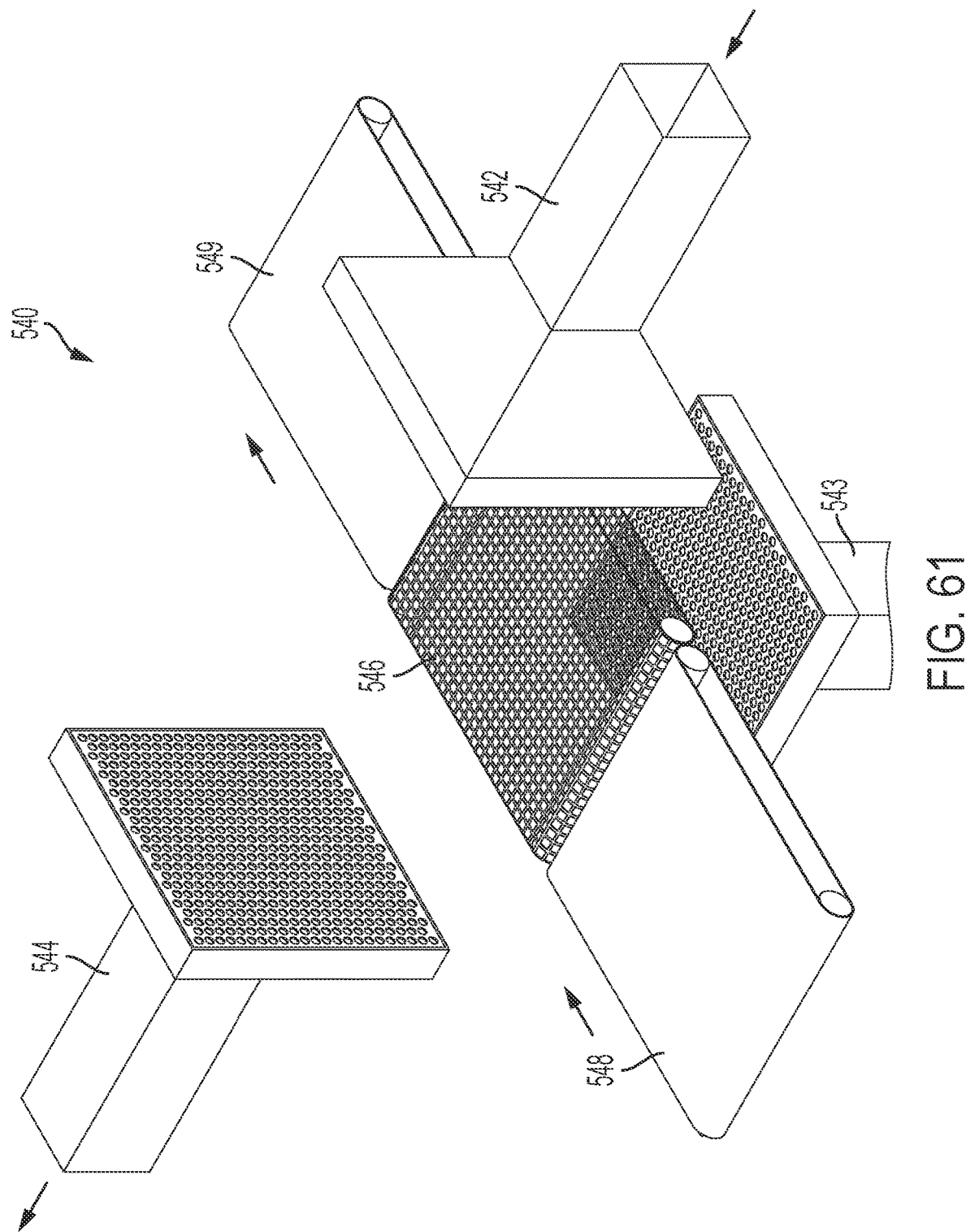
FIG. 61 shows an illustrative diagrammatic view of an air-permeable conveyor section for use in accordance with an aspect of the invention with a side blower and a side vacuum source, as well as an underside blower source.

With reference to FIG. 61, a system 540 in accordance with a further embodiment of the invention may include a blower source 542 and a vacuum source 544 that are positioned on either side of an air-permeable conveyor 546, as well as another blower source 543. The conveyor 546 is fed objects by an in-feed conveyor 548, and provides objects (that are not removed from the conveyor 546 by the blower sources 542, 543 and vacuum source 544) to an out-feed conveyor 549. The blower source 543 may further facilitate moving objects with the blower source 542 and the vacuum source 544. Again, objects that are removed from the conveyor 546 fall onto any of another conveyor below and to the side of the conveyor 536 or a chute or other mobile carrier as discussed in more detail below. Monitoring and control systems similar to that of FIG. 58 may also be used with the system of FIG. 61.

Figure 62:
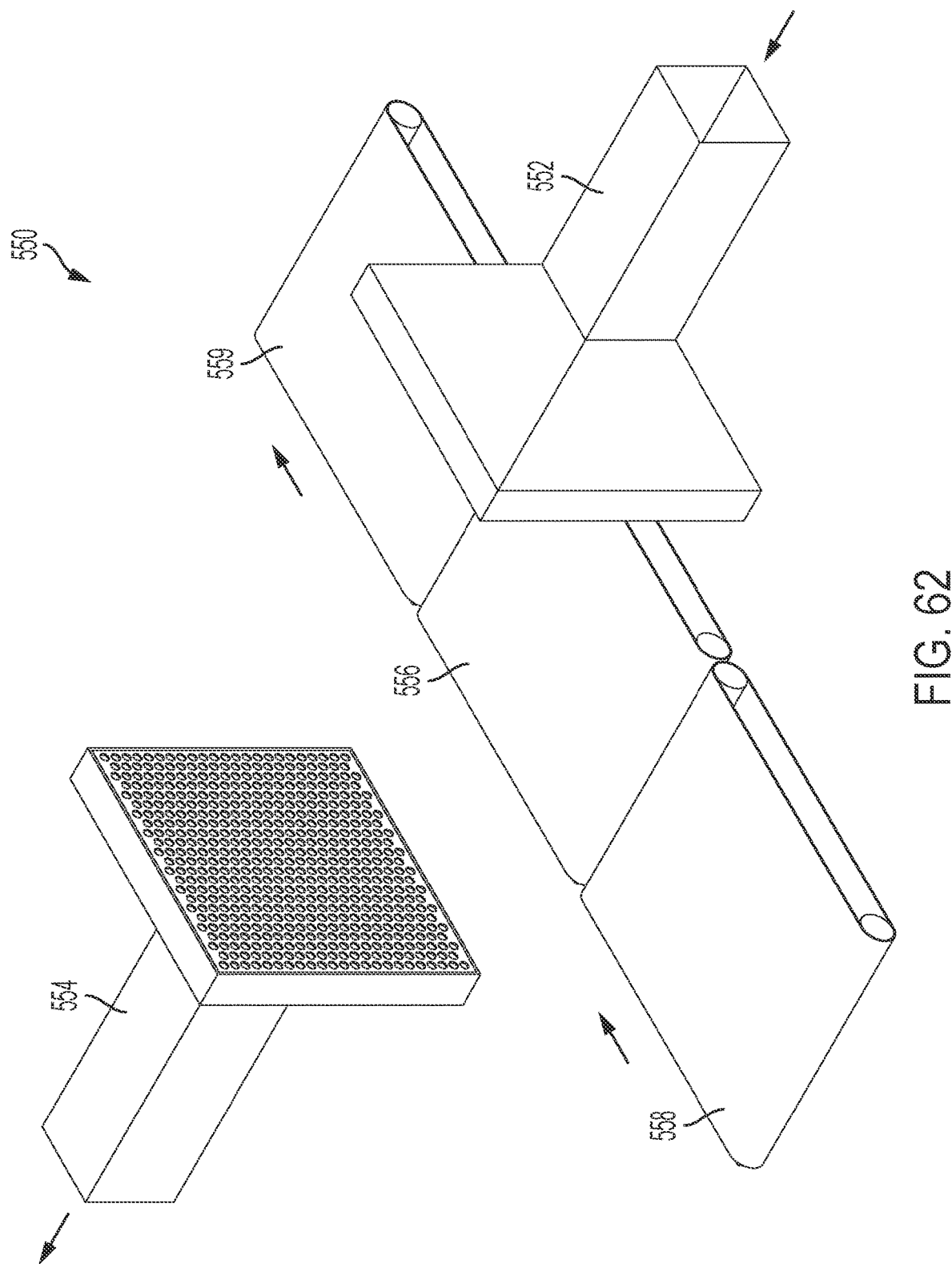
FIG. 62 shows an illustrative diagrammatic view of a conveyor section for use in accordance with an aspect of the invention with a side blower and a side vacuum source.

In applications where objects may be light enough to be moved off of a non-perforated conveyor (and/or the blower and vacuum source is high), a system 550 may be provided that includes a blower source 552 and a vacuum source 554 that are positioned on either side of a conveyor 556 as shown in FIG. 62. The conveyor 556 is fed objects by an in-feed conveyor 558, and provides objects (that are not removed from the conveyor 556 by the blower source 552 and vacuum source 554) to an out-feed conveyor 559. Again, objects that are removed from the conveyor 556 fall onto any of another conveyor below and to the side of the conveyor 556 or a chute or other mobile carrier as discussed in more detail below. Monitoring and control systems similar to that of FIG. 58 may also be used with the system of FIG. 62.

Figure 63:
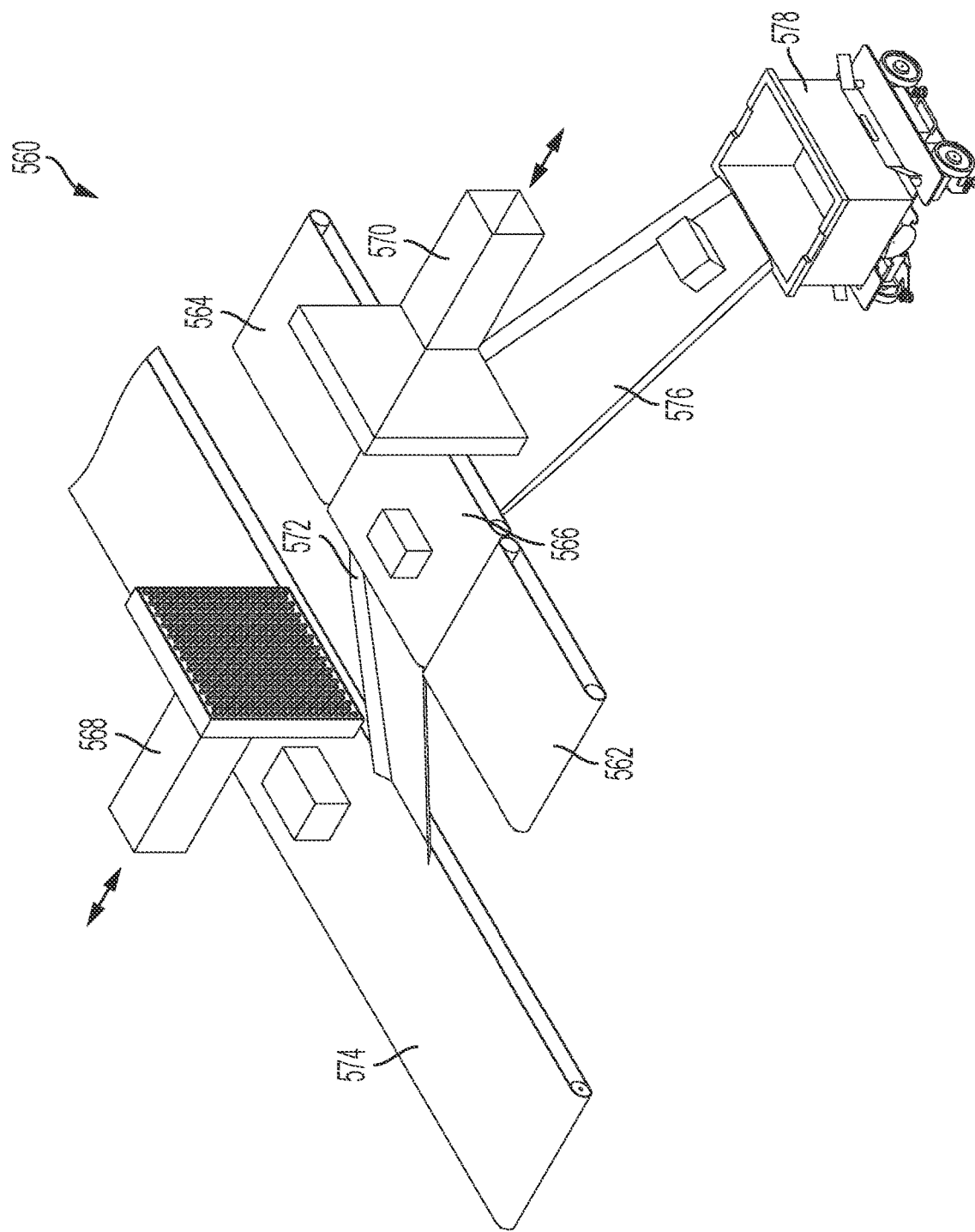
FIG. 63 shows an illustrative diagrammatic view of the conveyor section, side blower and side vacuum source of FIG. 62 for use in accordance with an aspect of the invention with opposing chutes.

As noted above, objects may be routed to any of chutes, conveyors, mobile carriers etc. FIG. 63, for example, shows a system 560 that includes a central conveyor having an in-feed conveyor section 562, an out-feed conveyor section 564, and a weight-sensing conveyor 566 as discussed above with reference to FIGS. 39A-43C. The system 560 also includes a pair of sources 568, 570 on either side of the weight-sensing conveyor 566, and each source 568, 570 may provide either forced air via a blower or vacuum, such that objects may be moved by a blower-vacuum pair in either direction off of the conveyor 566.

Figure 64:
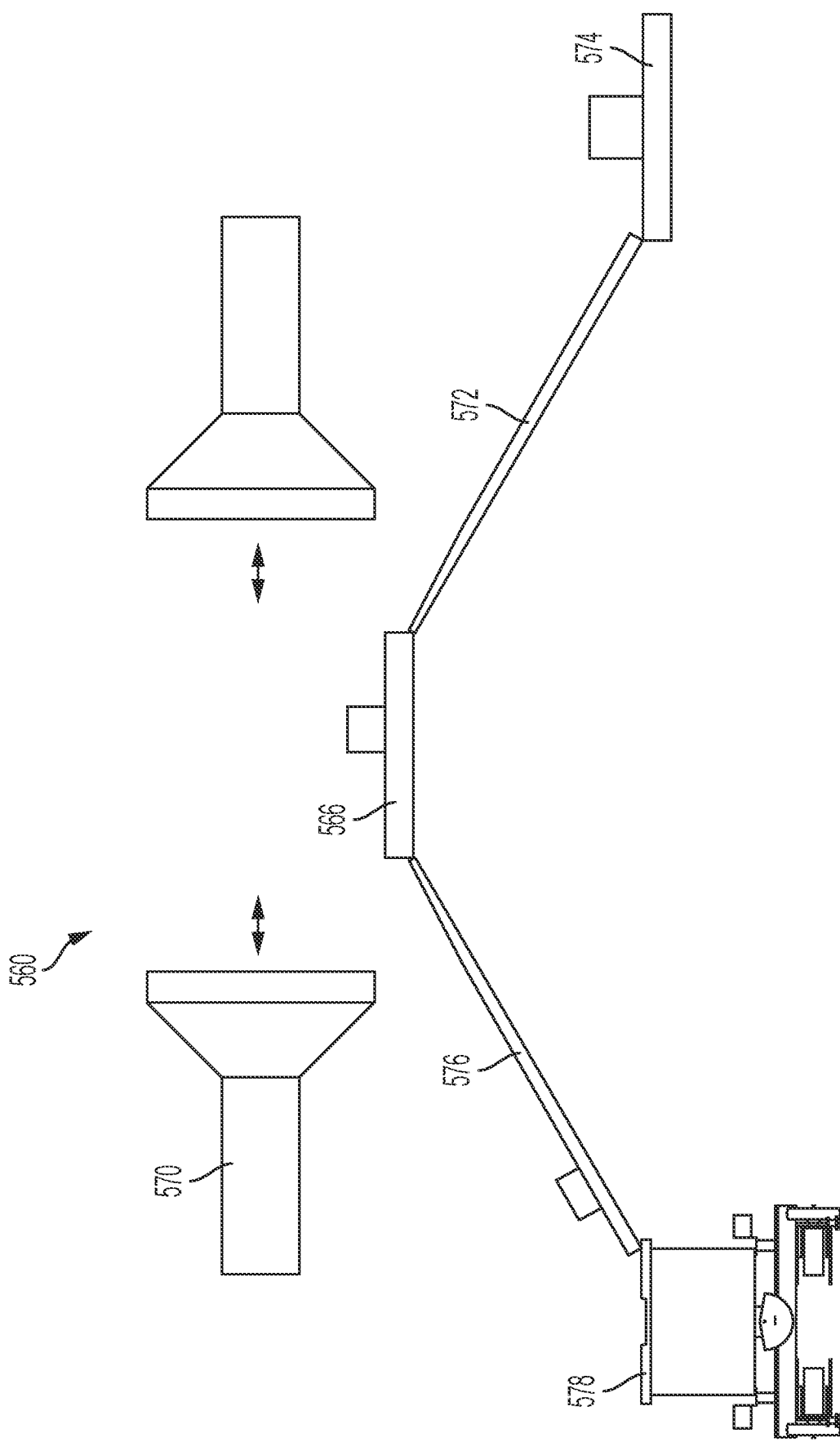
FIG. 64 shows an illustrative diagrammatic side view of the conveyor section, side blower, side vacuum source and opposing chutes of FIG. 63.

With further reference to the side view shown in FIG. 64, objects may either be blown onto a chute 572 that leads to a conveyor 574 (e.g., by engaging source 570 as a blower and source 568 as a vacuum source), or may be blown onto a chute 576 that least to a mobile carrier 578 (e.g., by engaging source 568 as a blower and source 570 as a vacuum source). The selection of whether an object is to be moved to either the conveyor 574 or the mobile carrier 578 may be a result of the air flow between sources 568, 570, or in other aspects, may be triggered by a detected weight of an object on the conveyor 566. In further aspects, the weight-sensing conveyor 566 may be employed to confirm an object's weight, and further to provide feedback to the control system (e.g., 100) such that the sources (together or independently) may be adjusted to more finely tune their object removal capability.

Figure 65:
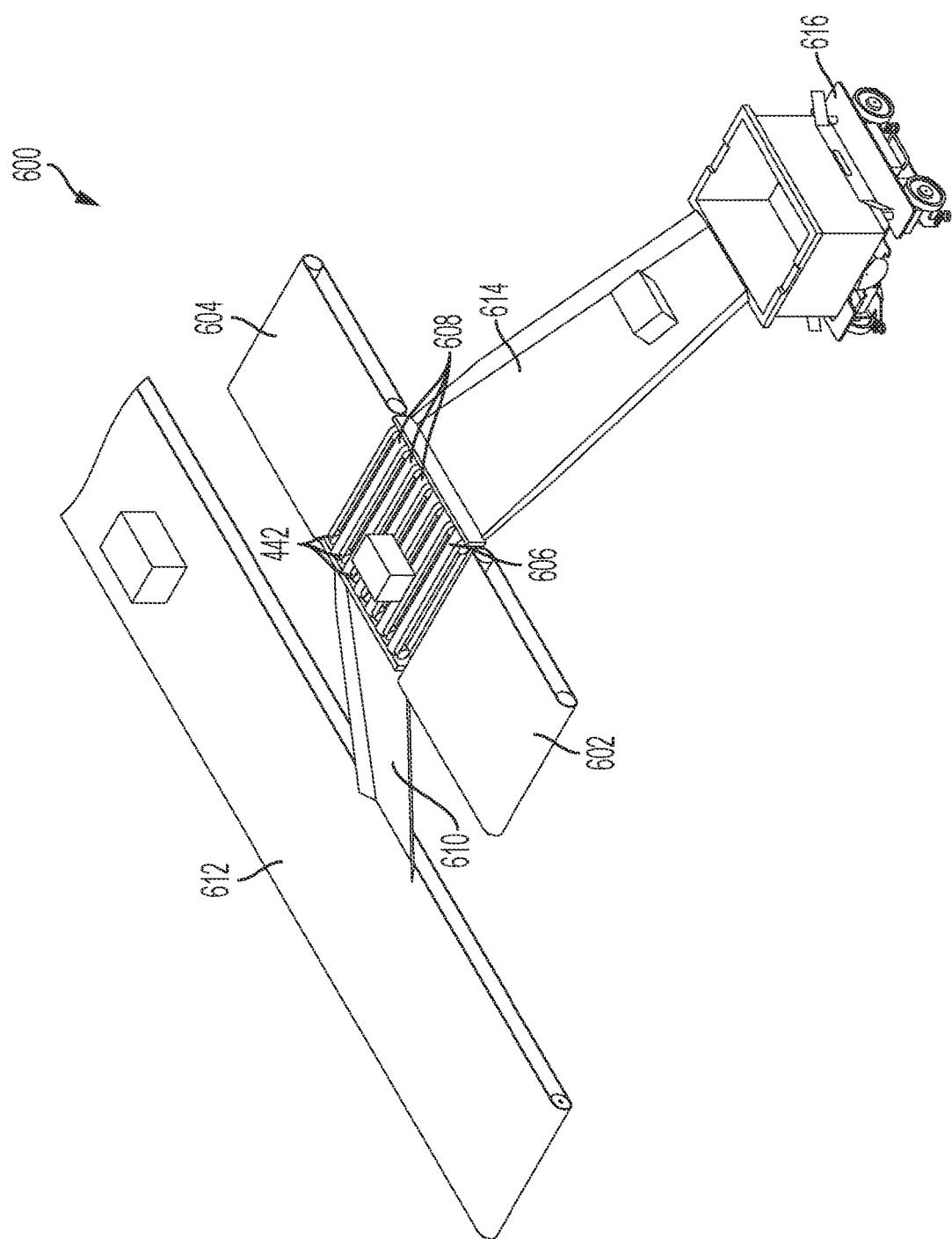
FIG. 65 shows an illustrative diagrammatic view of a conveyor section for use in accordance with an aspect of the invention that includes bi-directional rollers and a pair of opposing chutes.

FIG. 65 shows a system 600 that includes a central conveyor having an in-feed conveyor section 602, an out-feed conveyor section 604, and a weight-sensing multi-directional conveyor 606. The weight-sensing multi-directional conveyor 606 may include weight-sensing rollers 442 as discussed above with reference to FIG. 39A-43C, as well as a series of orthogonally disposed narrow conveying belts 608. Either of the rollers 442 or the belts 608 may be lowered/raised with respect to the other, to provide that objects may either remain on the conveyor 606 and be provided to the out-feed conveyor 604, or may be routed by the belts 608 either to a chute 610 that leads to a conveyor 612, or to a chute 614 that leads to a mobile carrier 616. The selection of whether an object is to be moved to either the conveyor 612 or the mobile carrier 616 or remain on the conveyor 606 may be triggered by a detected weight of an object on the conveyor 606. The mobile carrier 616 may include a bin or box into which a received object is dropped, and the mobile carrier 616 may be moved about a track system as discussed in more detail below.

Figure 66A:
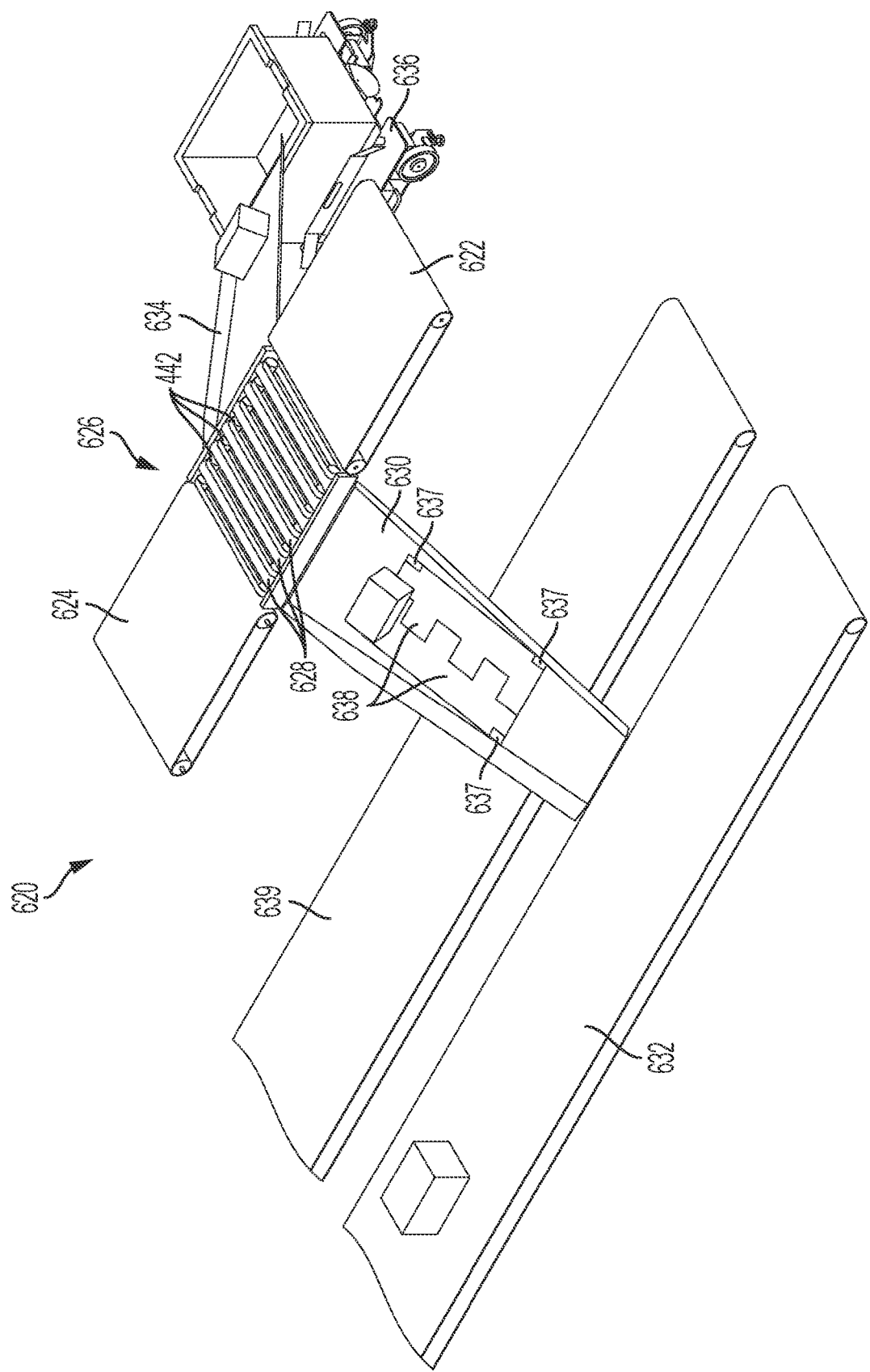
FIGS. 66A and 66B show illustrative diagrammatic views of a conveyor section for use in accordance with an aspect of the invention that includes bi-directional rollers and a pair of opposing chutes with bomb-bay doors.
Figure 66B:
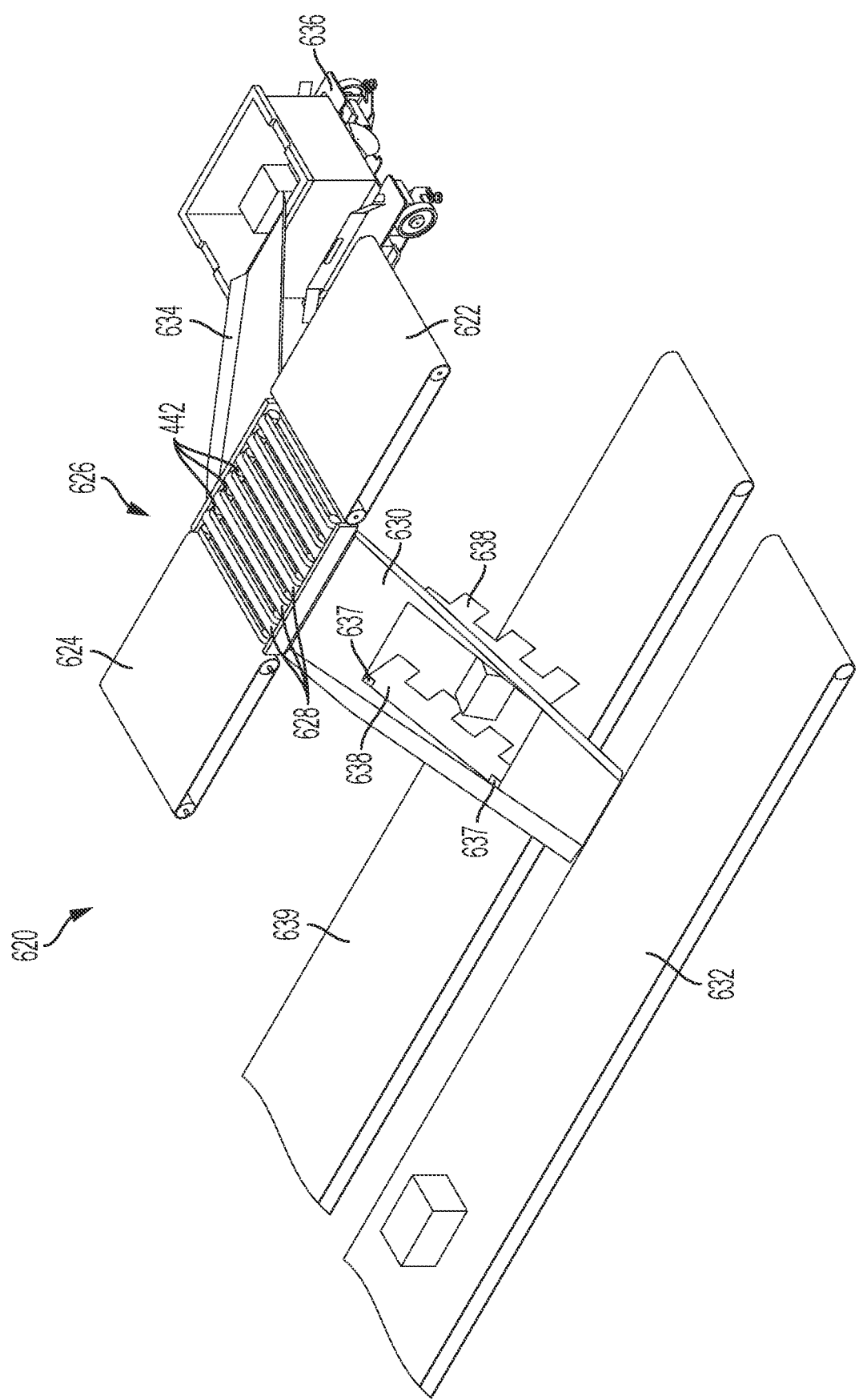

FIGS. 66A and 66B show a system 620 in accordance with a further embodiment of the invention that includes a central conveyor having an in-feed conveyor section 622, an out-feed conveyor section 624, and a weight-sensing multi-directional conveyor 626. Again, the weight-sensing multi-directional conveyor 626 may include weight-sensing rollers 442 as discussed above with reference to FIG. 39A-43C, as well as a series of orthogonally disposed narrow conveying belts 628. Either of the rollers 442 or the belts 628 may be lowered/raised with respect to the other, to provide that objects may either remain on the conveyor 626 and be provided to the out-feed conveyor 624, or may be routed by the belts 628 either to a chute 630 that leads to a conveyor 632, or to a chute 634 that leads to a mobile carrier 636. Additionally, the chute 630 includes bomb-bay doors 638 that open above a further conveyor 639. The bomb-bay doors 638 may be either motor activated or designed to release by spring under a certain weight threshold as discussed above with reference to FIGS. 49-52B. The selection of whether an object is to be moved to either the conveyor 612, the conveyor 639 or the mobile carrier 616, or remains on the conveyor 626 may be triggered by a detected weight of an object on the conveyor 606. Again, the mobile carrier 616 may include a bin or box into which a received object is dropped, and the mobile carrier 616 may be moved about a track system as discussed in more detail below.

Figure 67:
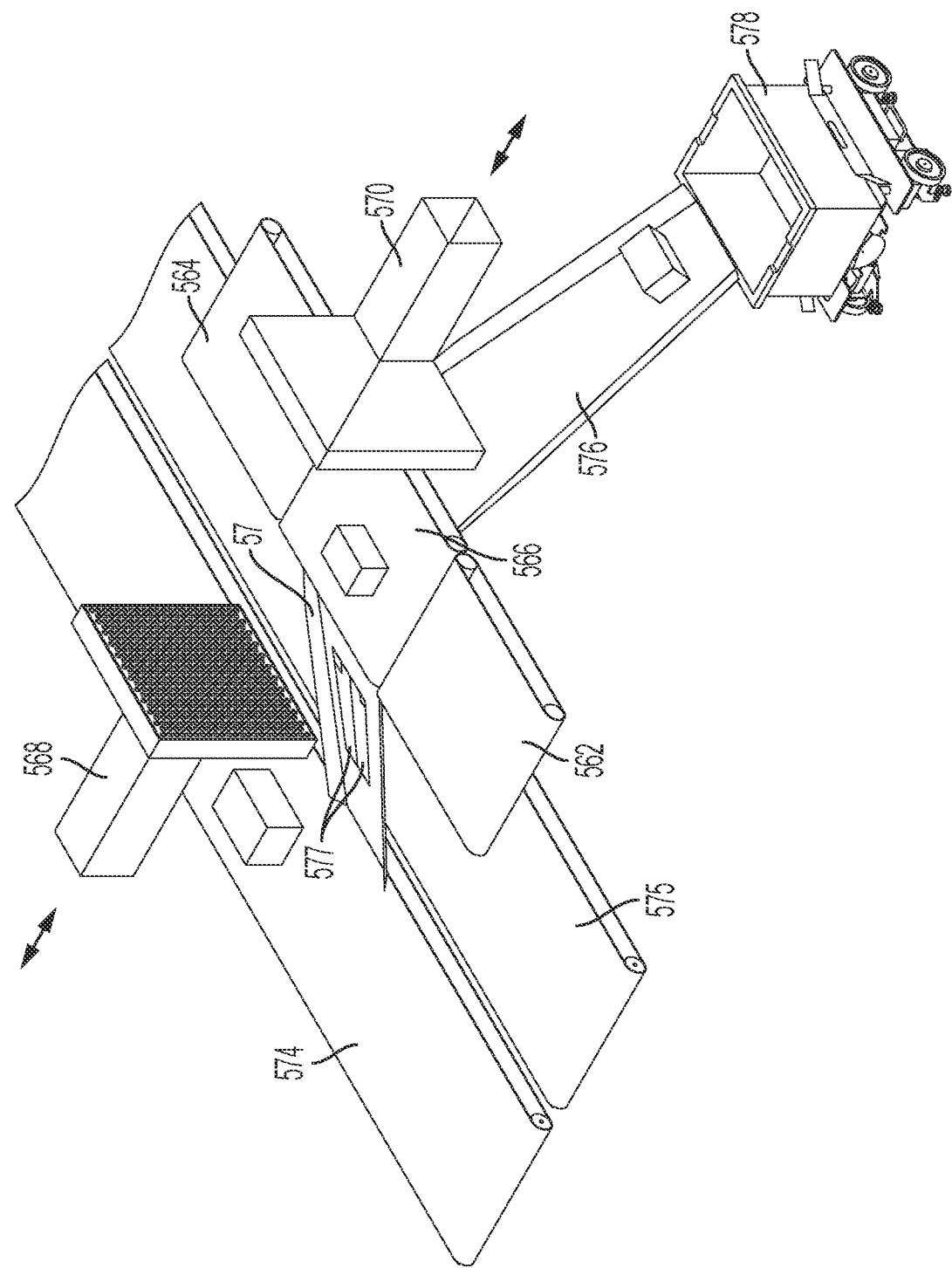
FIG. 67 shows an illustrative diagrammatic view of a conveyor section for use in accordance with an aspect of the invention that includes a side blower and a side vacuum source, and a pair of opposing chutes with bomb-bay doors.

FIG. 67 shows s system similar to system 560 of FIG. 63, including a central conveyor having an in-feed conveyor section 562, an out-feed conveyor section 564, and a weight-sensing conveyor 566 as discussed above with reference to FIGS. 39A-43C. The system 560 also includes a pair of sources 568, 570 on either side of the weight-sensing conveyor 566, and each source 568, 570 may provide either forced air via a blower or vacuum, such that objects may be moved by a blower-vacuum pair in either direction off of the conveyor 566. In addition to the chute 576 leading to the automated carrier 578, the system of FIG. 67 includes a chute 573 with a pair of bomb-bay doors 577 (as discussed above with reference to FIGS. 49-51B) for selectively providing an object either to the conveyor 574 or dropping an object onto conveyor 575 that is adjacent conveyor 574.

Figure 68A:
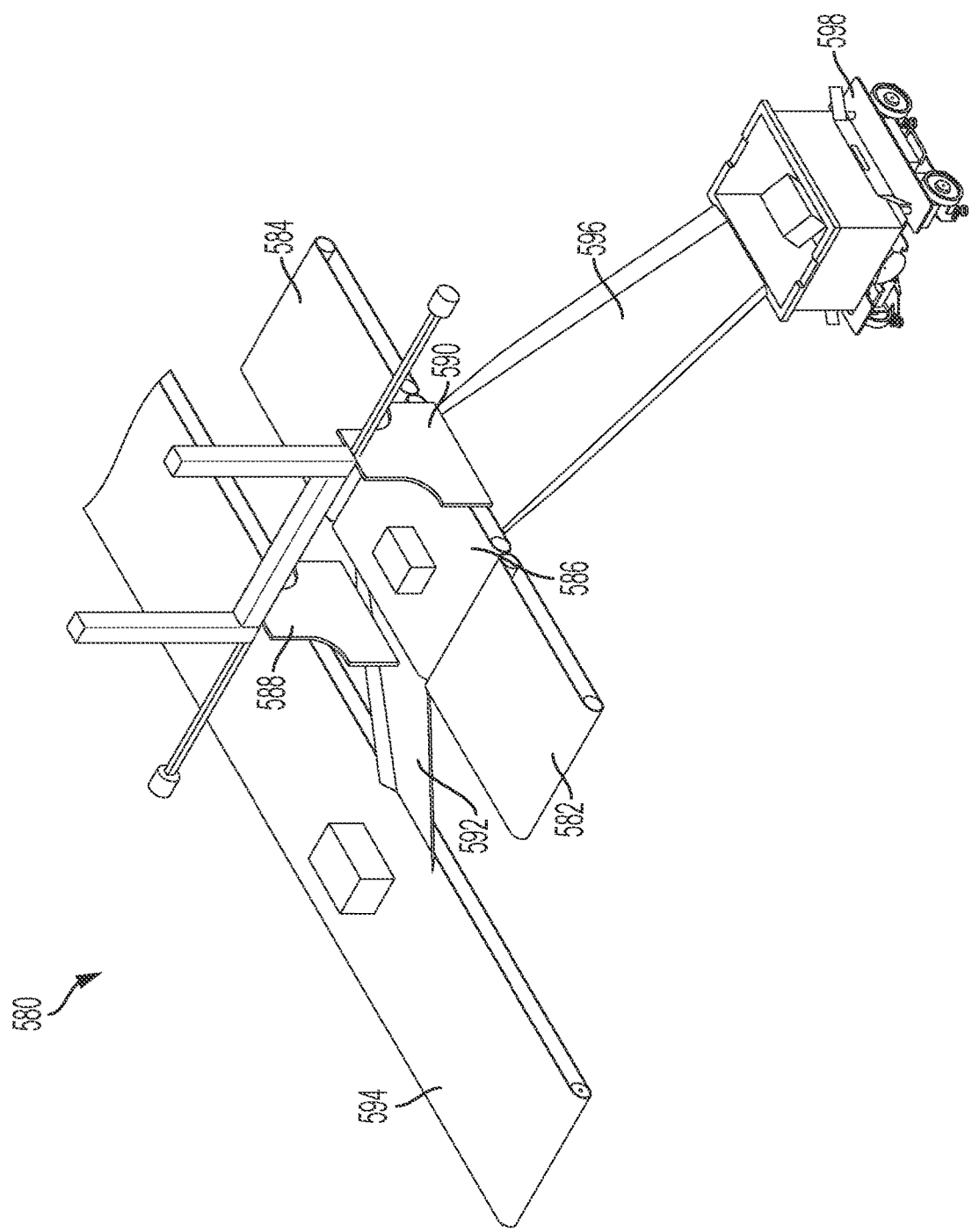
FIGS. 68A and 68B show illustrative diagrammatic views of a conveyor section for use in accordance with an aspect of the invention with side paddles and a pair of opposing chutes.
Figure 68B:
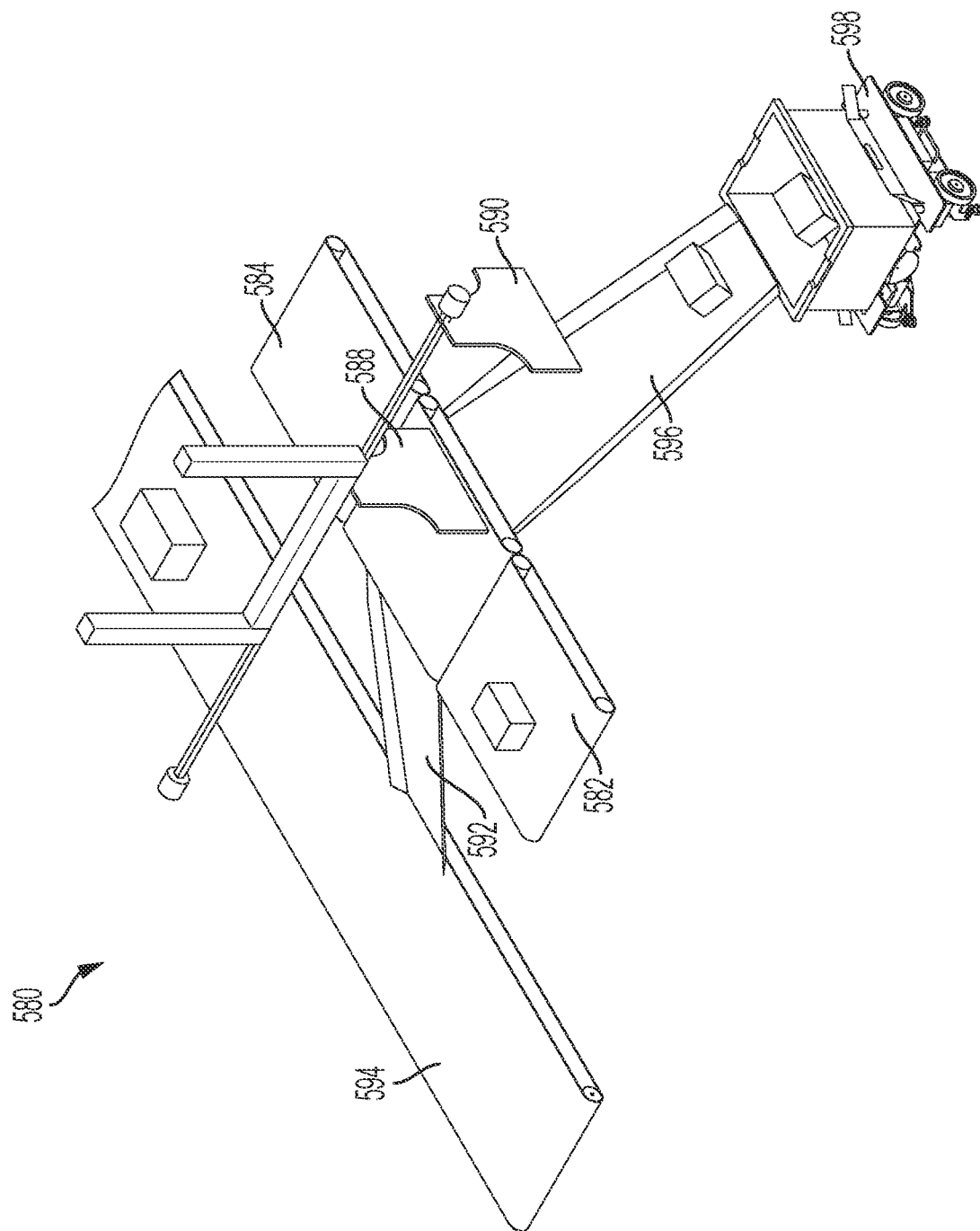

FIGS. 68A and 68B show a system 580 that includes a central conveyor having an in-feed conveyor section 582, an out-feed conveyor section 584, and a weight-sensing conveyor 586 as discussed above with reference to FIGS. 39A-43C. The system 580 also includes a pair of paddles 588, 590 on either side of the weight-sensing conveyor 586, and each paddle 588, 590 may be used to urge an object on the weight-sensing conveyor 586 off of the conveyor 586 in either direction, or an object may remain on the conveyor 586 and be moved to out-feed conveyor section 584. With further reference to the FIG. 68B, objects may either be urged onto a chute 592 that leads to a conveyor 594, or may be urged onto a chute 596 that least to a mobile carrier 598.

The selection of whether an object is to be moved to either the conveyor 574 or the mobile carrier 578 or remain on the conveyor 586 may be triggered by a detected weight of an object on the conveyor 586. The mobile carrier 598 may include a bin or box into which a received object is dropped, and the mobile carrier 598 may be moved about a track system as discussed in more detail below.

Figure 69:
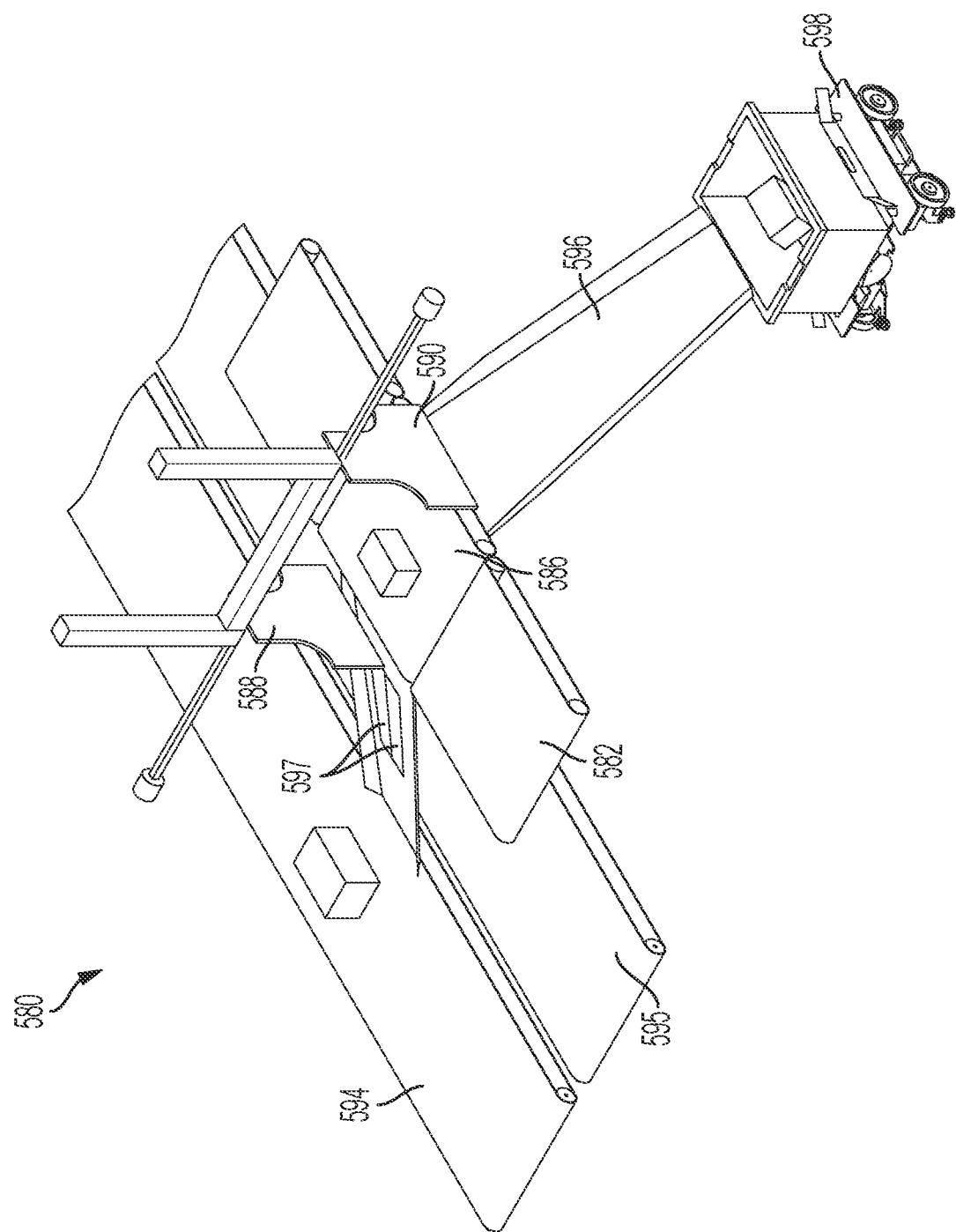
FIG. 69 shows an illustrative diagrammatic view of a conveyor section for use in accordance with an aspect of the invention with side paddles and opposing chutes, one of which includes bomb-bay doors.

FIG. 69 shows a system similar to that of FIGS. 68A and 68B that includes a central conveyor having an in-feed conveyor section 582, an out-feed conveyor section 584, and a weight-sensing conveyor 586 as discussed above with reference to FIGS. 39A-43C. The system 580 also includes a pair of paddles 588, 590 on either side of the weight-sensing conveyor 586, and each paddle 588, 590 may be used to urge an object on the weight-sensing conveyor 586 off of the conveyor 586 in either direction, or an object may remain on the conveyor 586 and be moved to out-feed conveyor section 584. In addition to the chute 596 leading to the automated carrier 598, the system of FIG. 69 includes a chute 593 with a pair of bomb-bay doors 597 (as discussed above with reference to FIGS. 49-51B) for selectively providing an object either to the conveyor 594 or dropping an object onto conveyor 595 that is adjacent conveyor 594.

Figure 70:
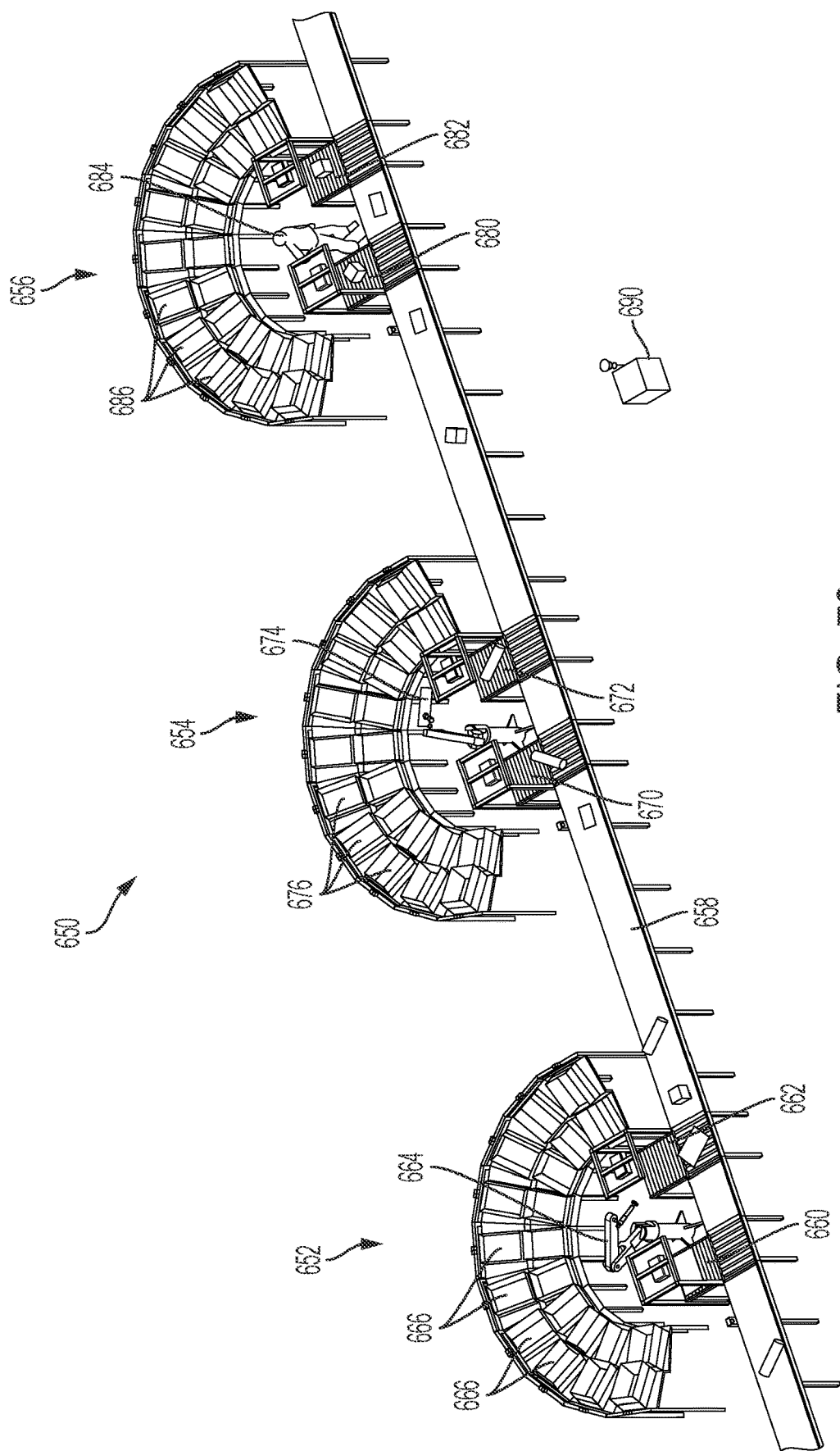
FIG. 70 shows an illustrative diagrammatic view of multiple processing systems for use with an induction system as disclosed with reference to FIGS. 1, 9, 11, 34-38, 49, 54, 56 and 63-69 employing manual and automated processing stations.

The object processing system may include a plurality of stations as discussed above, and the induction filtering may direct different objects to the different stations based on a variety of object characteristics and end effector characteristics (e.g., knowing which end effectors are better suited for handling which objects). The ability to provide objects from infeed conveyors to a wide variety of processing systems provides significant flexibility, and the ability to provide objects to automated carriers provides further flexibility in object processing. FIG. 70, for example, shows an object processing system 650 that includes multiple workstations 652, 654, 656 that receive objects via diverters 660, 662, 670, 672, 680, 682 under control of the one or more processing systems 690. Workstation 652, may for example, be well suited for using an articulated arm 664 to move bags for destination locations 666, and workstation 654 may, for example, be better suited for using an articulated arm to move cylinders to destination locations 676. Another workstation 656, may for example, include a human worker 684 for moving objects to destination locations 686 that are not easily processed by any articulated arms.

Figure 71:
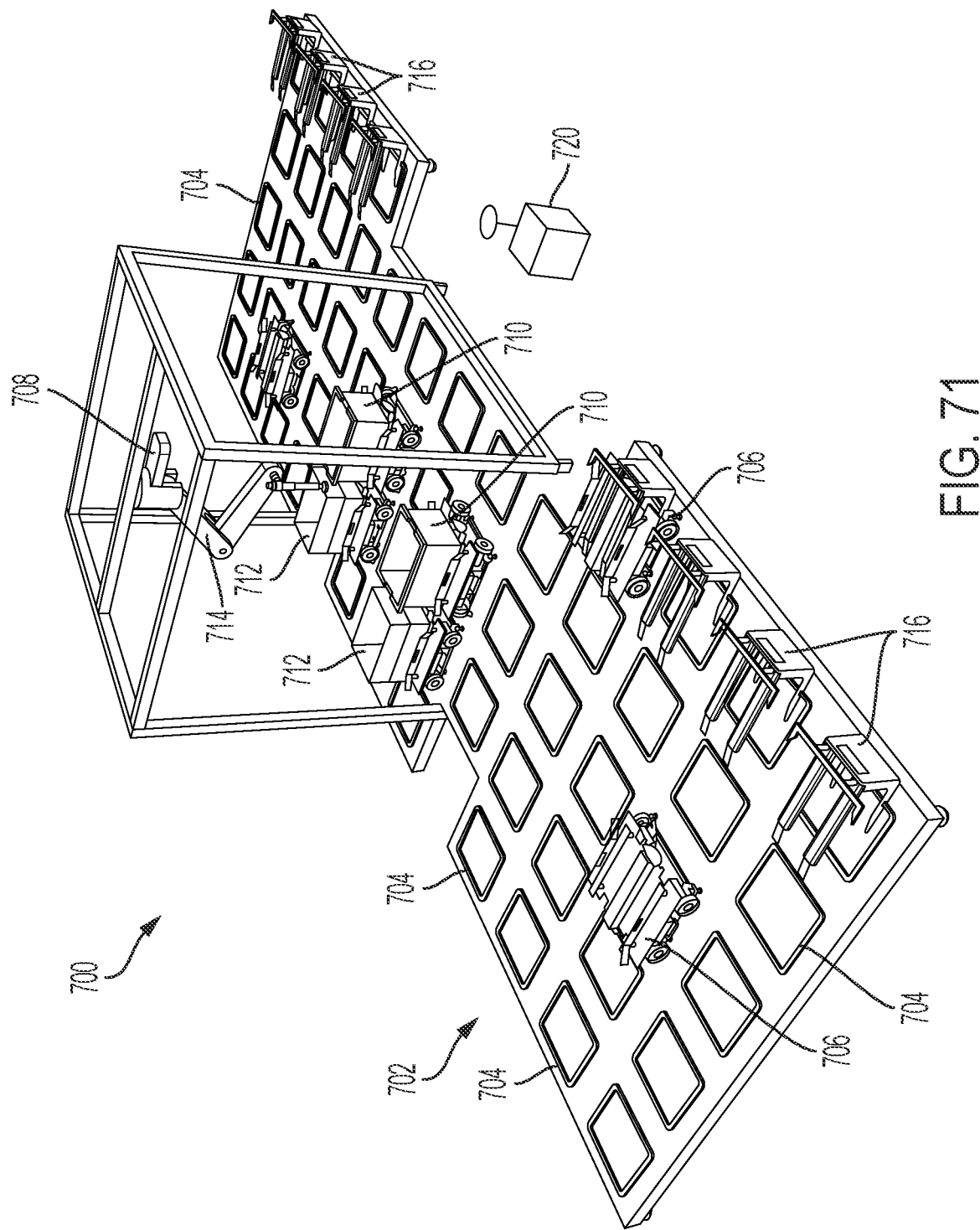
FIG. 71 shows an illustrative diagrammatic view of an object processing system for use with induction systems employing automated carriers as disclosed with reference to FIGS. 63-69 and an automated processing station.
Figure 72:
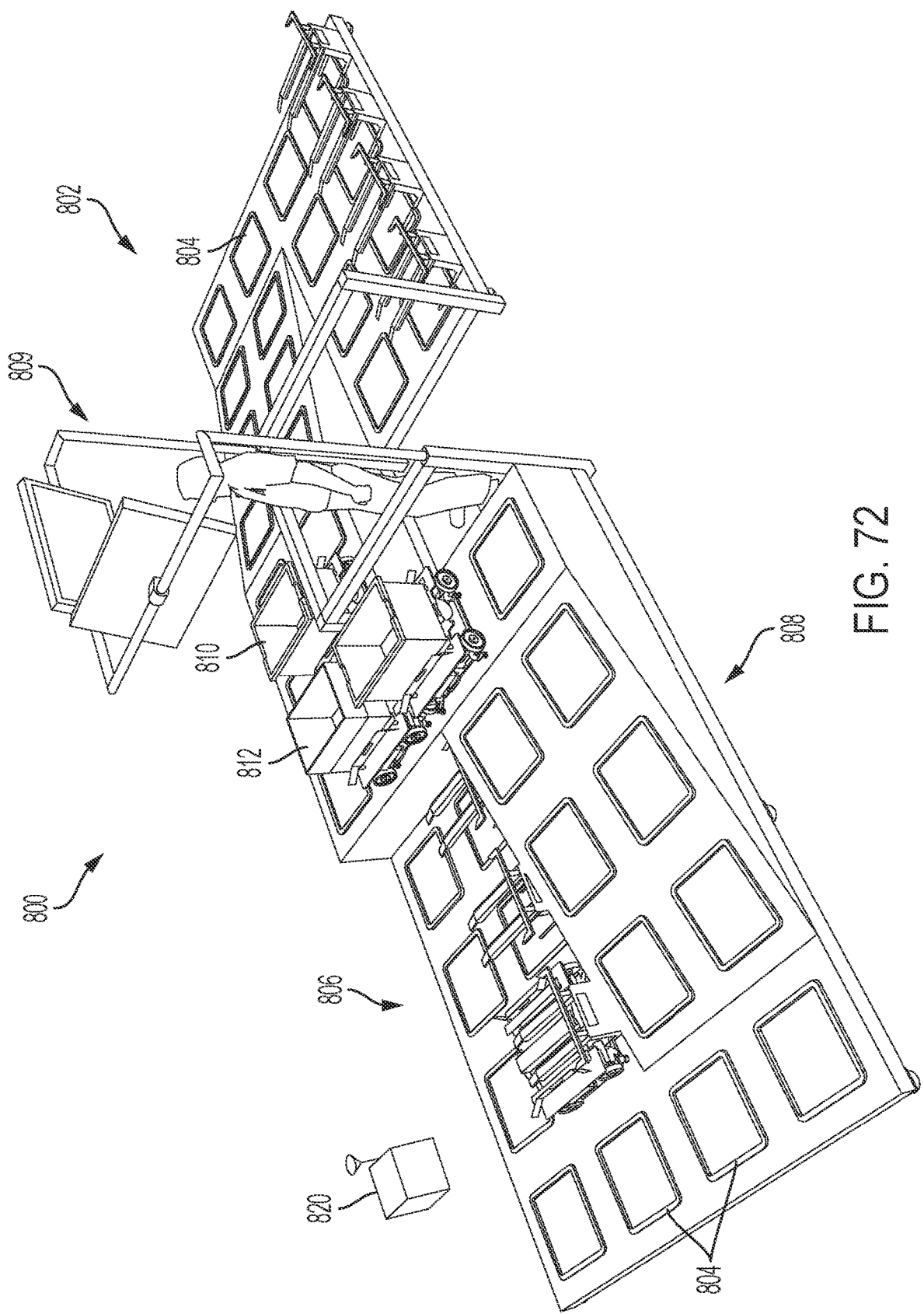
FIG. 72 shows an illustrative diagrammatic view of an object processing system for use with induction systems employing automated carriers as disclosed with reference to FIGS. 63-69 and a manual processing station.

Object processing systems for use with induction filtering systems and methods of various embodiments of the invention may be any of a wide variety of object processing systems such as sortation systems, automated storage and retrieval systems, and distribution and redistribution systems. For example, in accordance with further embodiments, the invention provides systems that are capable of automating the outbound process of a processing system. The system may include one or more automated picking stations 700 (as shown in FIG. 71) and manual picking stations 800 (as shown in FIG. 72) that are supplied with containers by a fleet of mobile carriers that traverse a smart flooring structure formed of track segments as discussed above. The carriers may carry bins that can store objects. The system may provide a novel goods-to-picker system that uses a fleet of small mobile carriers to carry individual inventory totes and outbound containers to and from picking stations.

In accordance with an embodiment of the system includes an automated picking station that picks eaches from inventory totes and loads them into outbound containers. The system involves together machine vision, task and motion planning, control, error detection and recovery, and artificial intelligence grounded in a sensor-enabled, hardware platform to enable a real-time and robust solution for singulating items out of cluttered containers.

With reference to FIG. 71, the automated picking system 700 perceives the contents of the containers using a multi-modal perception unit and uses a robotic arm equipped with an automated programmable motion gripper and integrated software in processing system 720 to pick eaches from homogeneous inventory totes and place them into heterogeneous outbound containers. These elements are co-located in a work cell that meets industry standard safety requirements and interfaces with track system to keep the automated picking system fed with a continual supply of inventory totes and outbound containers.

In particular, the system 700 includes an array 702 of track elements 704 as discussed above, as well as automated carriers 706 that ride on the track elements 704 as discussed above. One or more overhead perception units 708 (e.g., cameras or scanners) acquire perception data regarding objects in bins or totes 710, as well as perception data regarding locations of destination boxes 712. A programmable motion device such as a robotic system 714 picks an object from the bin or tote 710, and places it in the adjacent box 712. One or both of the units 710, 712 are then moved automatically back into the grid, and one or two new such units are moved into position adjacent the robotic system. Meanwhile, the robotic system is employed to process another pair of adjacent units (again, a bin or tote 710 and a box 712) on the other side of the robotic system 714. The robotic system therefore processes a pair of processing units on one side, then switches sides while the first side is being replenished. This way, the system 700 need not wait for a new pair of object processing units to be presented to the robotic system. The array 702 of track elements 704 may also include shelf stations 716 at which mobile units 706 may park or pick up either bins/totes 710 and boxes 712. The system operates under the control, for example, of a computer processor 720.

The manual pick station system is a goods-to-person pick station supplied by mobile automated movement carriers on track systems as discussed above. The system has the same form and function as the automated picking station in that both are supplied by the same carriers, both are connected to the same track system grid, and both transfer eaches from an inventory tote to an outbound container. The manual system 800 (as shown in FIG. 72) relies on a manual team member to perform the picking operation.

Also, the manual system raises carriers to an ergonomic height (e.g. via ramps), ensures safe access to containers on the carriers, and includes a monitor interface (HMI) to direct the team member's activities. The identity of the SKU and the quantity of items to pick are displayed on an HMI. The team member must scan each unit's UPC to verify the pick is complete using a presentation scanner or handheld barcode scanner. Once all picks between a pair of containers are complete, the team member presses a button to mark completion.

In accordance with this embodiment (and/or in conjunction with a system that includes an AutoPick system as discussed above), a system 800 of FIG. 72 may include an array 802 of track elements 804 that are provided on planer surfaces 806 as well as inclined surfaces 808 leading to further planar surfaces. The system 800 may also include visual data screens 809 that provide visual data to a human sorter, informing the human sorter of what goods are to be moved from totes or bins 810 to destination boxes 812. The system operates under the control, for example, of a computer processor 820.

While the bulk of the overall system's picking throughput is expected to be handled by automated picking systems, manual picking systems provide the carrier and track system the ability to (a) rapidly scale to meet an unplanned increase in demand; (b) handle goods that are not yet amenable to automation; and (c) serve as a QA, problem solving, or inventory consolidation station within the overall distribution system. The system therefore, provides significant scaling and trouble-shooting capabilities in that a human sorted may be easily added to an otherwise fully automated system. As soon as a manual picking system is enabled (occupied by a sorter), the system will begin to send totes or bins 810 and boxes 812 to the manual picking station. Automated picking stations and manual picking stations are designed to occupy the same footprint, so a manual picking station may later be replaced with an automated picking station with minimal modifications to the rest of the system.

Again, a carrier is a small mobile robot that can interchangeably carry an inventory tote, outbound container, or a vendor case pack. These carriers can remove or replace a container from or onto a storage fixture using a simple linkage mechanism. Since a carrier only carries one container at a time, it can be smaller, lighter, and draw less power than a larger robot, while being much faster. Since the carriers drive on a smart tile flooring, they have lessened sensing, computation, and precision requirements than mobile robots operating on bare floor. These features improve cost to performance metrics.

All carriers run on the same shared roadway of track sections as independent container-delivery agents. The carriers can move forward, backward, left or right to drive around each other and reach any location in the system. This flexibility allows the carriers to serve multiple roles in the system by transporting (a) inventory totes to picking stations, (b) outbound containers to picking stations, (c) inventory totes to and from bulk storage, (d) full outbound containers to discharge lanes, and (e) empty outbound containers into the system. Additionally, the carriers may be added incrementally as needed to scale with facility growth.

The track floor modules are standard-sized, modular, and connectable floor sections. These tiles provide navigation and a standard driving surface for the carriers and may act as a storage area for containers. The modules are connected to robotic pick cells, induction stations from bulk storage, and discharge stations near loading docks. The modules eliminate the need of other forms of automation, e.g. conveyors, for the transportation of containers within the system.

Figure 73:
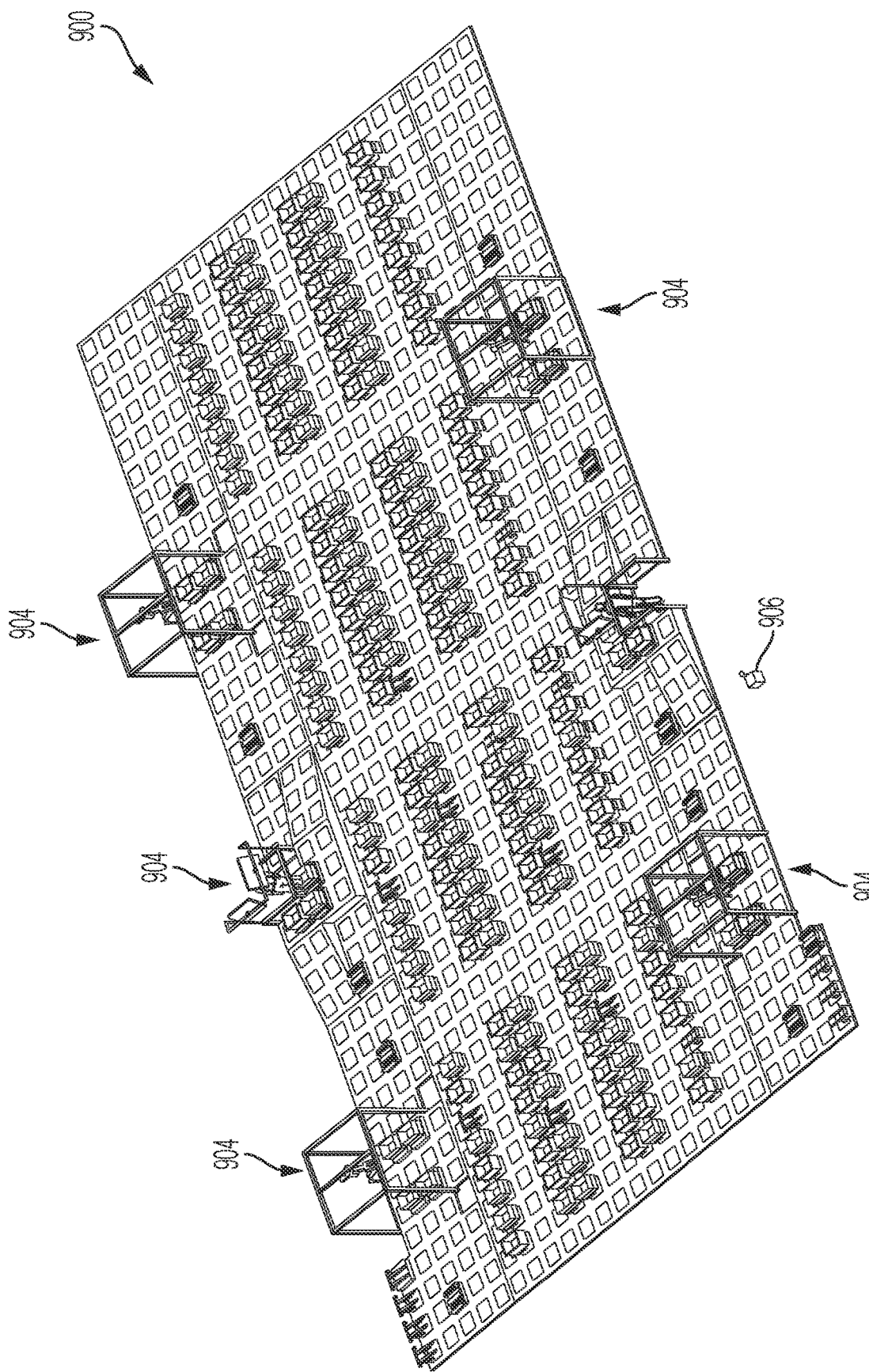
FIG. 73 shows an illustrative diagrammatic view of an object processing system for use with an induction system employing automated carriers as disclosed with reference to FIGS. 63-69 that includes both manual and automated processing stations.

As shown at 900 in FIG. 73, the system may be scaled up to include a much larger array of track modules 902, and many processing stations 904 that may, for example, be any of inventory in-feed stations, empty outbound vessel in-feed stations, automated and manual processing stations, and outbound stations as discussed above. The system operates under the control, for example, of a computer processor 906.

Those skilled in the art will appreciate that numerous modifications and variations may be made to the above disclosed embodiments without departing from the spirit and scope of the present invention.

What is claimed is:

1. A distribution system comprising:
  an air-permeable conveyor section;
  an air intake system comprising a vacuum source having a screened opening that faces the conveyor section at a fixed distance from above the conveyor section; and
  a forced air system comprising an air blower having an opening that faces the air intake system from below the conveyor section;
  wherein the air intake system and the forced air system cooperate to draw an object from the conveyor section into contact with the screened opening of the vacuum source.

2. The distribution system as claimed in claim 1, wherein the conveyor section includes a conveyor with a plurality of openings in the conveyor.

3. The distribution system as claimed in claim 1, wherein the conveyor section is formed from a mesh material.

4. The distribution system as claimed in claim 1, wherein the vacuum source of the air intake system is dynamically adjustable to accommodate a variety of objects presented to the conveyor section.

5. The distribution system as claimed in claim 4, wherein the distribution system includes an adjustable vacuum control system for adjusting a vacuum of the air intake system.

6. The distribution system as claimed in claim 1, wherein the distribution system further includes a perception unit that is directed toward the object on the conveyor section.

7. The distribution system as claimed in claim 1, wherein the air intake system is movably mounted on a gantry to carry the object drawn to the air intake system toward one of a plurality of adjacent conveyors.

8. A distribution system for providing dissimilar objects into one of a plurality of receiving units, said distribution system comprising:
  a conveyor section; and
  an air transfer system including a forced air system comprising an air blower and an air intake system comprising a vacuum source, the air blower and the vacuum source being horizontally adjacent to opposite sides on the conveyor section;
  wherein the air blower and the vacuum source cooperate to urge an object from the conveyor section to one of the plurality of receiving units.

9. The distribution system as claimed in claim 8, wherein the conveyor section includes a conveyor with a plurality of openings in the conveyor.

10. The distribution system as claimed in claim 8, wherein the conveyor section is formed from a mesh material.

11. The distribution system as claimed in claim 8, wherein the vacuum source of the air intake system is dynamically adjustable to accommodate a variety of objects presented to the conveyor section.

12. The distribution system as claimed in claim 11, wherein the distribution system includes an adjustable vacuum control system for adjusting a vacuum of the air intake system.

13. The distribution system as claimed in claim 8, wherein the distribution system further includes a perception unit that is directed toward the object on the conveyor section.

14. The distribution system as claimed in claim 8, wherein the plurality of receiving units include any of an adjacent conveyor, a chute or a mobile carrier.

15. A method of distributing dissimilar objects to one of a plurality of receiving units, said method comprising:
  providing a conveyor section between a forced air system and an air intake system, the forced air system comprising an air blower and the air intake system comprising a vacuum source that faces the air blower; and
  engaging the forced air system and the air intake system to provide forced air and a vacuum that moves an object off the conveyor section.

16. The method as claimed in claim 15, wherein the vacuum source of the air intake system is dynamically adjustable to accommodate a variety of objects presented to the conveyor section.

17. The method as claimed in claim 15, further comprising monitoring the object on the conveyor section using a perception unit that is directed toward the conveyor section.

18. The method as claimed in claim 15, further comprising adjusting a vacuum provided by the vacuum source of the air intake system.

19. The method as claimed in claim 15, wherein an opening of the air intake system is above the conveyor section.

20. The method as claimed in claim 15, wherein an opening of the air intake system is horizontally adjacent the conveyor section.

21. The method as claimed in claim 15, wherein an opening of the forced air system is below the conveyor section.

22. The method as claimed in claim 15, wherein an opening of the forced air system is horizontally adjacent the conveyor section.

23. The method as claimed in claim 15, further comprising:
- mounting the air intake system on a gantry; and
- moving the air intake system on the gantry to carry an object drawn to the air intake system toward one of a plurality of adjacent conveyors.

\* \* \* \* \*

UNITED STATES PATENT AND TRADEMARK OFFICE
CERTIFICATE OF CORRECTION

PATENT NO. : 11,080,496 B2
APPLICATION NO. : 16/737211
DATED : August 3, 2021
INVENTOR(S) : Thomas Wagner et al.

It is certified that error appears in the above-identified patent and that said Letters Patent is hereby corrected as shown below:

In the Specification

In Column 2, Line 61, should read:
"the same collection bin designations;..."

In Column 2, Line 64, should read:
"efficient and more cost-effective object..."

In Column 4, Line 56, should read:
"FIGS. 28A-28C show illustrative diagrammatic views"

In Column 9, Line 63, should read:
"...may determine that the"

In Column 10, Line 27, should read:
"otherwise needs special processing). In..."

In Column 10, Line 60, should read:
"force (above a sensor threshold)..."

In Column 10, Line 64, should read:
"...are not to be processed by the system 12,"

In Column 12, Line 3, should read:
"...force (above a sensor"

In Column 13, Line 8, should read:
"...being held by a gripper, and"

Signed and Sealed this
Twenty-first Day of February, 2023

*Katherine Kelly Vidal*

Katherine Kelly Vidal
*Director of the United States Patent and Trademark Office*

CERTIFICATE OF CORRECTION (continued)
U.S. Pat. No. 11,080,496 B2

In Column 13, Line 37, should read:
"slightly upward towards a backlighting screen..."

In Column 14, Line 44, should read:
"...force (above a sensor"

In Column 14, Line 49, should read:
"be processed by the system..."

In Column 15, Line 20, should read:
"track that runs between rows..."

In Column 16, Line 32, should read:
"that diverts objects off the..."

In Column 17, Line 16, should read:
"direction having a horizontal..."

In Column 18, Line 15, should read:
"In accordance with an aspect, the invention ..."

In Column 19, Line 44, should read:
"bags, odd-shaped objects etc.),"

In Column 20, Line 18, should read:
"...(boxes, bags, odd-shaped objects etc.),"

In Column 22, Line 1, should read:
"...(boxes, bags, odd-shaped objects etc.),"

In Column 22, Line 37, should read:
"leads to further induction..."

In Column 22, Line 57, should read:
"...(boxes, bags, odd-shaped objects etc.), and"

In Column 23, Line 48, should read:
"...sensor 446 on either end of"

In Column 24, Line 50, should read:
"includes a band portion..."

In Column 25, Line 38, should read:
"chute with a bomb-bay door or doors. The..."

CERTIFICATE OF CORRECTION (continued)
U.S. Pat. No. 11,080,496 B2

In Column 25, Line 44, should read:
"...slide over the bomb-bay door(s) without"

In Column 25, Line 50, should read:
"...controller opens the bomb-bay"

In Column 26, Line 7, should read:
"...bomb-bay doors 498 if the object is too"

In Column 26, Lines 11-12, should read:
"...conveyor may be designed...mechanisms that open when the weight..."

In Column 26, Line 17, should read:
"...(FIG. 51B), such as by a spring or"

In Column 26, Line 32, should read:
"...495, 497, as well as a set of bomb-bay"

In Column 26, Line 67, should read:
"that are too processed, may be routed..."

In Column 27, Line 13, should read:
"...from the now upside-down conveyor 506 into bin"

In Column 27, Line 24, should read:
"...FIGS. 53 and 55A - 55D may be used for"

In Column 27, Line 38, should read:
"be processed, may be routed..."

In Column 27, Line 57, should read:
"...The air flow is tuned so that for"

In Column 28, Line 47, should read:
"pended upside-down over the..."

In Column 29, Line 49, should read:
"a chute 576 that leads to a mobile carrier..."

In Column 30, Line 67, should read:
"...a chute 596 that leads to a mobile carrier 598."